United States Patent
Inomata et al.

(10) Patent No.: US 9,795,955 B2
(45) Date of Patent: Oct. 24, 2017

(54) CURABLE COMPOSITION AND CURED POLYMER PRODUCT

(71) Applicant: FUJIFILM Corporation, Tokyo (JP)

(72) Inventors: Sotaro Inomata, Kangawa (JP); Keisuke Kodama, Kanagawa (JP); Kazuomi Inoue, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/238,924

(22) Filed: Aug. 17, 2016

(65) Prior Publication Data

US 2016/0354771 A1    Dec. 8, 2016

Related U.S. Application Data

(63) Continuation of application No. PCT/JP2015/052887, filed on Feb. 2, 2015.

(30) Foreign Application Priority Data

Feb. 21, 2014   (JP) .................. 2014-032346
Jul. 31, 2014   (JP) .................. 2014-156959
Jan. 30, 2015   (JP) .................. 2015-017834

(51) Int. Cl.

| B01J 39/20 | (2006.01) |
|---|---|
| B01D 71/82 | (2006.01) |
| C08F 12/34 | (2006.01) |
| C08F 2/38 | (2006.01) |
| C08F 228/00 | (2006.01) |
| H01M 8/10 | (2016.01) |
| H01M 8/1023 | (2016.01) |
| C08F 12/30 | (2006.01) |
| B01J 47/12 | (2017.01) |
| B01J 20/04 | (2006.01) |
| B01D 61/00 | (2006.01) |
| B01D 61/02 | (2006.01) |
| B01D 71/44 | (2006.01) |
| C08F 212/34 | (2006.01) |
| C08F 220/58 | (2006.01) |
| C08F 228/02 | (2006.01) |

(Continued)

(52) U.S. Cl.
CPC ............ *B01J 39/20* (2013.01); *B01D 61/002* (2013.01); *B01D 61/02* (2013.01); *B01D 61/485* (2013.01); *B01D 71/44* (2013.01); *B01D 71/82* (2013.01); *B01J 20/043* (2013.01); *B01J 39/05* (2017.01); *B01J 47/12* (2013.01); *C08F 2/38* (2013.01); *C08F 12/30* (2013.01); *C08F 12/34* (2013.01); *C08F 212/34* (2013.01); *C08F 220/58* (2013.01); *C08F 228/00* (2013.01); *C08F 228/02* (2013.01); *C08F 292/00* (2013.01); *C08J 5/2243* (2013.01); *H01M 8/1023* (2013.01); *B01D 61/48* (2013.01); *B01D 2323/385* (2013.01); *C08F 2220/585* (2013.01); *C08J 2325/18* (2013.01); *C08J 2333/24* (2013.01); *C08J 2341/00* (2013.01); *C08J 2351/10* (2013.01)

(58) Field of Classification Search
CPC . B01J 39/20; B01J 47/12; B01J 20/043; B01J 39/05; B01D 71/82; B01D 61/002; B01D 61/02; B01D 61/485; B01D 71/44; B01D 61/48; C01F 12/34; C01F 2/38; C01F 228/00; C01F 12/30; C01F 212/34; C01F 220/58; C01F 228/02; C01F 292/00; H01M 8/1023; C08J 5/2243
USPC .......................................................... 521/27
See application file for complete search history.

(56) References Cited

U.S. PATENT DOCUMENTS

2004/0009384 A1*  1/2004  Mathias ................ H01M 4/921
                                                          429/494

FOREIGN PATENT DOCUMENTS

| JP | 2005-532665 A | 10/2005 |
|---|---|---|
| JP | 2006-225459 A | 8/2006 |

(Continued)

OTHER PUBLICATIONS

International Search Report of PCT/JP2015/052887 dated Feb. 24, 2015.

*Primary Examiner* — Michael M Bernshteyn
(74) *Attorney, Agent, or Firm* — Sughrue Mion, PLLC

(57) ABSTRACT

Provided are a curable composition including a compound expressed by General Formula (1) below; a polymerization initiator; and a chain transfer agent, and a cured polymer product.

General Formula (1)

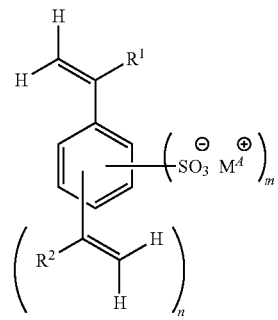

In General Formula (1), m represents an integer of 1 to 4, and n represents an integer of 1 to 4. Here, a sum of m and n is not greater than 5. $M^4$ represents a hydrogen ion, an inorganic ion, or an organic ion. Here, an inorganic ion and an organic ion may be bivalent or higher ions. Each of $R^1$ and $R^2$ independently represents a hydrogen atom or an alkyl group.

17 Claims, 2 Drawing Sheets

(51) Int. Cl.
    *C08F 292/00*     (2006.01)
    *C08J 5/22*     (2006.01)
    *B01J 39/05*     (2017.01)
    *B01D 61/48*     (2006.01)

(56) References Cited

FOREIGN PATENT DOCUMENTS

| | | | |
|---|---|---|---|
| JP | 2007-305371 | A | 11/2007 |
| JP | 2007305371 | A * | 11/2007 |
| JP | 2011-189223 | A | 9/2011 |
| JP | 2012-1621 | A | 1/2012 |
| JP | 2012001621 | A * | 1/2012 |
| WO | 2013/011272 | A1 | 1/2013 |
| WO | 2013/011273 | A1 | 1/2013 |

* cited by examiner

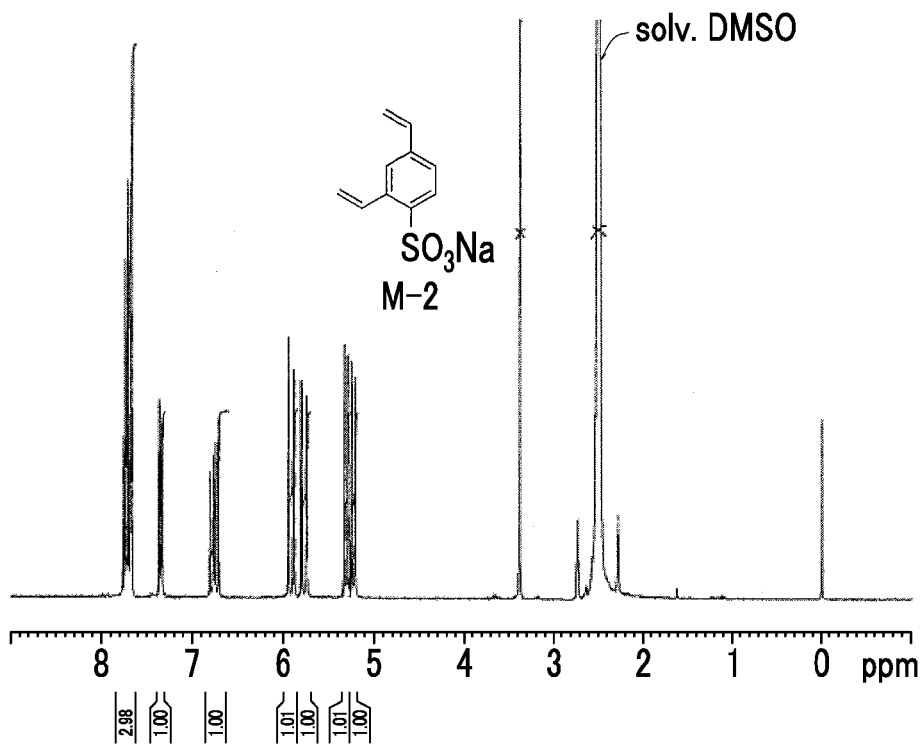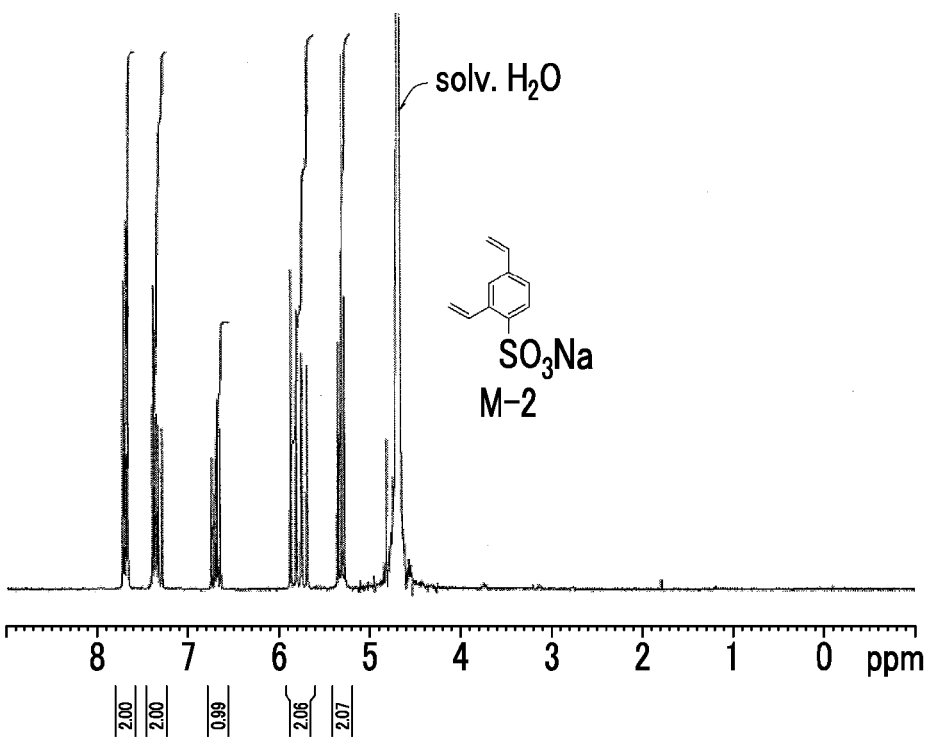

CURABLE COMPOSITION AND CURED POLYMER PRODUCT

CROSS-REFERENCE TO RELATED APPLICATIONS

This application is a Continuation of PCT International Application No. PCT/JP2015/052887 filed on Feb. 2, 2015, which claims priority under 35 U.S.C. §119 (a) to Japanese Patent Application No. 2014-032346 filed on Feb. 21, 2014, to Japanese Patent Application No. 2014-156959 filed on Jul. 31, 2014, and to Japanese Patent Application No. 2015-017834 filed on Jan. 30, 2015. Each of the above applications is hereby expressly incorporated by reference, in its entirety, into the present application.

BACKGROUND OF THE INVENTION

1. Field of the Invention

The invention relates to a curable composition and a cured polymer product.

2. Description of the Related Art

The ion exchange membrane is used in electrodeionization (EDI), continuous electrodeionization (CEDI), electrodialysis (ED), and electrodialysis reversal (EDR). The ion exchange membrane is used not only for general usage but also for medical use, and recently the ion exchange membrane has also been used in a solid polymer electrolyte-type fuel cell.

The electrodeionization (EDI) is a water treatment process for removing ions from aqueous liquids by using an ion exchange membrane and a potential in order to achieve ion transport. EDI differs from other water purification technologies, such as conventional ion exchange, in that it is does not require the use of chemicals such as acids or caustic soda, and can be used to produce ultra pure water. The electrodialysis (ED) and the electrodialysis reversal (EDR) are electrochemical separation processes for removing ions and the like from water and other fluids.

Recently, the ion exchange membrane has been generally manufactured in the method of thermally polymerizing a styrene-based monomer and introducing an ion exchangeable substituent (quaternary ammonium salt group or sulfo group) by substitution reaction or the like (for example, see JP2006-225459A). Recently, research for improving a film provided with ionic groups and crosslinking bonds at high density has been actively conducted by using a monomer (also referred to as a charged crosslinker or an ionic crosslinking agent) also having an ionic group and a crosslinking group (2 or more polymerizable groups). For example, mainly in a polymer, an anion exchange membrane (for example, see WO2013/011273A) having a cationic group such as quaternary ammonium or a cation exchange membrane (for example, see WO2013/011272A, JP2007-305371A, and JP2011-189223A) having an anionic group such as a sulfo group is suggested.

SUMMARY OF THE INVENTION

Water permeability, electrical resistance, and height of the selective permeability of the ion which are the main performances of an ion exchange membrane (hereinafter, in this specification, simply referred to also as a "film") greatly depend on ion exchange capacity of the film, crosslinking density, and empty hole sizes.

In the research so far, the present inventors have found that, when a curable composition including an ionic monomer having one polymerizable group and a crosslinkable monomer that have two or more polymerizable groups and that can be crosslinked is polymerized and cured, as the solution concentration of the coating liquid containing of the curable composition is higher, the empty hole size decreases, so as to enhance performances of the ion exchange membrane.

However, since a commercially available styrene-based crosslinkable monomer does not have an ionic group, the commercially available styrene-based crosslinkable monomer is oil soluble, while an ionic monomer which is a copolymerization counterpart and have one polymerizable group is water soluble. Therefore, it has been difficult to apply both with low compatibility at high concentration. Accordingly, recently, with respect to the introduction of the ionic group performed after the styrene-based ion exchange membrane is polymerized in an organic dissolving agent system, the reaction has been generally performed in a water system, since a raw material having an ionic group that reacts with a styrene-based polymer is water soluble. However, in a method of introducing an ionic group to a styrene-based polymer afterwards, it has been difficult to sufficiently introduce ionic groups (for example, see JP2011-189223A).

With respect to this, in the case where the crosslinkable monomer having two or more polymerizable groups has an ion exchange group, aqueous application becomes possible. Accordingly, the concentration of the ionic monomer and the crosslinkable monomer in the coating liquid can become high, and thus so-called high concentration application becomes possible. As a result, according to the enhancement of the ion exchange capacity and the crosslinking density, the performances of the ion exchange membrane were greatly enhanced.

However, the synthesization of a crosslinking agent having an ion exchange group which is a crosslinkable monomer for a cation exchange membrane is complicated. Particularly, the styrene-based compound which is an aromatic vinyl compound has been rarely reviewed. Therefore, in the styrene-based crosslinkable monomer in the related art, the ion exchange capacity and the crosslinking density are limited, and thus the enhancement of additional performances of the ion exchange membrane has been hardly expected.

The crosslinkable monomer for the cation exchange membrane having the sulfo group has an electron attractive sulfo group in an aromatic ring, and thus the synthesization of the cation exchange membrane caused by the thermal polymerization using an azo-based polymerization initiator or an organic peroxide as a polymerization initiator has been reviewed (see JP2007-305371A). However, since crosslinking reaction has not sufficiently proceeded, the film performances decrease and thus improvement is required.

Meanwhile, in the case of an ion exchange membrane that can be obtained from a crosslinkable monomer other than the styrene-based crosslinkable monomer having ester or an amide bond, the ion exchange membrane is peeled off by an alkali treatment or an ultrasonic treatment, and thus improvement of durability has been required.

Accordingly, an object of the invention is to provide a curable composition that has excellent performances as a cation exchange membrane and that can be effectively manufactured, and a cured polymer product and to provide a cured polymer product of which the durability against an alkali treatment or an ultrasonic treatment is improved and in which the generation of pin holes is prevented.

Particularly, an object of the invention is to provide a curable composition and a cured polymer product having low water permeability and electrical resistance of a film and high selective permeability (hereinafter, simply referred to as "selective permeability") of an ion among the performances of the cation exchange membrane.

The present inventors have considered that the development of the crosslinkable monomer having plural sulfo groups and plural vinyl groups in the styrene-based crosslinkable monomer was important, have conducted research in various ways, have found that the problems above can be solved with an aromatic vinyl monomer having a specific structure, and have completed the invention.

The objects of the invention are achieved by the following means.

<1> A curable composition comprising: a compound expressed by General Formula (1) below; a polymerization initiator; and a chain transfer chain transfer agent, General Formula (1)

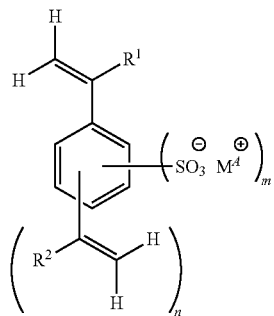

In General Formula (1), m represents an integer of 1 to 4, and n represents an integer of 1 to 4. Here, a sum of m and n is not greater than 5. $M^A$ represents a hydrogen ion, an inorganic ion, or an organic ion. Here, an inorganic ion and an organic ion may be bivalent or higher ions. Each of $R^1$ and $R^2$ independently represents a hydrogen atom or an alkyl group.

<2> The curable composition according to <1>, in which the compound expressed by General Formula (1) is expressed by General Formula (2) below.

General Formula (2)

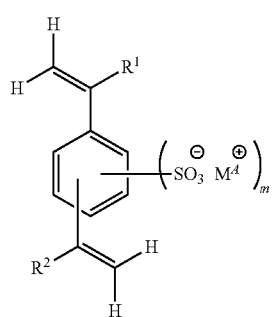

In General Formula (2), m represents an integer of 1 to 4, $M^A$ represents a hydrogen ion, an inorganic ion, or an organic ion, the inorganic ion and the organic ion may be bivalent or higher ions, and each of $R^1$ and $R^2$ independently represents a hydrogen atom or an alkyl group.

<3> The curable composition according to <1> or <2>, in which the polymerization initiator is any one of an alkyl-phenone compound, an acylphosphine oxide compound, and an oxime ester compound, and a chain transfer agent has a mercapto group.

<4> The curable composition according to any one of <1> to <3>, in which the polymerization initiator is expressed by any one of General Formulae (PI-1) to (PI-3) below.

General Formula (PI-1)

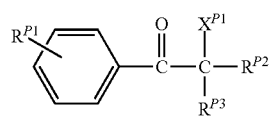

General Formula (PI-2)

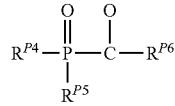

General Formula (PI-3)

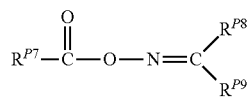

In General Formulae (PI-1) to (PI-3), $X^{P1}$ represents a hydroxy group or $—N(R^{Pa})(R^{Pb})$, each of $R^{Pa}$ and $R^{Pb}$ independently represents an alkyl group, $R^{Pa}$ and $R^{Pb}$ may be bonded to each other to form a ring, each of $R^{P1}$ to $R^{P3}$ independently represents a hydrogen atom, an alkyl group, an alkenyl group, an alkoxy group, an aryloxy group, or $—N(R^{Pc})(R^{Pd})$, each of $R^{Pc}$ and $R^{Pd}$ independently represents an alkyl group and may be bonded to each other to form a ring, and $R^{P2}$ and $R^{P3}$ are bonded to each other to form a ring.

$R^{P4}$ represents an alkyl group, an aryl group, an alkylthio group, or an arylthio group, $R^{P5}$ represents an alkyl group, an aryl group, an alkylthio group, an arylthio group, or an acyl group, and $R^{P6}$ represents an alkyl group or an aryl group. $R^{P7}$ represents an alkyl group, an alkenyl group, or an aryl group, $R^{P8}$ represents an alkyl group, an aryl group, or an acyl group, and $R^{P9}$ represents an alkyl group or an aryl group.

<5> The curable composition according to any one of <1> to <4>, in which the chain transfer agent is expressed by General Formula (CT) below.

$$H—Y-LL^1-LL-LL^2-S—H$$ General Formula (CT)

In General Formula (CT), LL represents a single bond or a linking group selected from an alkylene group that may have a substituent, —O—, —S—, $—N(R^{Ca})—$, or a combination thereof, $R^{Ca}$ represents a hydrogen atom or a substituent, each of $LL^1$ and $LL^2$ independently represents $—C(R^{C1})(R^{C2})—C(=O)O—$ in which an atom bonded to $—[C(R^{C1})(R^{C2})]a-$ or LL is an oxygen atom, each of $R^{C1}$ and $R^{C2}$ independently represents a hydrogen atom or an alkyl group, a represents 1 or 2, and Y represents a sulfur atom or an oxygen atom.

<6> The curable composition according to any one of <1> to <5>, in which 0.1 parts by mass to 10 parts by mass of the chain transfer agent is contained with respect to 1 part by mass of the polymerization initiator.

<7> The curable composition according to any one of <1> to <6>, further comprising: a polymer binder.

<8> The curable composition according to <7>, in which the polymer binder is a monomer unit derived from an aliphatic hydrocarbon-based monomer, and in which, in a state in which a copolymer is formed, a copolymer of a monomer unit not having an unsaturated bond in the monomer unit and a monomer unit based on a styrene-based monomer is contained.

<9> The curable composition according to <7>, in which the polymer binder contains a copolymer of a monomer unit based acrylonitrile and a monomer unit not having an unsaturated bond derived from an aliphatic hydrocarbon-based monomer.

<10> A cured polymer product obtained by polymerizing and curing the curable composition according to any one of <1> to <9>.

<11> The cured polymer product according to <10>, that is graft polymerized.

<12> The cured polymer product according to <11>, obtained by polymerizing and curing by active radiation graft polymerization.

<13> The cured polymer product according to any one of <10> to <12>, at least comprising: a polymer having a structural unit expressed by General Formula (I-1) below.

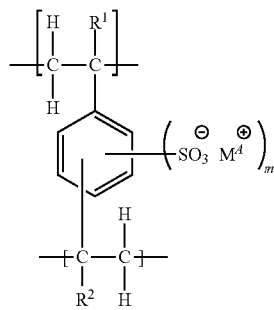

General Formula (I-1)

In General Formula (I-1), m represents an integer of 1 to 4, $M^A$ represents a hydrogen ion, an inorganic ion or an organic ion, an inorganic ion and an organic ion are bivalent or higher ions, and each of $R^1$ and $R^2$ independently represents a hydrogen atom or an alkyl group.

<14> The cured polymer product according to <13>, in which a content of a constitutional unit expressed by General Formula (I-1) is 10 mass % or greater with respect to a total mass of the cured polymer product.

<15> The cured polymer product according to any one of <10> to <14>, in which a content of the constitutional unit expressed by General Formula (A) below is 5 mass % or less with respect to a total mass of the cured polymer product.

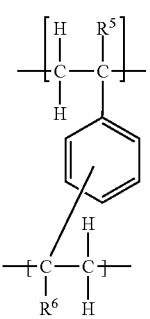

General Formula (A)

In General Formula (A), each of $R^5$ and $R^6$ independently represents a hydrogen atom or an alkyl group.

<16> The cured polymer product according to any one of <10> to <15>, in which an ion exchange capacity of the cured polymer product is 3.5 meq/g or greater.

<17> The cured polymer product according to any one of <10> to <16>, in which the cured polymer product is an ion exchange membrane, a proton conduction film, a reverse osmosis membrane, a forward osmosis membrane, a polymer electrolyte, or a water absorbing resin.

<18> A compound comprising: an organic or inorganic anion expressed by General Formula (1) below by 0.1 parts by mass to 1.0 parts by mass.

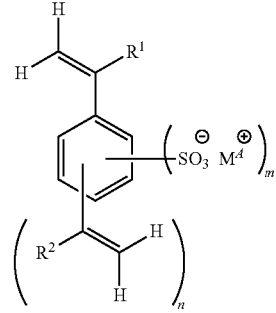

General Formula (1)

In General Formula (1), m represents an integer of 1 to 4, and n represents an integer of 1 to 4. Here, a sum of m and n is not greater than 5. $M^A$ represents a hydrogen ion, an inorganic ion, or an organic ion. Here, an inorganic ion and an organic ion may be bivalent or higher ions. Each of $R^1$ and $R^2$ independently represents a hydrogen atom or an alkyl group.

<19> A method of manufacturing a compound expressed by General Formula (1) according to <18>, comprising:
(i) reacting a compound expressed by General Formula (3) below with strong base in a hydrophilic solvent and precipitating a compound expressed by General Formula (1), and
(ii) recrystallizing crystal obtained by solid-liquid separation on the reaction liquid with a hydrophilic solvent.

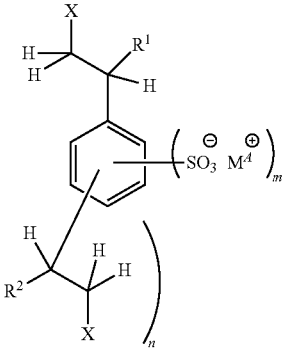

General Formula (3)

In General Formula (3), X represents a halogen atom or $R^A COO^-$, $R^A$ represents an alkyl group, a halogen substituted alkyl group, an alkenyl group, or an aryl group. m, n, $M^A$, $R^1$, and $R^2$ respectively have the same meanings as m, n, $M^A$, $R^1$, and $R^2$ of General Formula (1).

<20> The manufacturing method according to <19>, in which a hydrophilic solvent is water or alcohol.

<21> The manufacturing method according to <19> or <20>, in which a strong base is $M^a OH$, $(M^b)_{l1} CO_3$, or $(M^c)_{l2}(PO_4)_{l3}$. $M^a$, $M^b$, and $M^c$ represent a counter cation. l1 represents 1 or 2, l2 represents 1 or 3, and l3 represents 1 or 2.

In this specification, the expression "to" is used to have a meaning of including numerical values indicated before and after the expression "to" as a lower limit and an upper limit.

In this specification, unless described otherwise, a group simply described as a "substituent" refers to a substituent of a substituent group α below, and a substituent in the substituent group α is applied.

Unless described otherwise, in respective general formulae, in a case where there are plural groups indicated by the same reference numerals, the groups may be identical to or different from each other. In the same manner, in a case where there are plural repetitions of partial structures, the repetitions mean both of the identical repetitions or a mixture of different repetitions in the regulated range.

Unless otherwise described, a geometric isomer which is a substitution form of a double bond in respective general formulae may be an E isomer or a Z isomer, or a mixture thereof, even if one side of the isomer is described, for the convenience of the indication.

Unless otherwise described, an optical isomer may be an S isomer or an R isomer, or may be the mixture thereof, even if an optical isomer by steric arrangement of asymmetric carbon in respective general formulae is described in a general bond, for the convenience of the indication.

According to the specification, the expression "acryl" includes a group in which not only a methyl group but also an alkyl group are substituted at an α position of an acyl group such as acryl or methacryl, and used as an expression collectively referring to acids thereof, salts thereof, esters thereof, or amides thereof. That is, both of acrylic acid ester, amide, or acids or salts thereof and α-alkyl substituted acrylic acid ester, amide, or acids or salts thereof are included.

According to the invention, it is possible to provide a curable composition that has excellent performances as a cation exchange membrane and that can be effectively manufactured, and a cured polymer product. In the cured polymer product according to the invention, the durability against an alkali treatment or an ultrasonic treatment is improved and the generation of pin holes is prevented.

In the cation exchange membrane using the cured polymer product according to the invention, selective permeability is maintained to be in a high state, and thus a value of the product of the electrical resistance and the water permeability which is an index that maintains balance between the water permeability and the electrical resistance of the film to be low can be caused to be low.

Aforementioned and other characteristics and advantages of the invention can be revealed by the following description appropriately with reference to the accompanying drawings.

BRIEF DESCRIPTION OF THE DRAWINGS

FIG. 3 is a $^1$H-NMR spectrum of a water soluble aromatic vinyl monomer (M-2) synthesized in an example, in deuterated dimethyl sulfoxide (DMSO-d6).

FIG. 4 is a $^1$H-NMR spectrum of the water soluble aromatic vinyl monomer (M-2) synthesized in the example, in heavy water.

DESCRIPTION OF THE PREFERRED EMBODIMENTS

<<Composition for Curing>>

Figure 1:
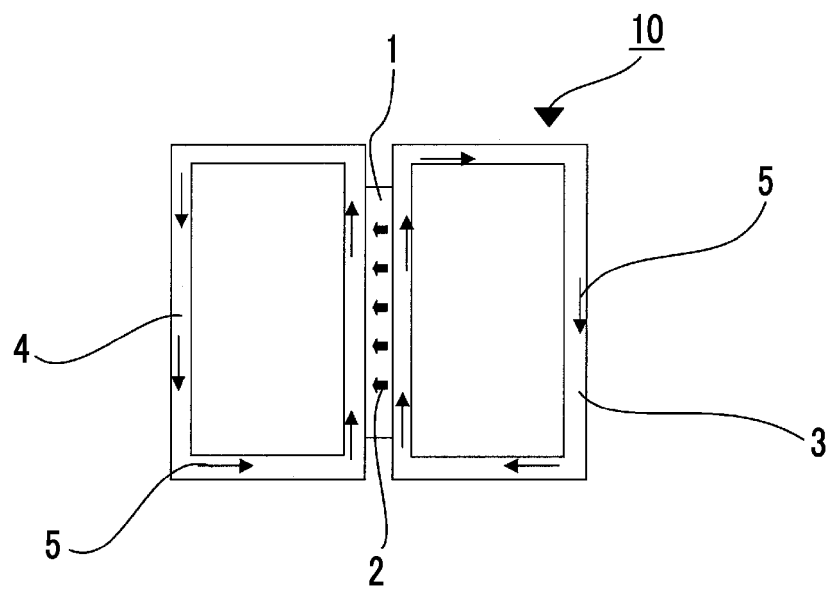
FIG. 1 is a diagram schematically illustrating a flow channel of a device for measuring water permeability of a film.

The curable composition according to the invention at least includes a compound expressed by General Formula (1) below, a polymerization initiator, and a chain transfer agent.

Hereinafter, the compound expressed by General Formula (1), the polymerization initiator, and the chain transfer agent are sequentially described.

<Compound Expressed by General Formula (1)>

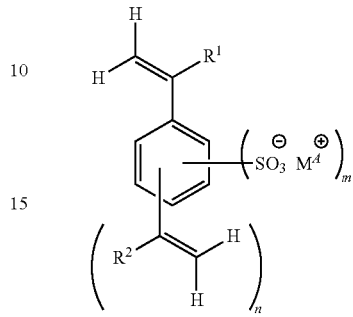

General Formula (1)

In General Formula (1), m represents an integer of 1 to 4, and n represents an integer of 1 to 4. Here, the sum of m and n is not greater than 5. $M^4$ represents a hydrogen ion, an inorganic ion, or an organic ion. Here, the inorganic ion and the organic ion may be a bivalent or higher ion. Each of $R^1$ and $R^2$ independently represents a hydrogen atom or an alkyl group.

Here, the compound expressed by General Formula (1) is an aromatic vinyl monomer. According to the invention, the compound expressed by General Formula (1) is particularly preferably water soluble. Here, according to the specification, the fact that the compound expressed by General Formula (1) is water soluble means that 5 g or greater of the compound expressed by General Formula (1) is dissolved in 100 ml of water at 25° C., 7 g or greater is preferably dissolved, and 10 g or greater is more preferably dissolved.

m is preferably an integer of 1 to 3 and more preferably 1 or 2.

n is preferably 1 or 2 and more preferably 1.

The inorganic ion in $M^4$ is preferably an alkali metal ion. Examples of the alkali metal ion preferably include a lithium ion, a potassium ion, and a sodium ion.

Examples of the organic ion in $M^4$ include an ammonium ion, a quaternary ammonium ion, a pyridinium ion, an imidazolium ion, and a morpholium ion.

$M^4$ is preferably a hydrogen ion or an inorganic ion, and a hydrogen ion, a lithium ion, a potassium ion, or a sodium ion is more preferable.

The alkyl group in $R^1$ and $R^2$ is a straight chain or branched alkyl group, preferably has 1 to 10 carbon atoms, more preferably has 1 to 5 carbon atoms, even more preferably has 1 to 3 carbon atoms, and particularly preferably has 1 carbon atom. Examples thereof include methyl, ethyl, isopropyl, t-butyl, n-octyl, 2-ethylhexyl, and n-decyl.

$R^1$ and $R^2$ each are preferably a hydrogen atom or methyl and more preferably a hydrogen atom.

According to the invention, the compound expressed by General Formula (1) is preferably a compound expressed by General Formula (2) below.

General Formula (2)

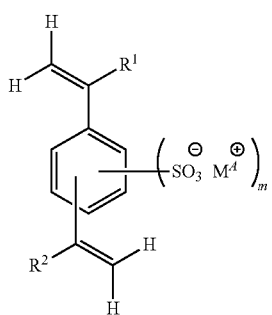

In General Formula (2), m, $M^A$, $R^1$, and $R^2$ respectively have the same meanings as m, $M^A$, $R^1$, and $R^2$ in General Formula (1) and preferable ranges thereof are also the same.

Hereinafter, specific examples of the compound expressed by General Formula (1) are provided, but the invention is not limited thereto.

An exemplary compound (M-5) represents a mixture of a compound in which any one of hydrogens of a benzene ring is substituted with two vinyl groups and one sulfo group.

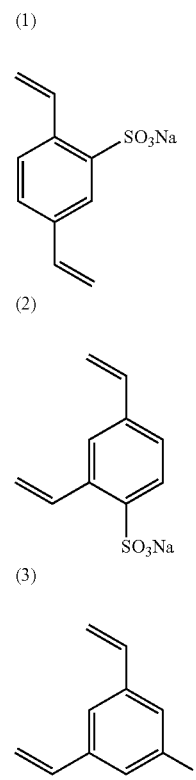

(1)

(2)

(3)

(4)

(5)

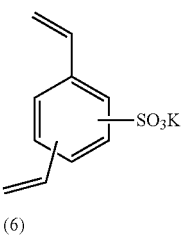

(6)

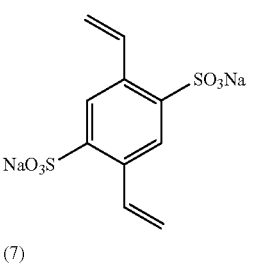

(7)

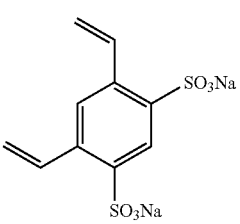

(8)

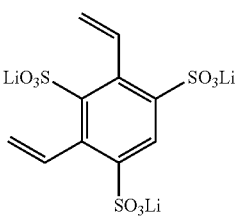

(9)

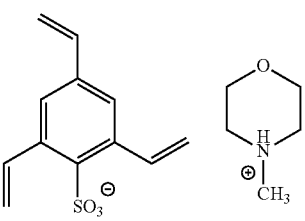

(10)

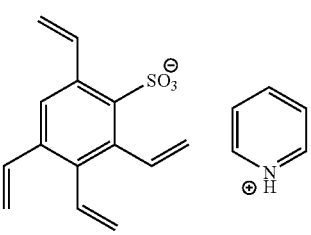

(11)

M-1

M-2

M-3

M-4

M-5

M-6

M-7

M-8

M-9

M-10

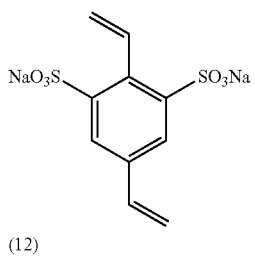

(12)

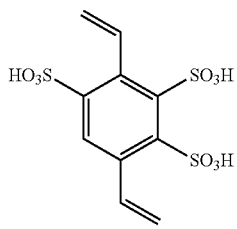

<Monofunctional Monomer>

The curable composition according to the invention may include at least one type of monofunctional monomers provided below. The monofunctional monomer is not particularly limited below, but specific examples thereof include 2-sulfoethyl methacrylate, 2-acrylamide-2-methyl-propanesulfonic acid, vinylsulfonate, p-, m-, o-styrenesulfonic acid, metal salts of p-, m-, o-styrenesulfonic acid, pyridinium salt or ammonium salt, acrylic acid, styrene, vinyltoluene, 4-methylstyrene, t-butylstyrene, α-methylstyrene, methacrylic anhydride, methacrylic acid, acrylic acid, n-vinylpyrrolidone, vinyltrimethoxysilane, vinyltriethoxysilane, vinyl-tris-(2-methoxyethoxy)silane, vinylidene chlorine, vinylidene fluoride, vinylmethyldimethoxysilane, 2,2,2-trifluoroethyl methacrylate, maleic anhydride, glycidyl methacrylate, hydroxyethyl methacrylate, methyl methacrylate, epoxycyclohexyl POSS (Registered Trademark) cage mixture (Product Name: EP0408), glycidyl POSS (Registered Trademark) cage mixture (Product Name: EP0409), methacryl POSS (Registered Trademark) cage mixture (Product Name: MA0735), acryloyl POSS (Registered Trademark) cage mixture (Product Name: MA0736), tris sulfonic acid ethyl POSS (Registered Trademark) (Product Name: SA1532) and tris sulfonic acid isobutyl POSS(Registered Trademark) (Product Name: SA1533) manufactured by Hybrid Plastics Inc.

Particularly, 2-sulfoethyl methacrylate, 2-acrylamide-2-methylpropanesulfonic acid, vinylsulfonate, Li, Mg, Al, Ca, Fe(II), and Fe(III) of p-, m-, o-styrenesulfonic acid, pyridinium salt, and an acrylic acid are more preferable.

<Polymerization Initiator>

The curable composition according to the invention includes a polymerization initiator.

Accordingly, the polymerizing and curing reaction effectively proceed, so as to obtain a cured polymer product.

The polymerization initiator may be any one of a photopolymerization initiator that can perform polymerization with active radiation irradiation or a thermal polymerization initiator that can perform polymerization with light, or both of the initiators may be used together.

Examples of the photopolymerization initiator that can perform polymerization with active radiation irradiation include an aromatic ketone compound (alkylphenone compound), an acylphosphine compound (preferably an acyl-phosphine oxide compound), an aromatic onium salt compound, organic oxide, a thio compound, a hexaarylbiimidazole compound, an oxime ester compound (including a ketoxime ester compound), a borate compound, an azinium compound, a metallocene compound, an active ester compound, a compound having a carbon halogen bond, or an alkylamine compound.

Examples of the thermal polymerization initiator that can perform polymerization with heat include an oil soluble peroxide-based thermal polymerization initiator such as benzoyl peroxide (BPO), an oil soluble azo-based thermal polymerization initiator such as azobisisobutyronitrile (AIBN), and a water soluble azo-based thermal polymerization initiator such as azobis cyano valerate (ACVA). In the case where a water ratio in the solvent of the solution polymerization is great, a water soluble peroxide-based thermal polymerization initiator such as ammonium persulfate or potassium persulfate, aqueous hydrogen peroxide, or the like can be used. A redox agent such as ferrocene or amines can be combined.

Preferably examples of the aromatic ketone compound, the acylphosphine compound, and the thio compound include compounds having a benzophenone skeleton or a thioxanthone skeleton disclosed in "RADIATION CURING IN POLYMER SCIENCE AND TECHNOLOGY", pages 77 to 117 (1993). More preferable examples include an α-thiobenzophenone compound disclosed in JP1972-6416B (JP-S47-6416B), a benzoin ether compound disclosed in JP1972-3981B (JP-S47-3981B), an a-substituted benzoin compound disclosed in JP1972-22326B (JP-S47-22326B), a benzoin derivative disclosed in JP1972-23664B (JP-S47-23664B), an aroyl phosphonic acid ester compound disclosed in JP1982-30704A (JP-S57-30704A), a dialkoxybenzophenone compound disclosed in JP1985-26483B (JP-S60-26483B), benzoin ether compounds disclosed in JP1985-26403B (JP-S60-26403B) and JP1987-81345A (JP-S62-81345A), α-aminobenzophenone compounds disclosed in JP1989-34242B (JP-H01-34242B), U.S. Pat. No. 4,318,791A, and EP0284561A1, a p-di(dimethylaminobenzoyl) benzene compound disclosed in JP1990-211452A (JP-H02-211452A), a thio-substituted aromatic ketone compound disclosed in JP1986-194062A (JP-S61-194062A), acylphosphinesulfide disclosed in JP1990-9597B (JP-H02-9597B), an acylphosphine compound disclosed in JP1990-9596B (JP-H02-9596B), a thioxanthone compound disclosed in JP1988-61950B (JP-S63-61950B), and a coumarin compound disclosed in JP1984-42864B (JP-S59-42864B). Polymerization initiators disclosed in JP2008-105379A and JP2009-114290A are also preferable. Examples of the polymerization initiators disclosed in pages 65 to 148 of "ULTRAVIOLET LIGHT CURING SYSTEM" (issued by General Technology Center, 1989) written by KATO Kiyomi.

According to the invention, among these polymerization initiators, a photopolymerization initiator that can perform polymerization with active radiation irradiation is preferable, and an alkylphenone compound, an acylphosphine oxide compound, or an oxime ester compound is more preferable.

An alkylphenone compound, an acylphosphine oxide compound, or an oxime ester compound is preferably an polymerization initiator expressed by any one of General Formulae (PI-1) to (PI-3) below.

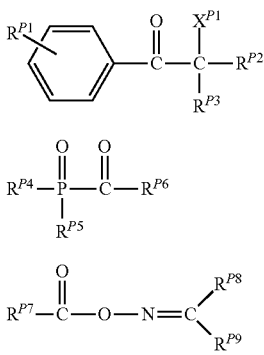

General Formula (PI-1)

$$R^{P4}-\overset{O}{\underset{R^{P5}}{\overset{\|}{P}}}-\overset{O}{\overset{\|}{C}}-R^{P6}$$

General Formula (PI-2)

$$R^{P7}-\overset{O}{\overset{\|}{C}}-O-N=C\overset{R^{P8}}{\underset{R^{P9}}{}}$$

General Formula (PI-3)

In General Formulae (PI-1) to (PI-3), $X^{P1}$ represents a hydroxy group or $-N(R^{Pa})(R^{Pb})$. Here, each of $R^{Pa}$ and $R^{Pb}$ independently represents an alkyl group, and $R^{Pa}$ and $R^{Pb}$ are bonded to each other to form a ring. Each of $R^{P1}$ to $R^{P3}$ independently represents a hydrogen atom, an alkyl group, an alkenyl group, an alkoxy group, an aryloxy group, or $-N(R^{Pc})(R^{Pd})$. Here, each of $R^{Pc}$ and $R^{Pd}$ independently represents an alkyl group, and $R^{Pc}$ and $R^{Pd}$ are bonded to each other to form a ring. $R^{P2}$ and $R^{P3}$ are bonded to each other to form a ring.

$R^{P4}$ represents an alkyl group, an aryl group, an alkylthio group, or an arylthio group, $R^{P5}$ represents an alkyl group, an aryl group, an alkylthio group, an arylthio group, or an acyl group, and $R^{P6}$ represents an alkyl group or an aryl group.

$R^{P7}$ represents an alkyl group, an alkenyl group, or an aryl group, $R^{P8}$ represents an alkyl group, an aryl group, or an acyl group, and $R^{P9}$ represents an alkyl group or an aryl group.

The number of carbon atoms of the alkyl group of $R^{Pa}$ and $R^{Pb}$ in $X^{P1}$ is preferably 1 to 10, more preferably 1 to 6, even more preferably 1 to 4, and particularly preferably 1 or 2. A ring formed by bonding $R^{Pa}$ and $R^{Pb}$ to each other is preferably a five-membered or six-membered ring and more preferably a pyrrolidine ring, a piperidine ring, a piperazine ring, a morpholine ring, or a thiomorpholine ring.

$X^{P1}$ is preferably a hydroxy group.

The number of carbon atoms of the alkyl group in $R^{P1}$ to $R^{P3}$ is preferably 1 to 18 and more preferably 1 to 12. Here, an alkyl group may have a substituent. Examples of this substituent include a substituent α described below, and an aryl group, a hydroxy group, an alkoxy group, an alkylthio group, an aryloxy group, an arylthio group, or a halogen atom is preferable. Examples of the alkyl group include methyl, ethyl, isopropyl, n-butyl, t-butyl, and 2-ethylhexyl.

The number of carbon atoms of the alkenyl group in $R^{P1}$ to $R^{P3}$ is preferably 2 to 10, more preferably 2 to 6, and even more preferably 2 or 3. Here, an alkenyl group may have a substituent, and examples of this substituent include the substituent α described below. Examples of the alkenyl group include vinyl and allyl.

The number of carbon atoms of the alkoxy group in $R^{P1}$ to $R^{P3}$ is preferably 1 to 10, more preferably 1 to 6, and even more preferably 1 or 2. Here, an alkoxy group may have a substituent. Examples of this substituent include the substituent α described below, and an alkyl group, an aryl group, a hydroxy group, an alkoxy group, an alkylthio group, an aryloxy group, an arylthio group, or a halogen atom is preferable. Examples of the alkoxy group include methoxy, ethoxy, isopropoxy, n-butoxy, 2-hydroxyethyloxy, and 2-ethylhexyloxy.

The number of carbon atoms of the aryloxy group in $R^{P1}$ to $R^{P3}$ is preferably 6 to 10 and more preferably 6 to 8. Here, the aryloxy group may have a substituent, and examples of the substituent include the substituent α described below, and an alkyl group, an aryl group, a hydroxy group, an alkoxy group, an alkylthio group, an aryloxy group, an arylthio group, or a halogen atom is preferable. Examples of the aryloxy group include phenoxy and naphthoxy.

$R^{Pc}$ and $R^{Pd}$ in $-N(R^{Pc})(R^{Pd})$ of $R^{P1}$ to $R^{P3}$ represent alkyl groups. The number of carbon atoms of the alkyl group is preferably 1 to 10, more preferably 1 to 6, and even more preferably 1 or 2. Examples of the alkyl group include methyl, ethyl, isopropyl, n-butyl, t-butyl, and 2-ethylhexyl.

A ring formed by bonding $R^{Pc}$ and $R^{Pd}$ to each other is preferably a five-membered or six-membered ring, and examples thereof include a pyrrolidine ring, piperidine ring, a piperazine ring, a morpholine ring, and a thiomorpholine ring.

The ring formed by bonding $R^{P2}$ and $R^{P3}$ to each other is preferably a five-membered or six-membered ring, and examples thereof include cyclopentane and cyclohexane.

In the case where $X^{P1}$ is a hydroxy group, $R^{P1}$ is preferably a hydrogen atom, an alkyl group, and an alkoxy group, and $R^{P2}$ and $R^{P3}$ are preferably an alkyl group.

In the case where $X^{P1}$ is $-N(R^{Pa})(R^{Pb})$, $R^{P1}$ is preferably a hydrogen atom, an alkyl group, an alkoxy group, and $-N(R^{Pc})(R^{Pd})$ and more preferably $-N(R^{Pc})(R^{Pd})$, $R^{P2}$ and $R^{P3}$ are preferably alkyl groups, and at least one of these is preferably a benzyl group.

The alkyl groups in $R^{P4}$ to $R^{P6}$ have the same meanings as the alkyl groups in $R^{P1}$ to $R^{P3}$ and the preferable ranges thereof are also the same.

The number of carbon atoms of the aryl group in $R^{P4}$ to $R^{P6}$ is preferably 6 to 10 and more preferably 6 to 8. Here, an aryl group may have a substituent, and examples of this substituent include the substituent α described below, and an alkyl group, an aryl group, a hydroxy group, an alkoxy group, an alkylthio group, an aryloxy group, an arylthio group, or a halogen atom is preferable. Examples of the aryl group include phenyl, naphthyl, 2,4,6-trimethylphenyl, and 4-methylphenyl.

The number of carbon atoms of the alkylthio group in $R^{P4}$ and $R^{P5}$ is preferably 1 to 10, more preferably 1 to 6, and even more preferably 1 or 2. Here, an alkylthio group may have a substituent, and examples of this substituent include the substituent α described below. An alkyl group, an aryl group, a hydroxy group, an alkoxy group, an alkylthio group, an aryloxy group, an arylthio group, or a halogen atom is preferable. Examples of the alkylthio group include methylthio, ethylthio, isopropylthio, n-butylthio, 2-hydroxyethylthio, and 2-ethylhexylthio.

The number of carbon atoms of the arylthio group in $R^{P4}$ and $R^{P5}$ is preferably 6 to 10 and more preferably 6 to 8. Here, an arylthio group may have a substituent, and examples of this substituent include the substituent α described below. An alkyl group, an aryl group, a hydroxy group, an alkoxy group, an alkylthio group, an aryloxy group, an arylthio group, or a halogen atom is preferable. Examples of the arylthio group include phenylthio and naphthylthio.

The number of carbon atoms of the acyl group in $R^{P5}$ is preferably 1 to 18 and more preferably 2 to 16. Here, the acyl group may have a substituent, and examples of this substituent include the substituent α described below. An alkyl group, an aryl group, a hydroxy group, an alkoxy group, an alkylthio group, an aryloxy group, an arylthio group, or a halogen atom is preferable.

The acyl group may be any one of an alkylcarbonyl group, an alkenylcarbonyl group, and an arylcarbonyl group, but an arylcarbonyl group is preferable.

Examples of the acyl group include formyl, acetyl, acryloyl, benzoyl, 2,4,6-trimethylbenzoyl, and 4-arylthiobenzoyl.

$R^{P4}$ is preferably an aryl group or an acyl group, $R^{P5}$ is preferably an aryl group, and $R^{P6}$ is preferably an aryl group.

The alkyl group and the alkenyl group in $R^{P7}$ have the same meanings as the alkyl groups and the alkenyl groups in $R^{P1}$ to $R^{P3}$, and the preferable ranges thereof are also the same.

The number of carbon atoms of the aryl group in $R^{P7}$ is preferably 6 to 30 and more preferably 6 to 25.

The aryl group is preferably a phenyl group, and this phenyl group may be condensed with hetero rings. As a ring condensed in this manner, a carbazole ring is preferable.

The aryl group may have a substituent, and examples this substituent include the substituent α described below. An alkyl group, an aryl group, a hydroxy group, an alkoxy group, an alkylthio group, an aryloxy group, an arylthio group, an acyl group, or a halogen atom is preferable.

The alkyl group in $R^{P8}$ has the same meaning as the alkyl groups in $R^{P1}$ to $R^{P3}$. The number of carbon atoms of the alkyl group is preferably 1 to 10 and more preferably 1 to 8.

The aryl group in $R^{P8}$ has the same meaning as aryl groups in $R^{P4}$ to $R^{P6}$, and the preferable range thereof is also the same.

The acyl group in $R^{P8}$ has the same meaning as the acyl group in $R^{P5}$, and the preferable range thereof is also the same.

The alkyl group in $R^{P9}$ has the same meaning as the alkyl groups in $R^{P1}$ to $R^{P3}$. The number of carbon atoms of the alkyl group is preferably 1 to 10 and more preferably 1 to 8.

The aryl group in $R^{P9}$ has the same meaning as the aryl groups in $R^{P4}$ to $R^{P6}$, and the preferable range thereof is also the same.

$R^{P7}$ and $R^{P8}$ each are preferably an alkyl group or an aryl group and $R^{P9}$ is preferably an alkyl group.

The polymerization initiator according to the invention is preferably a water soluble polymerization initiator.

Here, the fact that the polymerization initiator is water soluble means that 0.1 mass % or greater of the polymerization initiator is dissolved in distilled water at 25° C. The water soluble polymerization initiator is more preferably dissolved by 1 mass % or greater and even more preferably dissolved by 3 mass % or greater in distilled water at 25° C.

Hereinafter, specific examples of the polymerization initiator expressed by any one of General Formulae (PI-1) to (PI-3) are provided below, but the invention is not limited thereto.

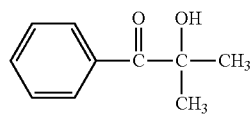
(PI-1-1)

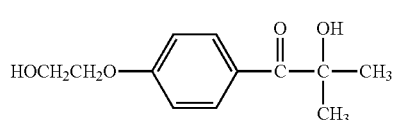
(PI-1-2)

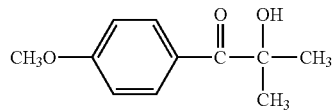
(PI-1-3)

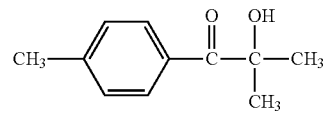
(PI-1-4)

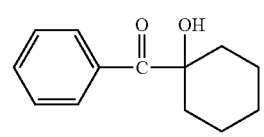
(PI-1-5)

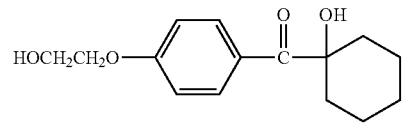
(PI-1-6)

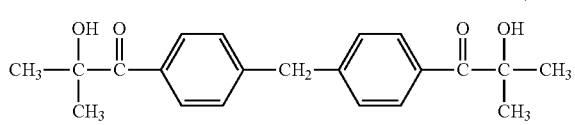
(PI-1-7)

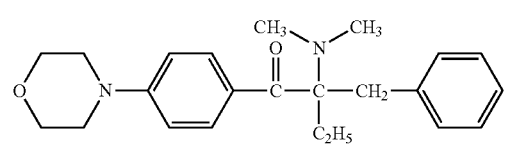
(PI-1-8)

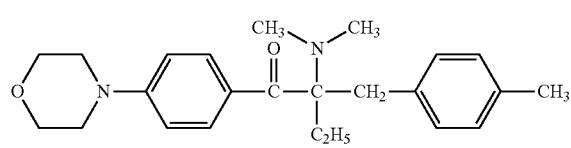
(PI-1-9)

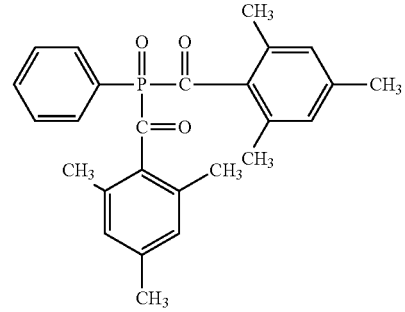
(PI-2-1)

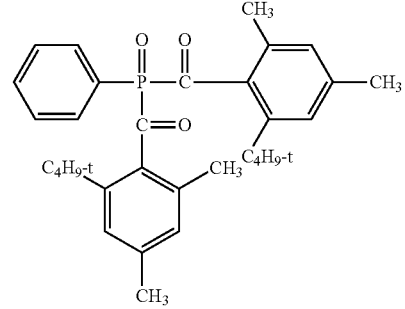
(PI-2-2)

-continued
(PI-2-3)
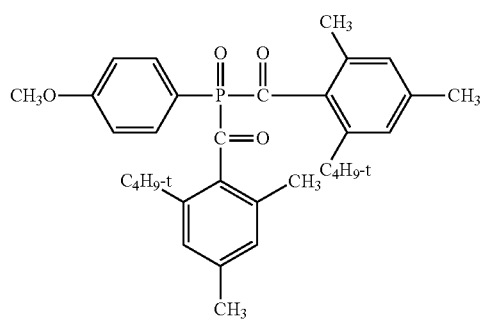
(PI-2-4)
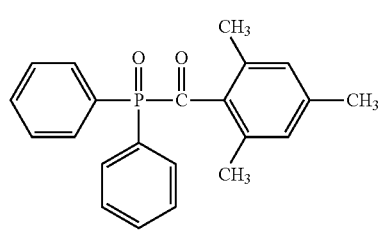
(PI-2-5)
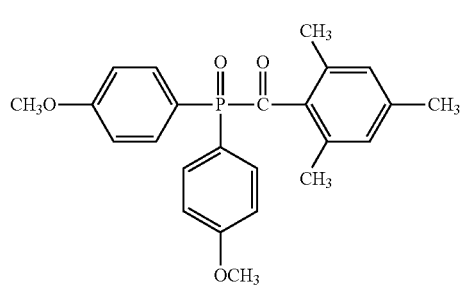
(PI-2-6)
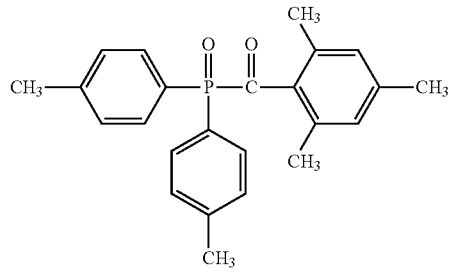
(PI-2-7)
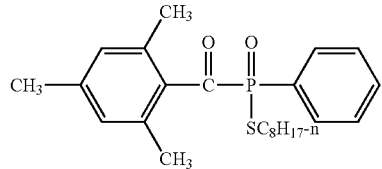
(PI-2-8)
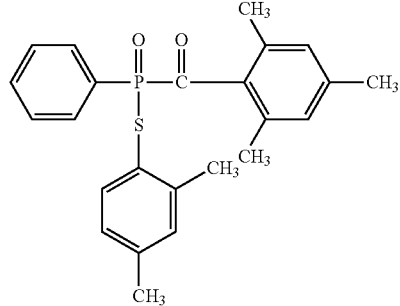
-continued
(PI-2-9)
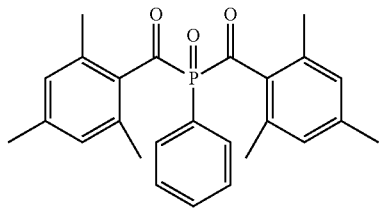
(PI-3-1)
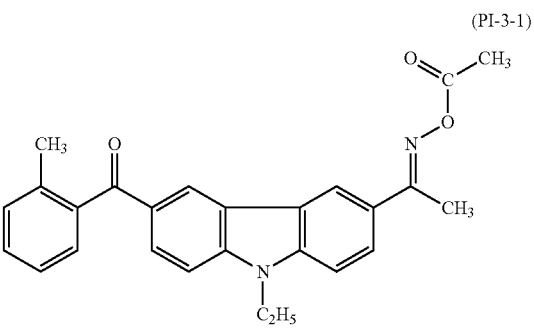
(PI-3-2)
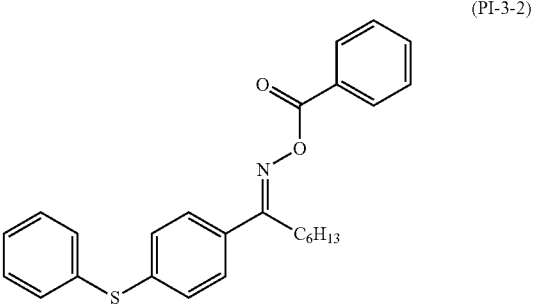
(PI-3-3)
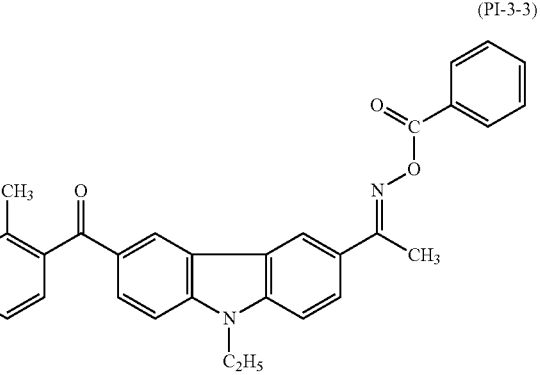
(PI-3-4)
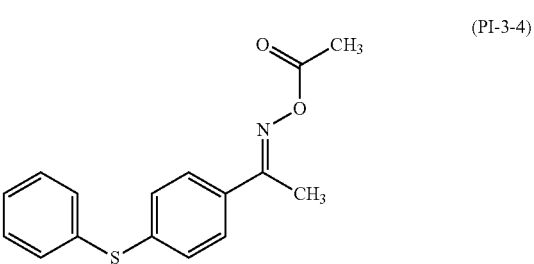

(PI-3-5)

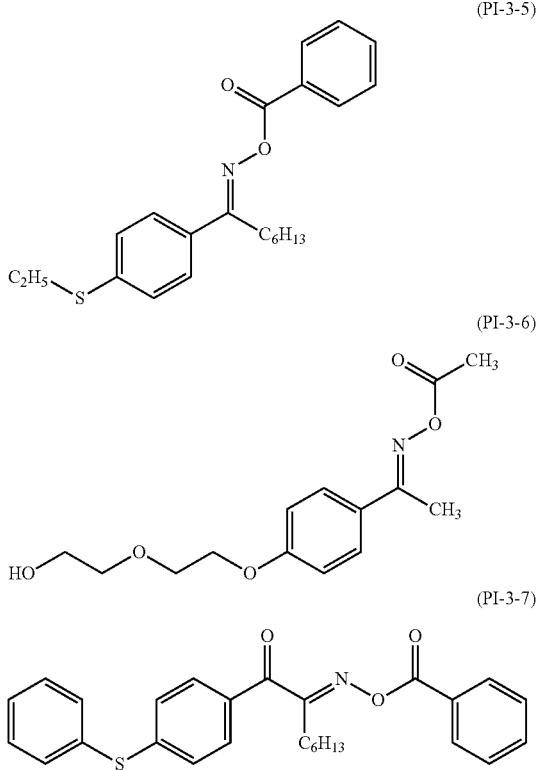

(PI-3-6)

(PI-3-7)

The polymerization initiator expressed by any one of General Formulae (PI-1) to (PI-3) can be obtained from BASF Japan Ltd. or the like and can be synthesized by the same synthesizing method of commercially available products.

According to the invention, the content of the polymerization initiator is preferably 0.1 parts by mass to 10 parts by mass, more preferably 0.1 parts by mass to 5 parts by mass, and even more preferably 0.3 parts by mass to 2 parts by mass with respect to 100 parts by mass which is the total solid content in the curable composition.

<Chain Transfer Agent>

The curable composition according to the invention includes a chain transfer agent.

Accordingly, chemical characteristics or physical and chemical characteristics of the cured polymer product that can be obtained in the polymerizing and curing reaction can be adjusted.

The chain transfer agent is not particularly limited. However, a compound having a mercapto group is preferable, and a compound having at least two mercapto groups is more preferable.

Among these, a compound expressed by General Formula (CT) below is preferable as this chain transfer agent.

     General Formula (CT)

In General Formula (CT), LL represents a single bond, an alkylene group that may have a substituent, —O—, —S—, —N($R^{Ca}$)—, or a linking group obtained by combining these. Here, $R^{Ca}$ represents a hydrogen atom or a substituent. Each of $LL^1$ and $LL^2$, independently represents —C($R^{C1}$)($R^{C2}$)—C(=O)O— in which an atom bonded to —[C($R^{C1}$)($R^{C2}$)]a- or LL is an oxygen atom. Here, each of $R^{C1}$ and $R^{C2}$ independently represents a hydrogen atom or an alkyl group, and a represents 1 or 2. Y represents a sulfur atom or an oxygen atom.

The number of carbon atoms of the alkylene group in LL is preferably 1 to 12, more preferably 1 to 8, and examples thereof include methylene, ethylene, propylene, isopropylene, tetramethylene, hexamethylene, octamethylene, decamethylene, and dodecamethylene.

The substituent that may be included in the alkylene group include the substituent α below, and examples thereof preferably include an alkyl group, a hydroxy group, a mercapto group, —$CH_2C(=O)O$—[C($R^{CT1}$)($R^{CT2}$)]$_c$$X^{CT1}$, and $CH_2O$—$CH_2C\{CH_2C(=O)O$—[C($R^{CT1}$)($R^{CT2}$)]$_c$—$X^{CT1}\}_3$. Here, each of $R^{CT1}$ and $R^{CT2}$ independently represents a hydrogen atom or an alkyl group, c represents 1 or 2. $X^{CT1}$ represents a hydrogen atom or SH.

The number of carbon atoms of the substituent in $R^{Ca}$ is preferably 1 to 10, more preferably 1 to 8, and even more preferably 1 to 6.

The substituent in $R^{Ca}$ is preferably an alkyl group, an aryl group, -alkylene-SH, or -arylene-SH, -alkylene-SH is preferable, —$(CH_2)_2$—SH or —$(CH_2)_3$—SH is more preferable, and —$(CH_2)_2$—SH is even more preferable.

Examples of the alkylene group that may have a substituent in LL or a linking group with which —O—, —S—, and —N($R^{Ca}$)— are combined include alkylene-O-alkylene, alkylene-S-alkylene, alkylene-N($R^{Ca}$)-alkylene. As this alkylene, ethylene or propylene is preferable, and ethylene is more preferable.

The number of carbon atoms of the alkyl group in $R^{C1}$ and $R^{C2}$ is preferably 1 to 10, more preferably 1 to 6, even more preferably 1 or 2, and particularly preferably 1.

$R^{C1}$ and $R^{C2}$ are preferably a hydrogen atom or methyl and most preferably a hydrogen atom.

a represents 1 or 2, and preferably 2.

Accordingly, the compound expressed by General Formula (CT) is preferably a compound expressed by General Formula (CTA) below.

General Formula (CTA)

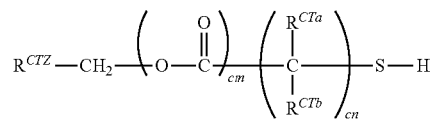

In General Formula (CTA), $R^{CTZ}$ represents —SH, —OH, or —*C($R^{CTc}$)($R^{CTd}$)($R^{CTe}$). * represents a carbon atom that is bonded to a carbon atom of methylene. Each of $R^{CTc}$, $R^{CTd}$, and $R^{CTe}$ independently represent an unsubstituted alkyl group, —$CH_2OH$, —$CH_2(OC=O)_{cm}$[C($R^{CTa}$)($R^{CTb}$)]$_{cn}$SH, or —$CH_2OCH_2C\{CH_2(OC=O)_{cm}$[C($R^{CTa}$)($R^{CTb}$)]$_{cn}$SH$\}_3$. ** represents a carbon atom that is bonded to *C. However, not all of $R^{CTc}$ to $R^{CTe}$ are unsubstituted alkyl groups or —$CH_2OH$. Each of $R^{CTa}$ and $R^{CTb}$ independently represents a hydrogen atom, an alkyl group, or a hydroxy group. Here, in the case where cn is 2 or greater, $R^{CTa}$ and $R^{CTb}$ on carbon atoms that are bonded to a sulfur atom are hydrogen atoms or alkyl groups. cm represents 0 or 1, and cn represents an integer of 1 to 12.

The number of carbon atoms of the alkyl group in $R^{CTa}$ and $R^{CTb}$ is preferably 1 to 10, more preferably 1 to 6, even more preferably 1 or 2, and particularly preferably 1.

The number of carbon atoms of the alkyl group in $R^{CTc}$, $R^{CTd}$, and $R^{CTe}$ is preferably 1 to 10, more preferably 1 to 6, even more preferably 1 or 2, and particularly preferably 1.

cn is preferably an integer of 1 to 10 and more preferably an integer of 1 to 6.

$R^{CTZ}$ is preferably —SH.

Hereinafter, specific examples of the chain transfer agent expressed by General Formula (CT) are provided, but the invention is not limited thereto.
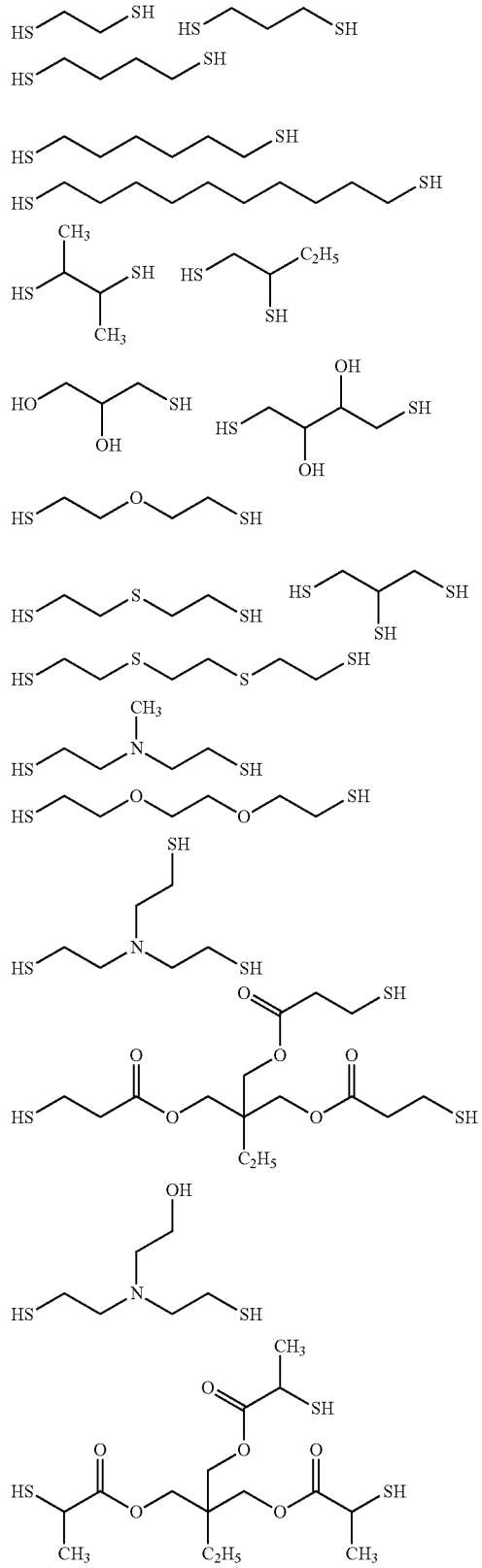
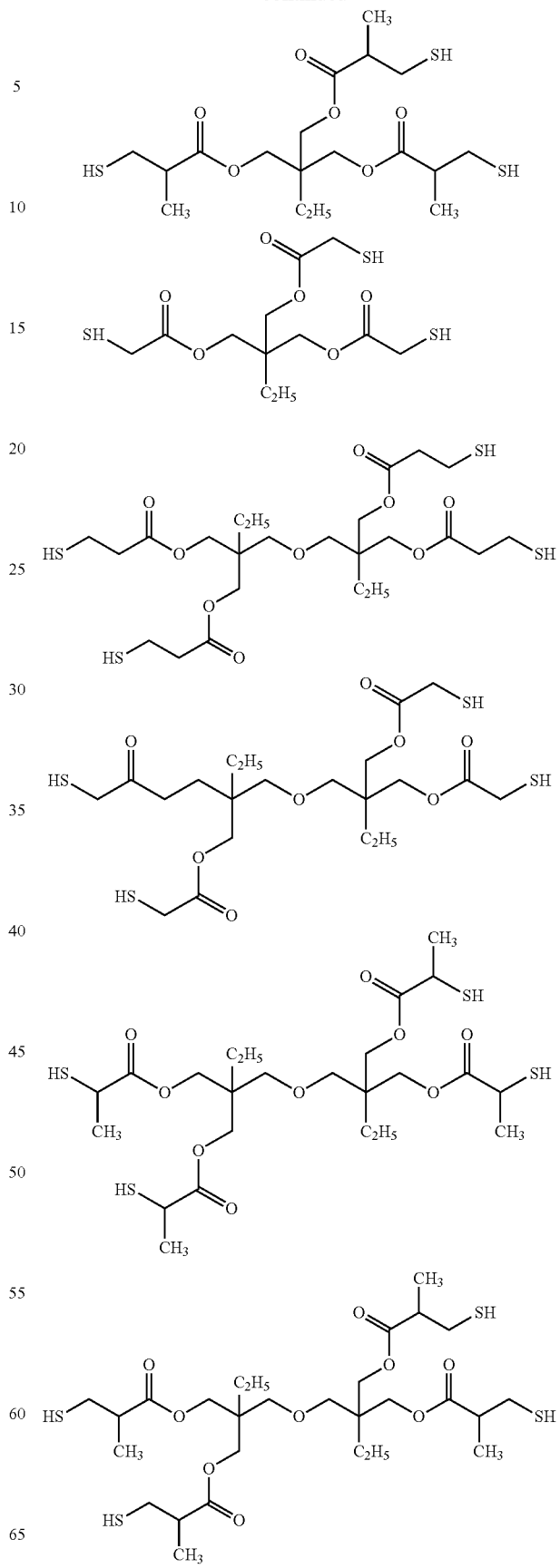

23
-continued
24
-continued
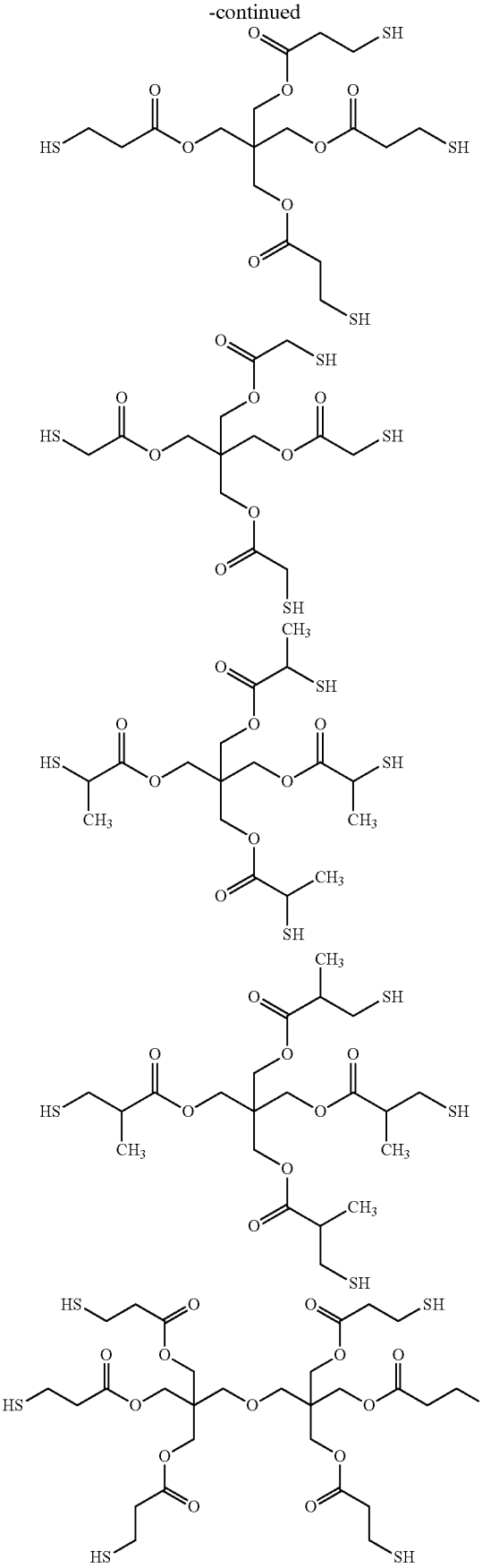
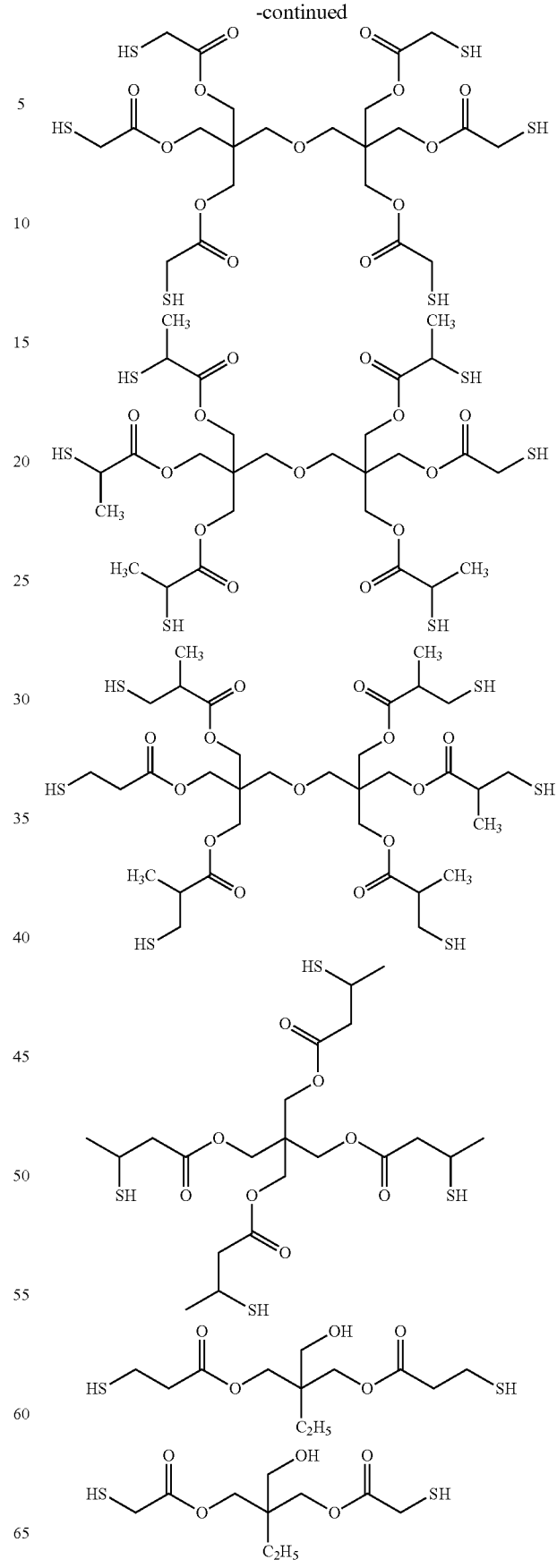

25
-continued
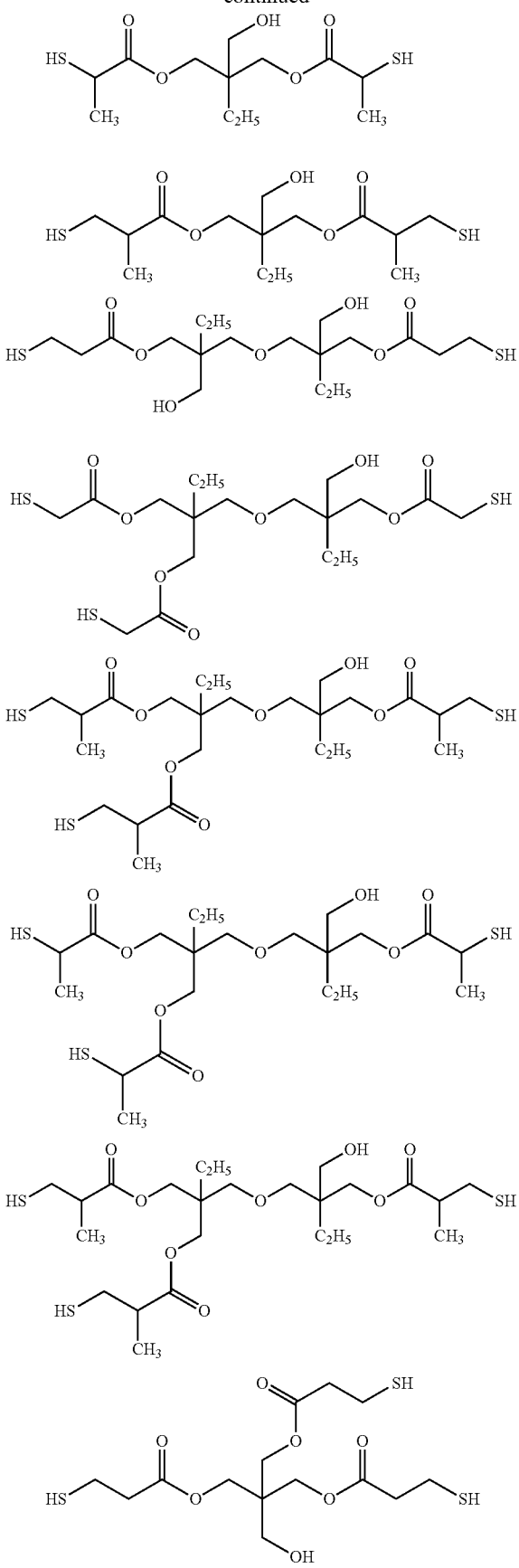
26
-continued
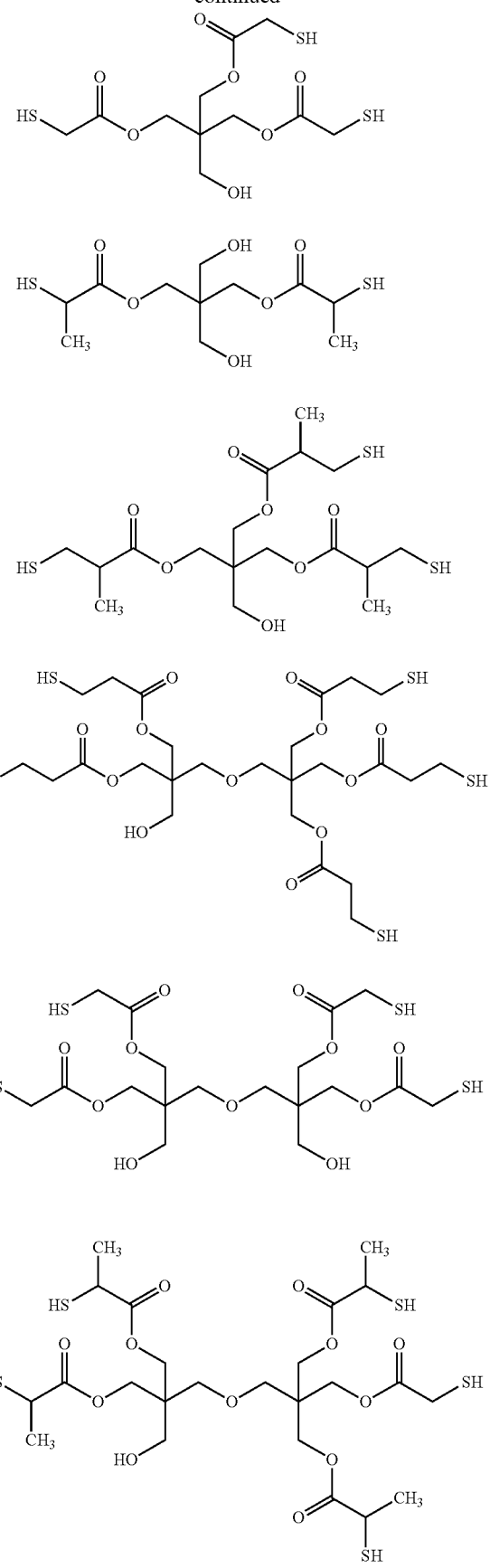

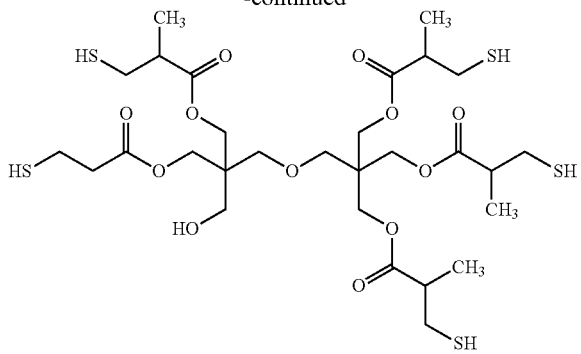

According to the invention, the content of the chain transfer agent is preferably 0.1 parts by mass to 10 parts by mass and particularly preferably 0.5 parts by mass to 5 parts by mass with respect to 1 part by mass of the polymerization initiator.

<Polymerization Inhibitor>

According to the invention, the polymerization inhibitor preferably included in the curable composition.

As the polymerization inhibitor, an arbitrary polymerization inhibitor can be used, and examples thereof include a phenol compound, a hydroquinone compound, an amine compound, and a mercapto compound.

Specific examples of the phenol compound include hindered phenol (phenol having a t-butyl group in an ortho position, and examples thereof typically include 2,6-di-t-butyl-4-methylphenol), and bisphenol. Specific examples of the hydroquinone compound include mono methyl ether hydroquinone. Specific examples of the amine compound include N-nitroso-N-phenylhydroxylamine, and N,N-diethylhydroxylamine.

These polymerization inhibitors may be used singly or two or more types thereof may be used in combination.

The content of the polymerization inhibitor is preferably 0.01 parts by mass to 5 parts by mass, more preferably 0.01 parts by mass to 1 part by mass, and even more preferably 0.01 parts by mass to 0.5 parts by mass with respect to 100 parts by mass which is the total solid content of the curable composition.

<Solvent>

The curable composition according to the invention may include a solvent. The content of the solvent in the curable composition is preferably 5 mass % to 50 mass %, more preferably 10 mass % to 45 mass %, and even more preferably 10 mass % to 40 mass % with respect to the entire curable composition.

If the solvent is included, the curing (polymerization) reaction is evenly and smoothly proceed. In the case where the curable composition is impregnated to the porous support, impregnation smoothly proceeds.

As the solvent, water or a mixed liquid of water and a solvent of which solubility with water is 5 mass % or greater is preferably used, a solvent that is freely mixed with water is preferable. Therefore, a solvent selected from water and a water soluble solvent is preferable.

As the water soluble solvent, an alcohol-based solvent, an ether-based solvent, an amide-based solvent, a ketone-based solvent, a sulfoxide-based solvent, a sulfon-based solvent, a nitrile-based solvent, and an organic phosphorus-based solvent which are aprotic polar solvents are particularly preferable.

Examples of the alcohol-based solvent include methanol, ethanol, isopropanol, n-butanol, ethylene glycol, propylene glycol, diethylene glycol, and dipropylene glycol. The alcohol-based solvents may be used singly or two or more types thereof may be used in combination.

With respect to the aprotic polar solvent, preferable solvents include dimethyl sulfoxide, dimethyl imidazolidinone, sulfolane, N-methylpyrrolidone, dimethylformamide, acetonitrile, acetone, dioxane, tetramethylurea, hexamethylphosphoramide, hexamethylphosphorotriamide, pyridine, propionitrile, butanone, cyclohexanone, tetrahydrofuran, tetrahydropyran, ethylene glycol diacetate, and γ-butyrolactone. Among these, dimethyl sulfoxide, N-methylpyrrolidone, dimethylformamide, dimethyl imidazolidinone, sulforane, acetone, acetonitrile, and tetrahydrofuran are preferable. The aprotic polar solvents may be used singly or two or more types thereof may be used in combination.

<Other Components>

In addition to the components described above, the curable composition according to the invention may include a polymer binder, a surfactant, a polymer dispersant, a viscosity improver, a surface tension adjuster, a preservative, and an anti-crater agent.

<Polymer Binder>

The curable composition according to the invention preferably includes a polymer binder. If the polymer binder is included, the elasticity of the ion exchange membrane is enhanced and the flexibility is enhanced.

The curable composition according to the invention is a monomer unit derived from the aliphatic hydrocarbon-based monomer. In the state in which the copolymer is formed, it is particularly preferable that a copolymer (styrene copolymer) of a monomer unit not having an unsaturated bond in a monomer unit and a monomer unit based on a styrene-based monomer is contained.

As the styrene-based monomer forming this copolymer, styrene, an aromatic ring of styrene, or a styrene substitutent in which a substituent such as a halogen group, an alkyl group, or a haloalkyl group is introduced to a vinyl group is used without particular limitation. Examples of this styrene substitutent include vinyltoluene, vinylxylene, chlorostyrene, chloromethylstyrene, α-methylstyrene, α-halogenated styrene, and α,β,β'-trihalogenated styrene.

Meanwhile, as an aliphatic hydrocarbon-based monomer that becomes another constituent component of the copolymer, unsaturated aliphatic hydrocarbon and preferably unsaturated aliphatic hydrocarbon having 2 to 9 carbon atoms is used without particular limitation. In this case, as the unsaturated aliphatic hydrocarbon, specifically, olefin such as ethylene, propylene, or butylene or conjugated diolefin such as butadiene or isoprene is preferably used.

Particularly, a styrene-butadiene copolymer is preferably subjected to hydrogenation reaction.

Here, a "monomer unit not having an unsaturated bond in a monomer unit" means that an unsaturated bond remained in hydrogenation in the monomer unit after polymerization of a conjugated diolefin such as butadiene and isoprene is converted to a saturated bond.

The curable composition according to the invention preferably contains a copolymer (acrylonitrile copolymer) of a monomer unit based on acrylonitrile and a monomer unit not having an unsaturated bond derived from an aliphatic hydrocarbon-based monomer. This aliphatic hydrocarbon-based monomer has the same meaning as the aliphatic hydrocarbon-based monomer in the copolymer with a monomer unit based on the styrene-based monomer, and the preferable ranges thereof are also the same.

Particularly, the copolymer of the acrylonitrile-butadiene is preferably subjected to the hydrogenation reaction.

In the copolymer of the monomer unit based on acrylonitrile and a copolymer of an aliphatic hydrocarbon-based unit, an iodine value thereof is preferably 10 to 50. The contents of the respective constitutional units are not particularly limited. However, if compatibility with a monomer having an appropriate functional group to the introduction of the ion exchange group or elasticity of the obtained copolymer are considered, it is appropriate that acrylonitrile is 10 mass % to 60 mass % and preferably 20 mass % to 50 mass % with respect to the total mass of the copolymer.

The molecular weight of the styrene copolymer and the acrylonitrile copolymer is not particularly limited. However, it is appropriate that the molecular weight is generally in the range of 1,000 to 1,000,000 and preferably in the range of 50,000 to 500,000. The form of the copolymerization may be any one of a so-called A-B-type diblock type, an A-B-A-type triblock type, or a random type.

<<Cured Polymer Product>>

The cured polymer product according to the invention is obtained by polymerizing and curing the curable composition and preferably includes at least a polymer having a structural unit expressed by General Formula (I-1) below.

General Formula (I-1)

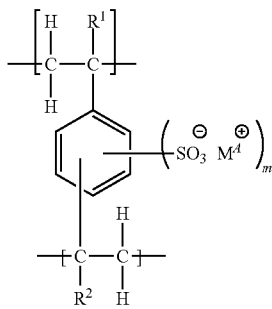

In General Formula (I-1), m represents an integer of 1 to 4, and $M^A$ represents a hydrogen ion, an inorganic ion, or an organic ion. Here, an inorganic ion and an organic ion may be bivalent or higher ions. Each of $R^1$ and $R^2$ independently represents a hydrogen atom or an alkyl group.

m, $M^A$, $R^1$, and $R^2$ respectively have the same meanings as m, $M^A$, $R^1$, and $R^2$ in General Formula (1), and the preferable ranges are also the same.

According to the invention, the structural unit expressed by General Formula (I-1) is preferably a structural unit expressed by General Formula (II-1) below.

General Formula (II-1)

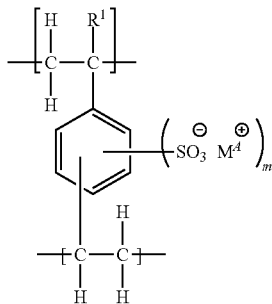

In General Formula (II-1), $M^A$ and m have respectively the same meanings as $M^A$ and m in General Formula (I-1), and the preferable ranges are also the same.

According to the invention, the polymer having a structural unit expressed by General Formula (II-1) even more preferably a copolymer having a structural unit expressed by General Formula (II-2) or (II-3) below.

General Formula (II-2]

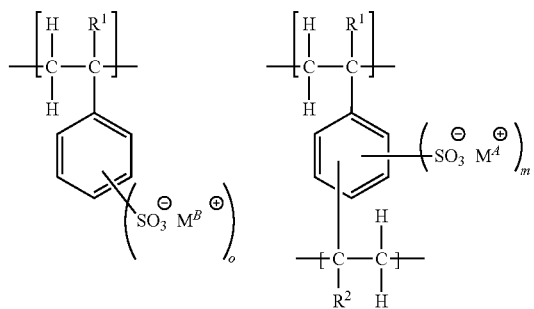

In General Formula (II-2), $M^A$ and m have respectively the same meanings as $M^A$ and m in General Formula (I-1), and the preferable ranges are also the same. o represents an integer of 1 to 5, and $M^B$ represents a hydrogen ion, an inorganic ion, or an organic ion. Here, an inorganic ion and an organic ion may be bivalent or higher ions.

o is preferably 1 or 2 and more preferably 1.

The inorganic ion in $M^B$ is preferably an alkali metal ion. Examples of the alkali metal ion preferably include a lithium ion, a potassium ion, a sodium ion, a magnesium ion, an aluminum ion, a calcium ion, an iron (II) ion, and an iron (III) ion.

Examples of the organic ion in $M^B$ preferably include an ammonium ion, a quaternary ammonium ion, a pyridinium ion, an imidazolium ion, a morpholium ion.

$M^B$ is particularly preferably a hydrogen ion, a lithium ion, a potassium ion, a sodium ion, a magnesium ion, aluminum ion, a calcium ion, an iron (II) ion, an iron (III) ion, or a pyridinium ion.

General Formula (II-3]

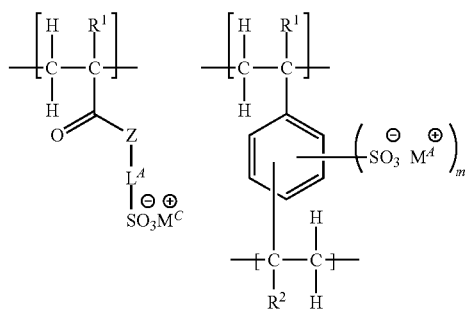

In General Formula (II-3), Z represents O or $NR^4$, $L^A$ represents a bivalent linking group, and $M^C$ represents a hydrogen ion, an inorganic ion, or an organic ion. Here, an inorganic ion and an organic ion may be bivalent or higher ions. Each of $R^3$ and $R^4$ independently represents a hydrogen atom or an alkyl group.

$L^A$ is preferably an alkylene group or an arylene group. The number of carbon atoms of the alkylene group is preferably 1 to 20, more preferably 1 to 10, even more preferably 1 to 3, and particularly preferably 1 or 2, and examples thereof include methylene, ethylene, propylene, hexamethylene, and isobutylene.

The number of carbon atoms of the arylene group is preferably 6 to 20 and more preferably 6 to 12, and examples thereof include phenylene and naphthylene, and phenylene is preferable. $L^A$ may have a substituent.

Examples of the substituent represent a group selected from the substituent group α below.

[Substituent Group α]

Examples of the substituent group α may include an alkyl group (an alkyl group preferably having 1 to 30 carbon atoms, more preferably having 1 to 20 carbon atoms, and particularly preferably having 1 to 10 carbon atoms, and examples thereof include methyl, ethyl, iso-propyl, tert-butyl, n-octyl, 2-ethylhexyl, n-decyl, and n-hexadecyl), a cycloalkyl group (a cycloalkyl group preferably having 3 to 30 carbon atoms, more preferably having 3 to 20 carbon atoms, and particularly preferably having 3 to 10 carbon atoms, and examples thereof include cyclopropyl, cyclopentyl, and cyclohexyl), an alkenyl group (an alkenyl group preferably having 2 to 30 carbon atoms, more preferably having 2 to 20 carbon atoms, and particularly preferably having 2 to 10 carbon atoms, and examples thereof include vinyl, allyl, 2-butenyl, and 3-pentenyl), an alkynyl group (an alkynyl group preferably having 2 to 30 carbon atoms, more preferably having 2 to 20 carbon atoms, and particularly preferably having 2 to 10 carbon atoms, and examples thereof include propargyl and 3-pentynyl), an aryl group (an aryl group preferably having 6 to 30 carbon atoms, more preferably having 6 to 20 carbon atoms, particularly preferably having 6 to 12 carbon atoms, and examples thereof include phenyl, p-methylphenyl, naphthyl, and anthranyl), an amino group (an amino group includes an amino group, an alkylamino group, and an arylamino group, the amino group is an amino group preferably having 0 to 30 carbon atoms, more preferably having 0 to 20 carbon atoms, and particularly preferably having 0 to 10 carbon atoms, and examples thereof include amino, methylamino, dimethylamino, diethylamino, dibenzylamino, diphenylamino, and ditolylamino), an alkoxy group (an alkoxy group preferably having 1 to 30 carbon atoms, more preferably having 1 to 20 carbon atoms, particularly preferably having 1 to 10 carbon atoms, and examples thereof include methoxy, ethoxy, butoxy, and 2-ethylhexyloxy), an aryloxy group (an aryloxy group preferably having 6 to 30 carbon atoms, more preferably having 6 to 20 carbon atoms, and particularly preferably having 6 to 12 carbon atoms, and examples thereof include phenyloxy, 1-naphthyloxy, and 2-naphthyloxy), and a hetero ring oxy group (a hetero ring oxy group preferably having 2 to 30 carbon atoms, more preferably having 2 to 20 carbon atoms, particularly preferably having 2 to 12 carbon atoms, and examples thereof include pyridyloxy, pyradyloxy, and pyrimidyloxy, and quinolyloxy).

Examples of the substituent group α may include an acyl group (an acyl group preferably having 1 to 30 carbon atoms, more preferably having 1 to 20 carbon atoms, and particularly preferably having 1 to 12 carbon atoms, and examples thereof include acetyl, benzoyl, formyl, and pivaloyl), an alkoxycarbonyl group (an alkoxycarbonyl group preferably having 2 to 30 carbon atoms, more preferably having 2 to 20 carbon atoms, and particularly preferably having 2 to 12 carbon atoms, and examples thereof include methoxycarbonyl and ethoxycarbonyl), an aryloxycarbonyl group (an aryloxycarbonyl group preferably having 7 to 30 carbon atoms, more preferably having 7 to 20 carbon atoms, and particularly preferably having 7 to 12 carbon atoms, and examples thereof include phenyloxycarbonyl), an acyloxy group (an acyloxy group preferably having 2 to 30 carbon atoms, more preferably having 2 to 20 carbon atoms, and particularly preferably having 2 to 10 carbon atoms, and examples thereof include acetoxy and benzoyloxy), and an acylamino group (an acylamino group preferably having 2 to 30 carbon atoms, more preferably having 2 to 20 carbon atoms, and particularly preferably having 2 to 10 carbon atoms, and examples thereof include acetylamino and benzoylamino).

Examples of the substituent group α may include an alkoxycarbonylamino group (an alkoxycarbonylamino group preferably having 2 to 30 carbon atoms, more preferably having 2 to 20 carbon atoms, and particularly preferably having 2 to 12 carbon atoms, and examples thereof include methoxycarbonylamino), an aryloxycarbonylamino group (an aryloxycarbonylamino group preferably having 7 to 30 carbon atoms, more preferably having 7 to 20 carbon atoms, particularly preferably having 7 to 12 carbon atoms, and examples thereof include phenyloxycarbonylamino), an alkyl or aryl sulfonylamino group (preferably having 1 to 30 carbon atoms, more preferably having 1 to 20 carbon atoms, and particularly preferably having 1 to 12 carbon atoms, and examples thereof include methanesulfonylamino and benzenesulfonylamino), and a sulfamoyl group (the sulfamoyl group includes a sulfamoyl group, and an alkyl or aryl sulfamoyl group, the sulfamoyl group is a sulfamoyl group preferably having 0 to 30 carbon atoms, more preferably having 0 to 20 carbon atoms, and particularly preferably having 0 to 12 carbon atoms, and examples thereof include sulfamoyl, methylsulfamoyl, dimethylsulfamoyl, and phenylsulfamoyl).

Examples of the substituent group α may include a carbamoyl group (the carbamoyl group includes a carbamoyl group, an alkyl or aryl carbamoyl group, the carbamoyl group is a carbamoyl group preferably having 1 to 30 carbon atoms, more preferably having 1 to 20 carbon atoms, and particularly preferably having 1 to 12 carbon atoms, and examples thereof include carbamoyl, methylcarbamoyl, diethylcarbamoyl, and phenylcarbamoyl), an alkylthio group (an alkylthio group preferably having 1 to 30 carbon atoms, more preferably having 1 to 20 carbon atoms, and particularly preferably having 1 to 12 carbon atoms, and examples thereof include methylthio, and ethylthio), an arylthio group (an arylthio group preferably having 6 to 30 carbon atoms, more preferably having 6 to 20 carbon atoms, and particularly preferably having 6 to 12 carbon atoms, and examples thereof include phenylthio), and a hetero ring thio group (a hetero ring thio group preferably having 2 to 30 carbon atoms, more preferably having 2 to 20 carbon atoms, and particularly preferably having 2 to 12 carbon atoms, and examples thereof include pyridylthio, 2-benzimidazolylthio, 2-benzoxazolylthio, and 2-benzothiazolylthio).

Examples of the substituent group α may include an alkyl or aryl sulfonyl group (an alkyl or aryl sulfonyl group preferably having 1 to 30 carbon atoms, more preferably having 1 to 20 carbon atoms, and particularly preferably having 1 to 12 carbon atoms, and examples thereof include mesyl and tosyl), an alkyl or aryl sulfinyl group (an alkyl or aryl sulfinyl group preferably having 1 to 30 carbon atoms, more preferably having 1 to 20 carbon atoms, and particularly preferably having 1 to 12 carbon atoms, and examples thereof include methanesulfinyl, and benzenesulfinyl), an ureido group (an ureido group preferably having 1 to 30 carbon atoms, more preferably having 1 to 20 carbon atoms, particularly preferably having 1 to 12 carbon atoms, and examples thereof include ureido, methylureido, and phenylureido), a phosphoric acid amide group (a phosphoric acid amide group preferably having 1 to 30 carbon atoms, more preferably having 1 to 20 carbon atoms, particularly preferably having 1 to 12 carbon atoms, and examples thereof include diethyl phosphoric acid amide and phenyl phosphoric acid amide), a hydroxy group, a mercapto group, and a halogen atom (for example, a fluorine atom, a chlorine atom, a bromine atom, and an iodine atom, and a fluorine atom is more preferable).

Examples of the substituent group α may include a cyano group, a sulfo group, a carboxy group, an oxo group, a nitro group, a hydroxamic acid group, a sulfino group, a hydrazino group, an imino group, and a hetero ring group (a hetero ring group preferably having 1 to 30 carbon atoms and more preferably having 1 to 12 carbon atoms, as a ring-constituting hetero atom, for example, a nitrogen atom, an oxygen atom, and a sulfur atom are preferable, and specific examples thereof include imidazolyl, pyridyl, quinolyl, furyl, thienyl, piperidyl, morpholino, benzoxazolyl, benzimidazolyl, benzothiazolyl, a carbazolyl group, and an azepinyl group), a silyl group (a silyl group preferably having 3 to 40 carbon atoms, more preferably having 3 to 30 carbon atoms, and particularly preferably having 3 to 24 carbon atoms, and examples thereof include trimethylsilyl and triphenylsilyl), and a silyloxy group (a silyloxy group preferably having 3 to 40 carbon atoms, more preferably having 3 to 30 carbon atoms, particularly preferably having 3 to 24 carbon atoms, and examples thereof include trimethylsilyloxy and triphenylsilyloxy). These substituents may be further substituted with any one or more substituents selected from the substituent group α above.

According to the invention, when there are plural substituents in one structural portion, the substituents may be linked to each other to form a ring or may be condensed with a portion or all of the structural portion to form an aromatic ring or an unsaturated heterocyclic ring.

The inorganic ion in $M^C$ is preferably an alkali metal ion. Examples of the alkali metal ion preferably include a lithium ion, a potassium ion, and a sodium ion.

Examples of the organic ion in $M^C$ include an ammonium ion, a quaternary ammonium ion, a pyridinium ion, an imidazolium ion, and a morpholium ion.

$M^C$ is preferably a hydrogen ion and an inorganic ion, more preferably a hydrogen ion, a lithium ion, a potassium ion, and a sodium ion.

The number of carbon atoms of the alkyl group in $R^3$ and $R^4$ is preferably 10 to 1, more preferably 5 to 1, even more preferably 3 to 1, and particularly preferably 1.

$R^3$ and $R^4$ are preferably hydrogen atoms.

In the cured polymer product according to the invention, a total content of the structural unit expressed by General Formula (I-1), that is, the content of the structural unit expressed by General Formula (I-1) with respect to the total mass of the cured polymer product is preferably 10 mass % or greater, more preferably 20 mass % to 100 mass %, and particularly preferably 30 mass % to 100 mass %.

In the cured polymer product of the invention, the content of the structural unit expressed by General Formula (A) below is preferably 5 mass % or less, more preferably 2 mass % or less, and particularly preferably 1 mass % or less. The crosslinking structure not having a sulfo group as the structural unit structural unit expressed by General Formula (A) below has a tendency of increasing the electrical resistance of the film.

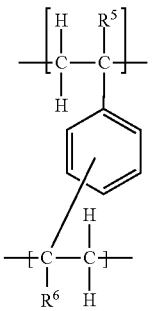

General Formula (A)

In General Formula (A), each of $R^5$ and $R^6$ independently represents a hydrogen atom or an alkyl group.

The alkyl groups in $R^5$ and $R^6$ are the same as the alkyl group in $R^1$ and $R^2$ of General Formula (I-1).

The content of the halogen atom that is bonded to the cured polymer product according to the invention via a covalent bond is preferably 3,000 ppm or less, more preferably 2,000 ppm or less, and particularly preferably 1,000 ppm or less with respect to the total mass of the cured polymer product according to the invention.

<Support>

In the case where the cured polymer product according to the invention is used as a cation exchange membrane which is an ion exchange membrane, the cured polymer product according to the invention may have a support. Hereinafter, descriptions are made by substituting the cured polymer product to an ion exchange membrane.

In order to provide the ion exchange membrane having favorable mechanical strength, many technologies can be used. Among these, it is preferable to use a support as a reinforcing material of the film, and a porous support is preferable as the support. A portion of the film can be formed by coating and/or impregnating the porous support with the curable composition according to the invention and polymerizing and curing this curable composition.

Examples of the porous support include synthetic woven fabric, a synthetic nonwoven fabric, a sponge-shaped film, or a film having fine through holes. Examples of the material for forming the porous support may include polyolefin (polyethylene, polypropylene, and the like), polyacrylonitrile, polyvinyl chloride, polyester, polyamide, and copolymers thereof; or porous films based on polysulfone, polyether sulfone, polyphenylenesulfone, polyphenylenesulfide, polyimide, polyethermide, polyamide, polyamideimide, polyacrylonitrile, polycarbonate, polyacrylate, cellulose acetate, polypropylene, poly(4-methyl-1-pentene), polyvinylidene fluoride, polytetrafluoroethylene, polyhexafluoropropylene, polychlorotrifluoroethylene, and copolymers thereof.

Examples of the material for forming the porous support appropriate for performing graft polymerization on the curable composition according to the invention include polyolefin such as polyolefin-based thermoplastic elastomer, polytetrafluoroethylene, a tetrafluoroethylene-perfluoro (alkylvinyl ether) copolymer, an ethylene-tetrafluoroethylene copolymer, a tetrafluoroethylene-hexafluoropropylene copolymer, polychlorotrifluoroethylene, an ethylene-chlorotrifluoroethylene copolymer, and a fluoride resin such as polyvinylidene fluoride and polyvinyl fluoride, in which ethylenepropylene rubber or ethylene-propylene-diene rubber (EPDM) is dispersed in high pressure low density polyethylene, straight chain low density polyethylene, high density polyethylene, a propylene-ethylene block copolymer, polypropylene, and the like.

Among these, according to the invention, polyolefin is preferable.

Commercially available porous supports or the commercially available reinforcing materials are, for example, commercially available from Japan Vilene Company, Ltd., Freudenberg Filtration Technologies (Novatexx material), and Sefar AG.

In the case where photopolymerizing and curing reaction is performed, it is required that the porous support and the reinforcing material do not block the wavelength range of the irradiation light, that is, pass the irradiation of wavelengths used in the polymerizing and curing. However, in the case of thermal polymerizing and curing reaction, there is no need to consider this. It is preferable that the curable composition that forms the ion exchange membrane easily permeates the porous support or the reinforcing material.

It is preferable that the porous support or the reinforcing material has hydrophilicity. In order to provide hydrophilicity to the support, general methods such as a corona treatment, an ozone treatment, a sulfate treatment, and a silane coupling agent treatment can be used.

In the case where the support is provided, the thickness of the ion exchange membrane including the support is preferably 30 µm to 250 µm, more preferably 40 µm to 200 µm, and particularly preferably 50 µm to 150 µm.

<<Characteristics of Ion Exchange Membrane>>

In a case where the cured polymer product according to the invention is used as the ion exchange membrane, it is preferable to have characteristics below.

(Ion Exchange Capacity)

The ion exchange membrane which is the cured polymer product according to the invention has the ion exchange capacity of preferably 2.0 meq/g or greater, more preferably 2.5 meq/g or greater, and particularly preferably 3.5 meq/g or greater based on the total dry mass of a film including an arbitrary porous support and an arbitrary porous reinforcing material. The upper limit of the ion exchange capacity is not particularly limited, but is practically 7.0 meq/g or less. Here, meq refers to milliequivalent.

The ion exchange membrane which is the cured polymer product according to the invention has charge density of preferably 100 meq/m$^2$ or greater, more preferably 250 meq/m$^2$ or greater, particularly preferably 300 meq/m$^2$ or greater based on the area of the dry film. The upper limit of the charge density is not particularly limited, but is practically 3,500 meq/m$^2$ or less.

Unless described otherwise, the measuring of the ion exchange capacity follows the measuring method described in the examples below.

(Selective Permeability of Ion)

The selective permeability with respect to a cation such as Na$^+$ of the ion exchange membrane (cation exchange membrane) which is the cured polymer product according to the invention is preferably 0.98 or greater and more preferably 0.99 or greater. As the selective permeability of the ion comes closer to 1.0 which is an ideal value, the selective permeability is more preferable.

(Electrical Resistance of Film (Film Resistance))

The electrical resistance (film resistance) of the ion exchange membrane which is the cured polymer product according to the invention is preferably 3.0 Ω·cm$^2$ or less, more preferably 2.5 Ω·cm$^2$ or less, even more preferably 2.1 Ω·cm$^2$ or less, and particularly preferably 1.5 Ω·cm$^2$ or less. As the electrical resistance is lower, it is more preferable, and the electrical resistance is preferably the lowest value in the realizable scope for exhibiting an effect of the invention.

(Swelling Ratio)

The swelling ratio (dimensional change rate due to swelling) of the ion exchange membrane which is the cured polymer product according to the invention in water is preferably less than 30%, more preferably less than 15%, and particularly preferably less than 8%. The swelling ratio can be controlled by selecting a proper parameter in a curing step.

The electrical resistance, the selective permeability of the ion, and the swelling ratio % in water can be measured by the method disclosed in pages of 319, 217, and 218 of Membrane Science (2008) and pages 193 to 195 of Experimental method in membrane science (1984) written by Nakagaki Masayuki.

(Water Permeability)

The water permeability of the ion exchange membrane which is the cured polymer product according to the invention is preferably $5.5 \times 10^{-5}$ ml/m$^2$/Pa/hr or less, more preferably $5.2 \times 10^{-5}$ ml/m$^2$/Pa/hr or less, and particularly preferably $5.0 \times 10^{-5}$ ml/m$^2$/Pa/hr or less.

(Film Resistance×Water Permeability)

As a value expressed by a product of the film resistance (Ω·cm$^2$) and the water permeability (ml/m$^2$/Pa/hr) is lower, the ion exchange membrane which is the cured polymer product according to the invention is more preferable. That is, the product of the film resistance and the water permeability exchange membrane is preferably $1.2 \times 10^{-4}$ (Ω·cm$^2$·ml/m$^2$/Pa/hr) or less, more preferably $1.1 \times 10^{-4}$ (Ω·cm$^2$·ml/m$^2$/Pa/hr) or less, even more preferably $9.0 \times 10^{-5}$ (Ω·cm$^2$·ml/m$^2$/Pa/hr) or less, and particularly preferably $6.0 \times 10^{-5}$ (Ω·cm$^2$·ml/m$^2$/Pa/hr) or less.

(Pin Hole Test)

It is preferable that pin holes do not exist in the ion exchange membrane which is the cured polymer product according to the invention.

According to the invention, the ion exchange membrane for measuring is coated with Pt in the thickness of 1.5 nm, and a scanning electron microscope (SEM) was used so as to examine the number of pin holes in the measuring conditions below. As a result, it is preferable that defects or pin holes are not observed.

(Measuring Condition)

Acceleration voltage: 2 kV
Working distance: 4 mm
Aperture: 4
Magnification: ×100,000 times
Inclination of field of view: 3°

(Resistance to Ultrasonic Treatment)

The ion exchange membrane which is a cured polymer product according to the invention preferably has resistance to an ultrasonic treatment. Specifically, the film mass decreasing rate (%) after the ultrasonic treatment is preferably 0.5 mass % or less, more preferably 0.3 mass % or less, and even more preferably 0.2 mass % or less.

According to the invention, as measured in the examples, the cation exchange membrane that is immersed in ion exchange water is subjected to an ultrasonic treatment at 25° C. for 60 minutes in a table-type ultrasonic Cleaner 1510 (Product Name) manufactured by Branson Ultrasonics Corporation. A film mass before and after an ultrasonic treatment is measured, a film mass decreasing rate is calculated based on the expression below, and resistance to the ultrasonic treatment of the ion exchange membrane is evaluated.

(Film mass before ultrasonic treatment−Film mass after ultrasonic treatment)/film mass before ultrasonic treatment×100

(pH Resistance)

The ion exchange membrane which is the cured polymer product according to the invention preferably has resistance to pH. Specifically, in all of hydrochloric acid aqueous solution of pH 2 and sodium hydroxide aqueous solution of pH 12, a retention rate of the water permeability of the ion exchange membrane is preferably 90% or greater before and after immersion.

According to the invention, the film is immersed respectively in hydrochloric acid aqueous solution of pH 2 and sodium hydroxide aqueous solution of pH 12, and the film is left for 24 hours at room temperature (25° C.). The ratio of the water permeability of the film after immersion to the water permeability of the film before immersion is evaluated as a retention rate (%).

A mass average molecular weight of the polymer having a structural unit expressed by General Formula (I-1) that forms the ion exchange membrane which is the cured polymer product according to the invention is several hundreds of thousands or higher since three dimensional crosslink is formed, and may not be substantially measured. Generally, the mass average molecular weight is considered unlimited.

<<Method of Manufacturing Cured Polymer Product>>

The method of manufacturing the cured polymer product according to the invention is described as the method of manufacturing the ion exchange membrane which is the most preferable use thereof.

The ion exchange membrane which is the cured polymer product according to the invention can be prepared in a batch type by using a fixed support (batch method), but the film is prepared in a continuous type by using a transferred support (continuous method). The support may be a roll shape that is continuously rewound. In the case where the film is prepared in the continuous method, steps of loading the support on a belt that continuously moves, continuously applying the coating liquid which is the curable composition for forming the ion exchange membrane, polymerizing and curing the coating liquid, and forming the film can be continuously performed. However, any one of the applying step and the film forming step may be continuously performed.

Independently from the support, the curable composition for forming the ion exchange membrane is impregnated in the porous support, and a temporary support (after the polymerizing and curing reaction is completed, the film is peeled from the temporary support) may be used until the polymerizing and curing reaction is completed.

This temporary support is not particularly limited, as long as there is no need to consider material penetration, and the temporary support includes, for example, a metal plate such as a polyethylene terephthalate (PET) film or an aluminum plate and can be fixed for forming the film.

Polymerizing and curing can be performed without using a support other than the porous support, by impregnating the curable composition for forming the ion exchange membrane in the porous support exchange membrane.

The curable composition for forming the ion exchange membrane can be applied or impregnated on the porous support by various methods, for example, curtain coating, extrusion coating, air-knife coating, slide coating, nip roll coating, forward roll coating, reverse roll coating, impregnation coating, kiss coating, rod bar coating, or spray coating. The application of the plural layers can be performed at the same time or continuously. In order to apply the plural layers at the same time, curtain coating, slide coating, slot die coating, and extrusion coating are preferable.

With respect to the manufacturing of the ion exchange membrane in the continuous method, the curable composition for forming the ion exchange membrane to the transferred support is continuously manufactured more preferably by a manufacturing unit including a curable composition applying unit, an irradiation source for polymerizing and curing the curable composition, a film collecting portion for collecting the formed film, and means for transferring the support from the curable composition applying unit to the irradiation source and the film collecting portion.

In this manufacturing example, the ion exchange membrane is manufactured by steps of (i) applying and/or impregnating the curable composition for forming the ion exchange membrane that is the cured polymer product according to the invention on the support (preferably the porous support), (ii) performing polymerizing and curing reaction on the curable composition by active radiation irradiation or heating, and (iii) removing the film formed as desired from the support.

In (ii), with respect to the heating, the heating may be performed in combination with active radiation irradiation. In the step (i), it is preferable that the curable composition is impregnated to the support.

[Active Radiation Irradiation]

In the manufacturing unit, the curable composition applying unit is provided at an upstream position of the irradiation source, and the irradiation source is provided at an upstream position of the collecting portion.

In order to cause the curable composition to have a sufficient fluidity for application with a high speed applicator, the viscosity of the curable composition for forming the ion exchange membrane at 35° C. is preferably less than 4,000 mPa·s, more preferably 1 mPa·s to 1,000 mPa·s, and most preferably 1 mPa·s to 500 mPa·s. In the case of slide bead coating, the viscosity at 35° C. is preferably 1 mPa·s to 100 mPa·s.

In the high speed applicator, the coating liquid which is the curable composition for forming the ion exchange membrane can be applied to the transferred support at a speed of greater than 15 m/min, and also can be applied at a speed of greater than 400 m/min.

Particularly, in the case where the support is used in order to enhance the mechanical strength, before the curable composition according to the invention is applied to the surface of the support, this support may be subjected to a corona discharge treatment, a glow discharge treatment, a flame treatment, an ultraviolet irradiation treatment, and the like, for example, in order to improve the wettability and adhesion force of the support.

The polymerizing and curing of the curable composition for forming the ion exchange membrane starts preferably within 60 seconds, more preferably within 15 seconds, particularly preferably within 5 seconds, and most preferably within 3 seconds, from application or impregnation of the curable composition to the support.

The active radiation irradiation time of the polymerizing and curing is preferably less than 10 seconds, more preferably less than 5 seconds, particularly preferably less than 3 seconds, and most preferably less than 2 seconds. In the continuous method, the irradiation is performed continuously, and polymerizing and curing reaction time is determined considering the speed of the curable composition moving through the irradiation beam.

In the case where ultraviolet light (UV light) having high strength is used in the polymerizing and curing reaction, a considerable amount of heat is generated, and thus it is preferable to cool a lamp of the light source and/or the support/film with the air for cooling, in order to prevent the overheat. In the case of irradiation with the considerable light amount of infrared light (IR light) together with UV beam, the irradiation is performed with UV light by using an IR reflective quartz plate as a filter.

The active radiation is preferably ultraviolet light. It is preferable that the irradiation wavelength is compatible with the absorption wavelength of the arbitrary polymerization initiator included in the curable composition for forming the ion exchange membrane, and examples thereof include UV-A (400 nm to 320 nm), UV-B (320 nm to 280 nm), and UV-C (280 nm to 200 nm).

The ultraviolet light source is a mercury arc lamp, a carbon arc lamp, a low pressure mercury lamp, a medium pressure mercury lamp, a high pressure mercury lamp, a swirl-flow plasma arc lamp, a metal halide lamp, a xenon lamp, a tungsten lamp, a halogen lamp, laser, and an ultraviolet light-emitting diode. Ultraviolet light emitting lamps of the medium or high pressure mercury vapor type is particularly preferable. In addition, in order to modify an emission spectrum of the lamp, an additive such as metal halide may exist. A lamp having maximum light emission in a range of 200 nm to 450 nm is particularly appropriate.

The energy output of the irradiation source is preferably from 20 W/cm to 1,000 W/cm and more preferably from 40 W/cm to 500 W/cm. However, if the desired exposure dose can be realized, the energy output can be higher or lower than the range above. The polymerization curing of the film is adjusted according to the exposure strength. The exposure dose is measured by High Energy UV Radiometer (UV Power Puck™ manufactured by EIT-Instrument Markets) in the UV-A range indicated in this device, and is preferably at least 40 mJ/cm$^2$ or greater, more preferably 100 mJ/cm$^2$ to 2,000 mJ/cm$^2$, and particularly preferably 150 mJ/cm$^2$ to 1,500 mJ/cm$^2$. The exposure time can be freely chosen, but is preferably shorter and preferably less than 2 seconds.

In the case where the coating speed is high, plural light sources may be used in order to reach a desired dose. Exposure strengths of these light sources may be equal to or different from each other.

[Polymerizing and Curing by Heating]

With respect to the ion exchange membrane that is the cured polymer product according to the invention, even if the film is formed by thermal polymerizing and curing, a film exhibiting almost the same performances can be obtained. In this thermal polymerizing and curing, the heating temperature is preferably 40° C. to 200° C., more preferably 60° C. to 180° C., and particularly preferably 70° C. to 150° C. The heating time is preferably 5 minutes to 12 hours, more preferably 10 minutes to 10 hours, and particularly preferably 10 minutes to 8 hours.

[Graft Polymerization]

The graft polymerization may be performed by irradiating the support with the active radiation, thereafter, impregnating the curable composition according to the invention to the support, and further performing the irradiation of the active radiation. The ion exchange membrane that can be cured by ultraviolet light irradiation or heat is subjected to the graft polymerization, such that the adhesiveness to the support is enhanced and flexibility of the film is enhanced.

This is because the support becomes a trunk and the ion exchange membrane becomes a branch, such that the thermal, mechanical, and chemical strengths increase due to the effect of the chemical bond with the support.

Here, the active radiation means electron beams, ultraviolet rays, X rays, α rays, β rays, and γ rays.

<<Use of Cured Polymer Product>>

The cured polymer product according to the invention mainly is particularly intended to be used in the ion exchange. However, the film of the cured polymer product according to the invention is not limited to the ion exchange, and is considered to be able to be appropriately used also in the reverse permeation and the gas separation.

As described above, the cured polymer product according to the invention is useful as the ion exchange membrane, particularly, as the cation exchange membrane, and can be used in the electrodeionization, the continuous electrodeionization, the electrodialysis, and the electrodialysis reversal. The cured polymer product according to the invention can be used not only for general usage but also for medical use, and recently the cured polymer product according to the invention can be also used in a solid polymer electrolyte-type fuel cell.

The film of the cured polymer product according to the invention can be specifically used as an ion exchange membrane, a proton conduction film, a reverse osmosis membrane, a forward osmosis membrane, a polymer electrolyte, a water absorbing resin, or the like.

<<Organic or Inorganic Anions that can be Included in Compound Expressed by General Formula (1)>>

The compound expressed by General Formula (1) may include organic or inorganic anions by 0.1 parts by mass to 1.0 parts by mass. This organic or inorganic anion is contained in the compound expressed by General Formula (1) which is derived from the reaction of the step (i) in <<method of manufacturing water soluble aromatic vinyl compound>> described below.

The fact that the organic or inorganic anions may be included by 0.1 parts by mass to 1.0 parts by mass means that the amount of the organic or inorganic salt in the compound expressed by General Formula (1) may be 0.1 mass % to 1.0 mass %.

Unless described otherwise, the amount of the organic or inorganic salt in the compound expressed by General Formula (1) follows the method measured in the examples described below.

Here, the organic anion is expressed by $R^4COO^-$, $R^4$ represents an alkyl group, a halogen substituted alkyl group, an alkenyl group, or an aryl group. The alkyl group and an alkyl group in the halogen substituted alkyl group preferably has 1 to 10 carbon atoms, more preferably has 1 to 6 carbon atoms, even more preferably has 1 to 4 carbon atoms, and particularly preferably has 1 or 2 carbon atoms, and examples thereof include methyl and ethyl. Specific examples of halogen include a fluorine atom, a chlorine atom, a bromine atom, and an iodine atom. The number of carbon atoms of the alkenyl group is preferably 2 to 10, more preferably 2 to 6, and even more preferably 2 or 3, and examples thereof include vinyl and allyl. The number of carbon atoms of the aryl group is preferably 6 to 10 and more preferably 6 to 8, and examples thereof include phenyl and naphthyl. All of the alkyl group, the halogen substituted alkyl group, the alkenyl group, and the aryl group may have substituents, and examples of this substituent include the substituent in the substituent group α described above.

The inorganic anion represents a halogen ion (for example, $Cl^-$, $Br^-$, and $I^-$), a sulfate ion ($SO_4^{2-}$), a hydroxide ion ($OH^-$), a carbonate ion ($CO_3^{2-}$), or phosphate ion ($PO_4^{3-}$).

<<Method of Manufacturing Water Soluble Aromatic Vinyl Compound>>

The compound expressed by General Formula (1) according to the invention can be manufactured with reference to JP360122B or the like. Hereinafter, a preferable example of the method of manufacturing the compound expressed by General Formula (1) according to the invention is described.

The preferable method of manufacturing the compound expressed by General Formula (1) according to the invention includes at least the two steps below:

(i) a step of reacting the compound expressed by General Formula (3) below with a strong base in the hydrophilic solvent and precipitating the compound expressed by General Formula (1), and (ii) a step of recrystallizing a crystal obtained by performing solid-liquid separation on the reaction liquid in the hydrophilic solvent.

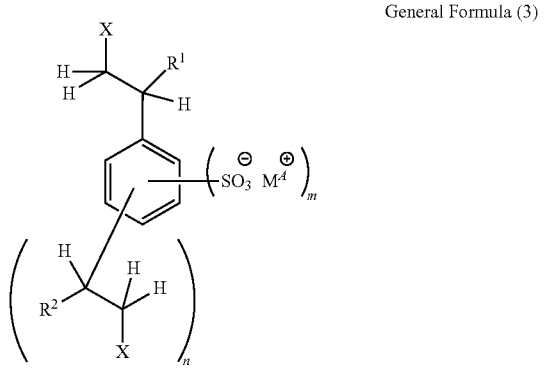

General Formula (3)

X in General Formula (3) represents a halogen atom or $R^4COO^-$, and $R^4$ represents an alkyl group, a halogen substituted alkyl group, an alkenyl group, or an aryl group. Specific examples of the halogen atom include a fluorine atom, a chlorine atom, a bromine atom, and an iodine atom. $R^4COO^-$ has the same meaning as $R^4COO^-$ that may be included in the compound expressed by General Formula (1) described above, and the preferable ranges are also the same. m, n, $M^A$, $R^1$, and $R^2$ respectively have the same meanings as m, n, $M^A$, $R^1$, and $R^2$ of General Formula (1), and the preferable ranges are also the same.

The hydrophilic solvent in the step (i) is preferably water or alcohol. Specific examples of alcohol include the alcohol-based solvent described above. Among these, examples of the alcohol used in the step (i) preferably include methanol or ethanol.

The strong base in the step (i) refers to base having a basicity constant of 5 or less. Specific examples of the strong base preferably include $M^aOH$, $(M^b)_{l1}CO_3$, and $(M^c)_{l2}(PO_4)_{l3}$. Here, $M^a$, $M^b$, and $M^c$ represent counter cations.

$M^a$ represents a univalent inorganic cation, $M^b$ represents a univalent or bivalent inorganic cation, $M^c$ represents univalent, bivalent, or trivalent inorganic cation.

Specific examples of the univalent inorganic cation include lithium cation, potassium cation, and sodium cation.

Specific examples of the bivalent inorganic cation include a magnesium cation, a calcium cation, and a barium cation.

Specific examples of trivalent inorganic cation include an aluminum cation and an iron (III) cation.

When $M^b$ is a univalent cation, l1 represents 2, and when $M^b$ is a bivalent cation, l1 represents 1.

When $M^c$ is a univalent cation, l2 represents 3, and l3 represents 1. When $M^c$ is a bivalent cation, l2 represents 3, and l3 represents 2. When $M^c$ is a trivalent cation, l3 represents 1.

The reaction temperature in the step (i) is preferably 60° C. to 85° C., more preferably 65° C. to 85° C., and particularly preferably 70° C. to 85° C. The reaction time is preferably 1 hour to 6 hours, more preferably 1 hour to 4 hours, and particularly preferably 1 hour to 2 hours.

The hydrophilic solvent in the step (ii) has the same meaning as the hydrophilic solvent in the step (i). The hydrophilic solvents used in the steps (i) and (ii) may be identical to or different from each other.

The solid-liquid separation in the step (ii) is an operation of extracting the compound expressed by General Formula (1) precipitated from the reaction liquid, and examples thereof include filtration.

Hereinafter, specific examples of the compound expressed by General Formula (3) are provided below, but the invention is not limited thereto.

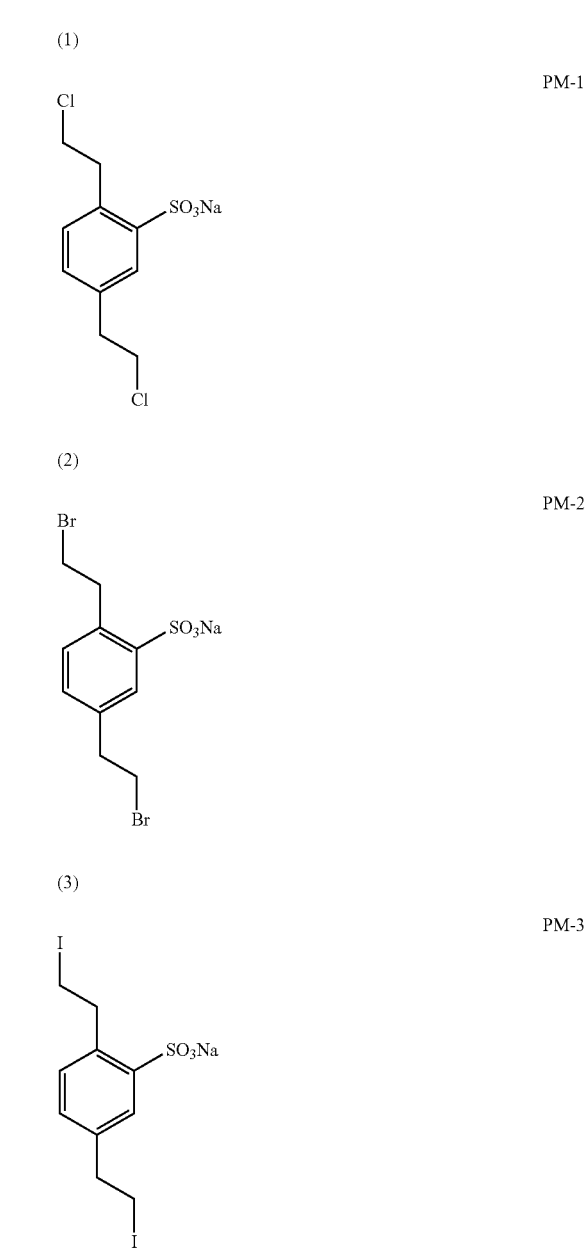

(4)
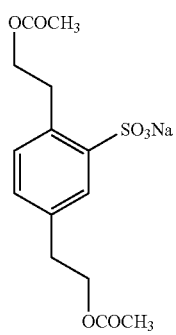
(5)
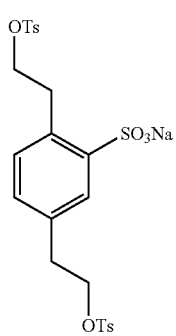
(6)
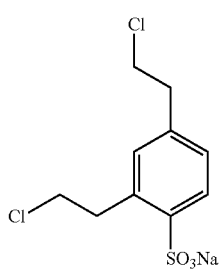
(7)
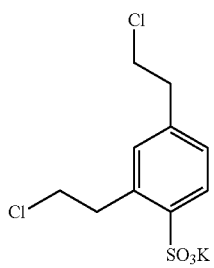
(8)
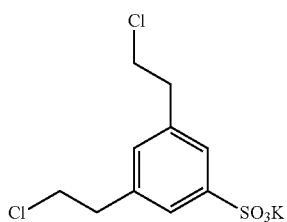
(9) PM-4
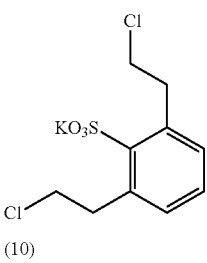
(10) PM-5
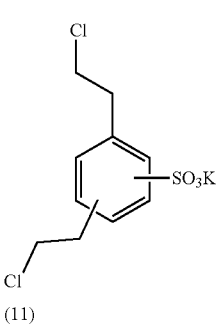
(11) PM-6
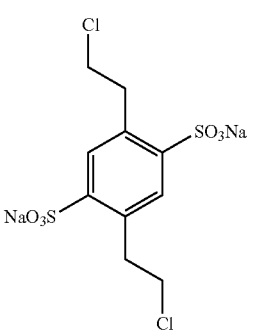
(12) PM-7
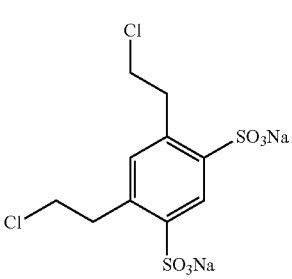
(13) PM-8
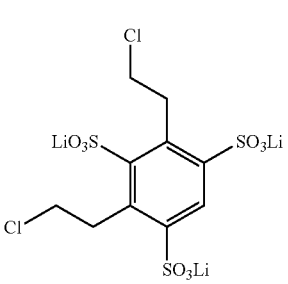
PM-9
PM-10
PM-11
PM-12
PM-13

-continued (14)

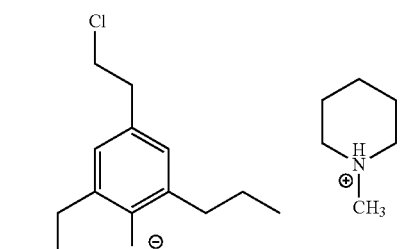

PM-14

(15)

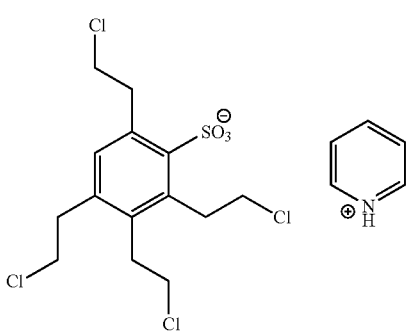

PM-15

-continued

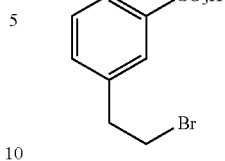

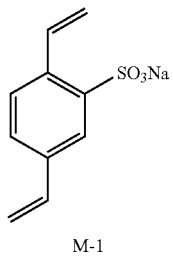

(i) Synthesizing of Compound (2)

25.0 g of 1,4-bishydroxyethylbenzene (1) (150 mmol, manufactured by Tokyo Chemical Industry Co., Ltd., Model number: B2295) and 125 ml of pyridine (manufactured by Wako Pure Chemical Industries, Ltd., Model number: 166-05316) were added to a 500 ml three-neck flask, and 63.1 g of p-toluenesulfonic acid chloride (331 mmol, manufactured by Tokyo Chemical Industry Co., Ltd., Model number: T0272) was added little by little while being stirred under ice cooling. After the addition was completed, the temperature of the reaction solution was increased to room temperature (25° C.), was stirred for four hours, and left for one night (12 hours). Thereafter, 1 L of ethyl acetate was added to the reaction mixture, stirring was performed for about 10 minutes, and generated crystal was filtrated. The crystal was dispersed in 500 ml of water and 500 ml of ethyl acetate, washed, and dried, so as to obtain 79.2 g of the compound (2). The compound (2) was used in the reaction below without refinement.

(ii) Synthesizing of Compound (3)

79.2 g (169 mmol) of the compound (2), 39.5 g of lithium bromide monohydrate (377 mmol, manufactured by Wako Pure Chemical Industries, Ltd., Model number: 129-01125), 400 ml of acetone were added to a 1,000 ml three-neck flask, and stirring was performed for 8 hours, while heating and refluxing. After the reaction was completed, concentration was performed, and 500 ml of ethyl acetate was added to the mixture. After the organic layer was washed three times with 50 ml of water, the organic layer was dried with anhydrous magnesium sulfate. After the inorganic salt was filtrated, the filtrate was concentrated with a rotary evaporator. The obtained coarse crystal was dispersed in a hexane-ethyl acetate mixed solvent, and was washed so as to obtain 32.5 g (yield: 74%, second stage) of a compound (3).

(iii) Synthesizing of Compound (4)

21.6 g of the compound (3) (74.0 mmol) and 108 ml of chloroform were added to a 300 ml three-neck flask, 16.4 g of chlorosulfonic acid (141 mmol, manufactured by Tokyo Chemical Industry Co., Ltd., Model number: C1788) was dripped little by little while stirring under room temperature (25° C.). After the dripping was completed, the stirring was further performed for 3 hours at room temperature (25° C.), and while 224 g of ice water was added to a 1 L conical flask, the reaction mixture was poured little by little. After the mixture was separated into a water layer and an organic layer, 86.4 ml of a 20 mass % sodium hydroxide aqueous solution was added to the water layer. The obtained crystal was filtrated, so as to obtain 20.9 g (yield: 76%) of a compound (4).

(iv) Synthesizing of Exemplary Compound (M-1)

20.7 g (55.6 mmol) of the compound (4), 144 ml of water, 15.7 g (392 mmol, manufactured by Wako Pure Chemical Industries, Ltd., Model number: 198-13765) of sodium hydroxide, and 0.0771 g (0.448 mmol, manufactured by Tokyo Chemical Industry Co., Ltd., Model number: H0865)

EXAMPLES

Hereinafter, the invention is described in more detail with reference to examples, but the invention is not limited to these examples. Unless described otherwise, "part(s)" and "percent (%)" are on a mass basis.

[Synthesizing of Compound Expressed by General Formula (1)]

1. Synthesizing of Exemplary Compound (M-1)

An exemplary compound (M-1) was synthesized in the synthesization scheme below.

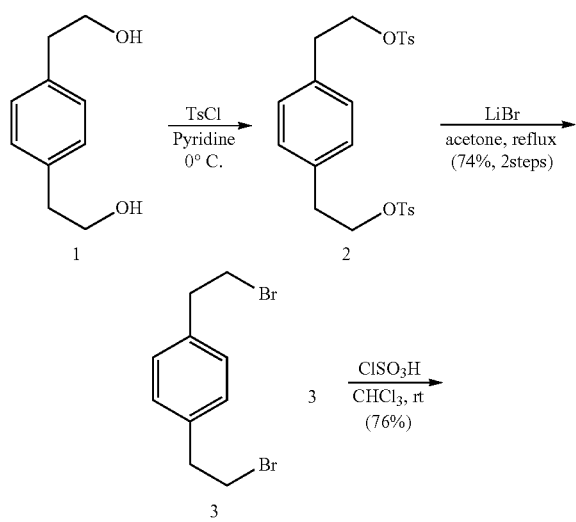

of 4-hydroxy-TEMPO were added to a 1 L three-neck flask, stirring was performed for 30 minutes under room temperature (25° C.), the temperature thereof was further increased to 80° C., and stirring was performed for one hour. The reaction mixture was moved to a 1 L conical flask, 200 ml of a 20 mass % sodium hydroxide aqueous solution was added, and the reaction mixture was left for one night (12 hours). The obtained crystal was filtrated and washed with a 20 mass % sodium hydroxide aqueous solution. Thereafter, 5.7 g of water was added to the obtained wet crystal, stirring was performed until the crystal was completely dissolved, and the reaction mixture was left for one night (12 hours). The precipitated crystal was filtrated and blast drying was performed at 40° C. for eight hours, so as to obtain 9.4 g (yield: 73%) of the exemplary compound (M-1).

Figure 2:
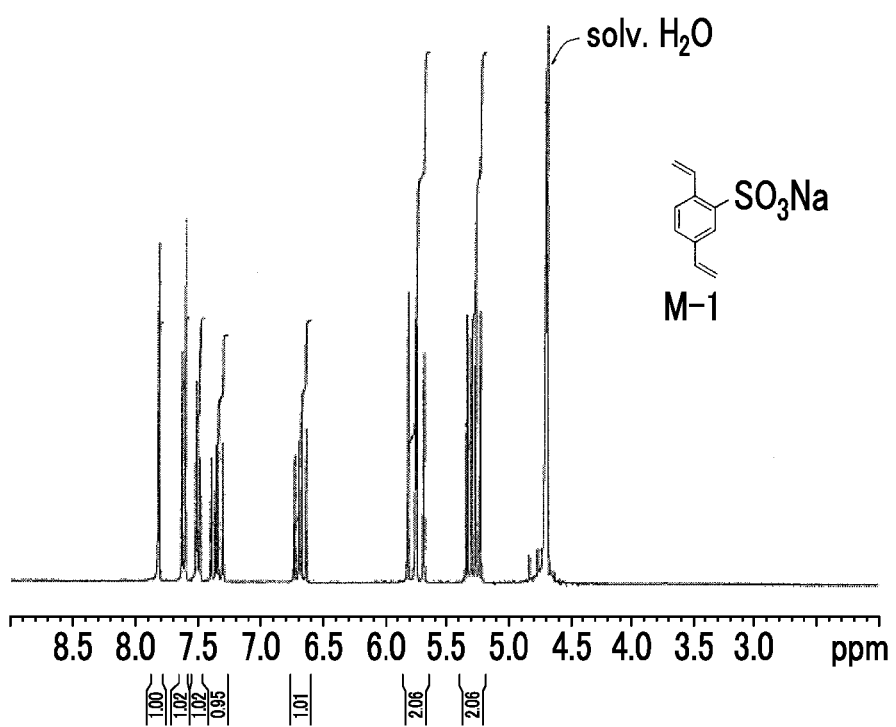
FIG. 2 is a $^1$H-NMR spectrum of a water soluble aromatic vinyl monomer (M-1) synthesized in an example, in heavy water.

A $^1$H-NMR spectrum of the exemplary compound (M-1) in heavy water is illustrated in FIG. 2. The obtained data is provided below.

$^1$H-NMR (300 MHz, D$_2$O)

δ=5.22 (dd, 1H, J=3, 12 Hz), 5.30 (dd, 1H, J=3, 12 Hz), 5.76 (dd, 1H, J=3, 18 Hz), 5.91 (dd, 1H, J=3, 18 Hz), 6.76 (dd, 1H, J=9, 18 Hz), 7.35 (dd, 1H, J=3, 6 Hz), 7.64-7.80 (m, 3H)

2. Synthesizing of Exemplary Compound (M-2)

The exemplary compound (M-2) was synthesized in the synthesization scheme below.

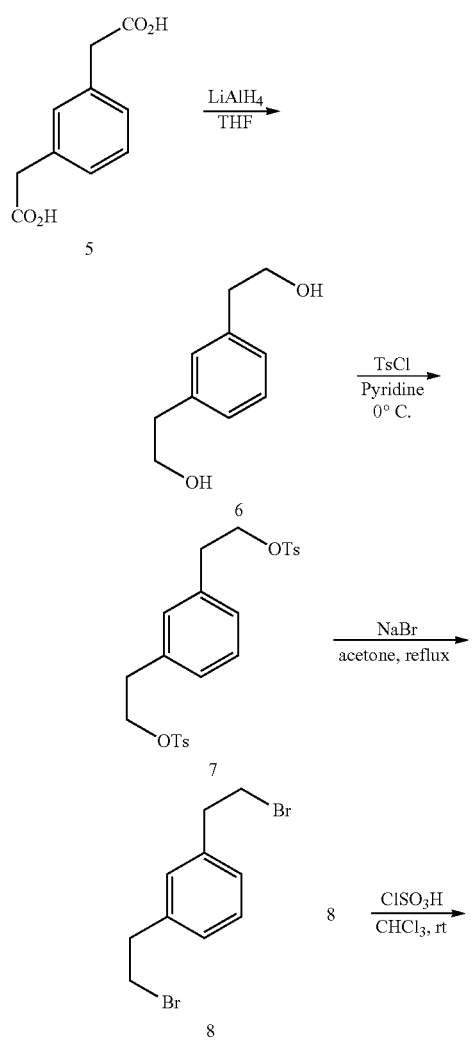

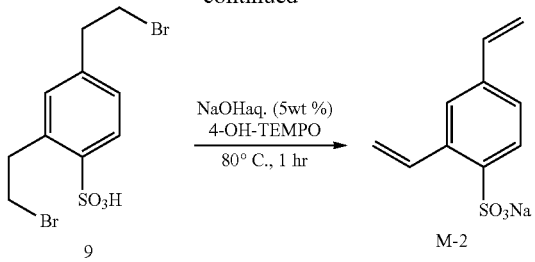

(i) Synthesizing of Compound (6)

125 ml of THF (manufactured by Wako Pure Chemical Industries, Ltd., Model number: 206-05106) and 9.77 g of lithium aluminum hydride (257 mmol, manufactured by Wako Pure Chemical Industries, Ltd., Model number: 128-01092) were added to a 1,000 ml three-neck flask, a THF solution (250 ml) of 25.0 g of 1,3-phenylene diacetate (5) (129 mmol, manufactured by Tokyo Chemical Industry Co., Ltd., Model number: P1064) was added little by little while being stirred under ice cooling. After the addition was completed, the reaction solution was stirred for one hour at room temperature (25° C.) and was further stirred for six hours, while heating and refluxing. After the reaction mixture was left for one night at room temperature (12 hours, 25° C.), the reaction mixture was ice-cooled, 9.8 ml of water, 9.8 ml of a 15% sodium hydroxide aqueous solution, and 29 ml of water were sequentially dripped carefully, the reaction was stopped, and further stirring was performed for about one hour. The reaction mixture was subjected to Celite filtration, and the filtrate was concentrated with a rotary evaporator. The obtained residue was crystallized with hexane-ethyl acetate. The obtained crystal was filtrated and dried, so as to obtain 12.8 g of the compound (6) (yield: 60%).

(ii) Synthesizing of Exemplary Compound (M-2)

The exemplary compound (M-2) was obtained in the same manner as the synthesization of the exemplary compound (M-1), except for changing the compound (1) to the compound (6) and using sodium bromide instead of lithium bromide monohydrate.

In deuterated dimethyl sulfoxide (DMSO-d6) of the exemplary compound (M-2), a $^1$H-NMR spectrum was illustrated in FIG. 3, and a $^1$H-NMR spectrum in heavy water was illustrated in FIG. 4. The obtained data is provided below.

$^1$H-NMR (300 MHz, DMSO-d6)

δ=5.22 (dd, 1H, J=3, 12 Hz), 5.30 (dd, 1H, J=3, 12 Hz), 5.76 (dd, 1H, J=3, 18 Hz), 5.91 (dd, 1H, J=3, 18 Hz), 6.76 (dd, 1H, J=9, 18 Hz), and 7.35 (dd, 1H, J=3, 6 Hz), 7.64-7.80 (m, 3H)

$^1$H-NMR (300 MHz, D$_2$O)

δ=5.32 (t, 2H, J=9 Hz), 5.79 (dd, 2H, J=3, 18 Hz), 5.71 (dd, 1H, J=9, 18 Hz), 6.71 (dd, 1H, J=3, 18 Hz), 7.28-7.42 (m, 2H), 7.65-7.75 (m, 2H)

3. Synthesizing of Exemplary Compounds (M-5), (M-7), and (M-11)

The exemplary compounds (M-5), (M-7), and (M-11) were synthesized with reference to JP360122B or the like.

In Tables 1 to 5 below, the synthesized exemplary compounds (M-1), (M-2), (M-5), (M-7), and (M-11) are respectively presented as the compounds (M-1), (M-2), (M-5), (M-7), and (M-11).

Example 1

(Manufacturing of Cation Exchange Membrane)

The coating liquid consisting of curable composition in the composition of Table 1 below was manually applied to an aluminum plate at a speed of about 5 m/min, by using a wire bar (a stainless steel rod obtained by winding a wire of 150 μm by 1 cycle/3 cm (length direction)), and subsequently the coating liquid was impregnated to nonwoven fiber (manufactured by Freudenberg Group, Product Name: FO-2223-10, thickness: 100 μm). The remaining coating liquid was removed by using a rod to which a wire was not wound. The temperature of the coating liquid at the time of application was about 50° C. The coating liquid impregnated support obtained above was exposed for 0.47 seconds by using an UV exposure machine (manufactured by Fusion UV Systems, Product Name: Light Hammer LH6, D-BULB, speed: 15 m/min, 100% intensity), and polymerizing and curing reaction was performed for the polymerizing and curing time of 0.8 seconds, and thus the cation exchange membrane was prepared. The obtained film was removed from the aluminum plate and was maintained for at least 12 hours in a 0.1 M NaCl solution, so as to manufacture the cation exchange membrane having the thickness of 150 μm.

Examples 2 to 24, Comparative Examples 1 to 9, and Reference Examples 1 and 2

Cation exchange membranes of Examples 2 to 24, Comparative Examples 1 to 9, and Reference Examples 1 and 2 were respectively manufactured in the same manner as Example 1 except for changing the compositions thereof to compositions presented in Tables 1 to 5 below, in the manufacturing of the cation exchange membrane in Example 1.

Comparative Example 10

With reference to JP2007-305371A, the cation exchange membrane of Comparative Example 10 was manufactured.

Specifically, a porous base material A-1 (thickness: 17 μm, empty hole ratio: 39%) which was subjected to a hydrophilization treatment presented in an example of JP2007-305371A was used as the support. A monomer solution of which the blending ratio was adjusted with a 0.5 mass % sodium dodecylbenzene sulfonate aqueous solution, so as to be a blending ratio of 72 mass % of vinylsulfonate, 16 mass % of sodium m-divinylbenzenesulfonate, and 1 mol % of an azo-based polymerization initiator V-50 (manufactured by Wako Pure Chemical Industries, Ltd., Product Name "2,2'-azobis(2-methylpropionamidine) dihydrochloride") with respect to 100 mol which was the total amount of the vinylsulfonate and sodium m-divinylbenzenesulfonate was prepared.

The porous base material A-1 was immersed in this monomer solution, a deaeration treatment is performed by a vacuum operation, irradiation with visible light was performed for 7 minutes, polymerization was performed by performing heating for one hour in an oven at 80° C., and this series of operations was performed twice. The obtained electrolyte film was immersed in an 1 N hydrochloric acid aqueous solution, ion exchange was performed with ultra sounds for 2 minutes. Finally, remaining hydrochloric acid was removed by using ultrapure water, vacuum drying was performed at 50° C. for 5 hours, the cation exchange membrane in the thickness of 150 μm was manufactured.

In Tables 1 to 5, the manufactured cation exchange membrane was described as the polymer electrolyte disclosed in JP2007-305371A.

Comparative Example 11

With reference to JP2011-189223A, the cation exchange membrane of Comparative Example 11 was manufactured.

Specifically, a high density polyethylene film (manufactured by Tamapoly Co., Ltd., thickness: 35 μm, density: 0.94 g/cm$^3$) was irradiated with electron beams of 200 kGy and was immersed in a glycidyl methacrylate solution at 40° C., so as to obtain a graft polymer in which glycidyl methacrylate was graft polymerized. —SO$^{3-}$Na$^+$ was introduced to an epoxy group by immersing the obtained graft polymer in a 10 mass % sodium sulfite solution at 80° C. for 96 hours, so as to obtain a salt-type cation exchange membrane. —SO$^{3-}$Na$^+$ was oxidized by immersing the obtained salt-type cation exchange membrane in a 0.5 M sulfuric acid aqueous solution for 6 hours, so as to manufacture a cation exchange membrane having a thickness of 150 μm.

In Tables 1 to 5, the manufactured cation exchange membrane was described as in the polymer electrolyte disclosed in JP2011-189223A.

With respect to the cation exchange membranes manufactured in Examples 1 to 24, Comparative Examples 1 to 11, and Reference Examples 1 and 2, the following items were evaluated.

[Ion Exchange Capacity]

The ion exchange capacity of the film was calculated by using the expression below.

Ion exchange capacity of cation exchange membrane per dry mass [meq/g]=(amount of sulfonic acid group of cation exchange membrane [mmol])/ (dry mass of cation exchange membrane [g])

Ion exchange capacity of cation exchange membrane per dry mass excluding support [meq/g]=(Ion exchange capacity of cation exchange membrane per dry mass [meq])/0.7

The measuring of the amount of the sulfonic acid group of the cation exchange membrane was performed as follows.

The cation exchange membrane was immersed in a 1.0 M hydrochloric acid aqueous solution at room temperature (25° C.) for 24 hours, such that an acid type (H$^+$ type) was completely formed. Thereafter, the cation exchange membrane was immersed in pure water for 24 hours at room temperature (25° C.), free ions in the cation exchange membrane were washed, the cation exchange membrane was immersed in a 3.0 M NaCl aqueous solution, at room temperature (25° C.) for 24 hours, so as to form a sodium type (Na$^+$ type), and substituted H$^+$ was neutralized and titrated in a 0.02 M NaOH aqueous solution, so as to obtain the amount of the sulfonic acid group.

The ion exchange capacity of the cation exchange membrane per dry mass excluding the support was calculated by perform dividing the ion exchange capacity of the cation exchange membrane by 0.7, considering that the porosity of the support was 70%.

[Selective Permeability]

The selective permeability was calculated by measuring a film potential (V) by static film potential measuring. Two cells (electrolytic bath) were separated by the film of a measurement target. Before the measurement, the film was brought into equilibrium for about 16 hours in the 0.05 M NaCl aqueous solution at room temperature (25° C.). Thereafter, NaCl aqueous solutions having different concentrations were respectively poured into electrolytic baths on the opposite sides of the film of the measurement target.

100 ml of a 0.05 M NaCl aqueous solution was poured to one cell. 100 ml of an 0.5 M NaCl aqueous solution was poured to the other cell.

After the temperature of the NaCl aqueous solution in the cells was stably maintained to 25° C. in a thermostatic water tank, while the both solutions were caused to flow toward the film surface, the both electrolytic bath and Ag/AgCl reference electrodes (manufactured by Metrohm AG in Switzerland) were connected with salt bridges, film potentials (V) were measured, and selective permeability t was calculated by Expression (a) below.

The effective area of the film was 1 cm$^2$.

$$t=(a+b)/2b \quad \text{Expression (a)}$$

Respective reference numerals in Expression (a) denote as follows.
  a: film potential (V)
  b: 0.5915 log($f_1 c_1/f_2 c_2$) (V)
  $f_1$ and $f_2$: NaCl activity coefficients of both cells
  $c_1$ and $c_2$: NaCl concentrations (M) of both cells
[Electric Resistance (Ω·cm$^2$) of Film]

Both sides of the film immersed into a 0.5 M NaCl aqueous solution for about 2 hours were wiped off using a dry filter paper at room temperature (25° C.), and the film was interposed between two chambers of a two-chamber-type cell (effective film area: 1 cm$^2$, Ag/AgCl reference electrodes (manufactured by Metrohm AG) were used as electrodes). Both chambers were filled with 100 mL of the NaCl aqueous solution having the same concentration, and the cell was placed in a thermostatic water tank at 25° C., and allowed to stand until the cell reached equilibrium. A liquid temperature in the cell exactly reached 25° C., and then electric resistance $r_1$ was measured using an alternative current bridge (frequency: 1,000 Hz). The concentration of the NaCl aqueous solution for measurement was adjusted to 0.5 M, 0.7 M, 1.5 M, 3.5 M, and 4.5 M, and measurement was carried out from a low concentration liquid in the concentration order. Next, the film was removed, and electric resistance $r_2$ between both electrodes was measured only with a 0.5 M NaCl aqueous solution to determine electric resistance r of the film from a difference: $r_1-r_2$.

In Tables 1 to 5 below, the "electric resistance of film" was simply referred to as "film resistance".

[Water Permeability (mL/m$^2$/Pa/hr)]

Water permeability of the film was measured using a device having a flow channel 10 shown in FIG. 1. In FIG. 1, reference numeral 1 represents a film, and reference numerals 3 and 4 represent flow channels of a feed solution (pure water) and a draw solution (3 M NaCl aqueous solution), respectively. An arrow of reference numeral 2 shows a flow of water separated from the feed solution.

400 mL of feed solution and 400 mL of draw solution were brought into contact (film contact area of 18 cm$^2$) through the film, and each solution was allowed to flow at a flow rate of 0.11 cm/sec in a direction of an arrow of a reference numeral 5 using a Perista pump. A rate at which water in the feed solution permeates into the draw solution through the film was analyzed by measuring masses of the feed solution and the draw solution on a real time basis so as to obtain the water permeability.

In Tables 1 to 5, evaluation was performed with values of (electrical resistance of film×water permeability). Here, it is preferable that the electrical resistance of the film was low and the water permeability was also low, and as a result, it is preferable that the value of the (electrical resistance of film×water permeability) is low.

In Tables 1 to 5 below, the descriptions are made by omitting a unit of (electrical resistance of film×water permeability), Ω·cm$^2$·mL/m$^2$/Pa/hr.

[Pin Hole Test]

The film for measuring was coated with Pt having the thickness of 1.5 nm and the number of pin holes were examined by using a scanning electron microscope (SEM).
  (Measurement Condition)
  Acceleration voltage: 2 kV
  Working distance: 4 mm
  Aperture: 4
  Magnification: ×100,000 times
  Inclination of field of view: 3°

Evaluation of pin holes was carried out from an SEM picture, in view of the following.
  (Evaluation Criteria)
  A: A defect or a pin hole was not observed.
  B: 1 to 2 of defects or pin holes were observed.
  C: 3 or more of defects or pin holes were observed.

The evaluation "A" was an acceptable level of this test.

[Film Mass Decreasing Rate (%) after Ultrasonic Treatment]

300 mL of ion exchange water was poured to a 500 mL glass beaker, and the manufactured cation exchange membrane was immersed in this ion exchange water. Further, an ultrasonic treatment was performed in a table-type ultrasonic Cleaner 1510 (Product Name) manufactured by Branson Ultrasonics Corporation at 25° C. for 60 minutes. The film mass was measured before and after the ultrasonic treatment, the film mass decreasing rate was calculated based on the expression below, so as to evaluate stability of the cation exchange membrane.

(Film mass before ultrasonic treatment−film mass after ultrasonic treatment)/film mass before ultrasonic treatment×100

[pH Resistance]

The film was respectively immersed to a hydrochloric acid aqueous solution of pH 2 and a sodium hydroxide aqueous solution of pH 12 and was maintained at room temperature (25° C.) for 24 hours. The ratio of the water permeability of the film after immersion to the water permeability of the film before immersion (retention rate (%)) was calculated.

In all of the hydrochloric acid aqueous solution of pH 2 and the sodium hydroxide aqueous solution of pH 12, a case where the retention rate of the water permeability of the film before and after the immersion was 90% or greater was evaluated as "A", and a case where the retention rate in any one of the solutions was less than 90% was evaluated as "C".

The evaluation "A" is an acceptable level of this test.

The obtained results were summarized and presented in Tables 1 to 5.

The photopolymerization initiators presented in Tables 1 to 5 denote the corresponding exemplary compounds.

The abbreviations of the compounds of Tables 1 to 5 denote the compounds below.
  AMPS: 2-Acrylamide-2-methylpropanesulfonic acid (manufactured by Tokyo Chemical Industry Co., Ltd.)
  2-SEM: 2-Sulfoethyl methacrylate
  SS—Li: Lithium p-styrene sulfonate
  SS—Na: Sodium p-styrenesulfonate (manufactured by Wako Pure Chemical Industries, Ltd.)
  SS-Py: Pyridinium p-styrenesulfonate
  VSA: Vinyl sulfonate AA: Acrylic acid MBA: Methylenebisacrylamide (manufactured by Tokyo Chemical Industry Co., Ltd.)

BAP: 1,4-Bis(acryloyl)piperazine (manufactured by Sigma-Aldrich Corporation)

EGDM: Ethylene glycol dimethacrylate

TEGDM: Triethylene glycol dimethacrylate (manufactured by Tokyo Chemical Industry Co., Ltd.)

MEHQ: Hydroquinone monomethyl ether

AZ-1: 2,2'-Azobis(2-methylpropionamidine) dihydrochloride (manufactured by Wako Pure Chemical Industries, Ltd., Product Name: "V-50")

AZ-2: 2,2'-Azobis[N-(2-carboxyethyl)-2-methylpropionamidine] n-hydrate (manufactured by Wako Pure Chemical Industries, Ltd., Product Name: "VA-057")

AZ-3: 2,2'-Azobis[2-(2-imidazolin-2-yl)propane] dihydrochloride (manufactured by Wako Pure Chemical Industries, Ltd., Product Name: "VA-044")

BPO: Benzoyl peroxide

CTR-1: 3-Mercapto-1,2-propanediol (manufactured by Tokyo Chemical Industry Co., Ltd.)

CTR-2: Dithioerythritol (manufactured by Tokyo Chemical Industry Co., Ltd.)

CTR-3: Pentaerythritol tetrakis(3-mercaptobutyrate) (manufactured by Showa Denko K. K., Product Name: "KARENZ MT PE-1")

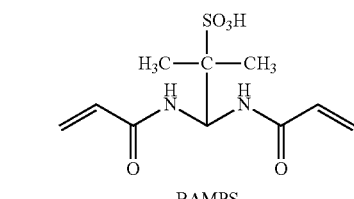

BAMPS

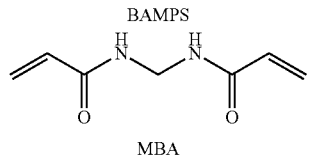

MBA

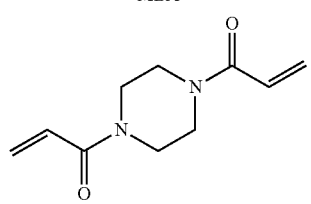

BAP

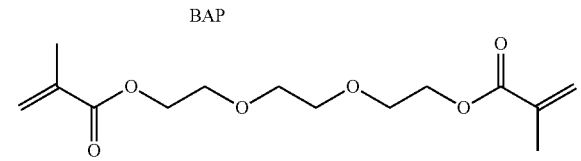

TEGDM

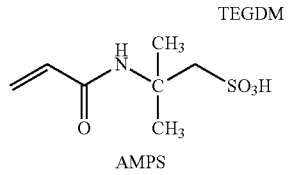

AMPS

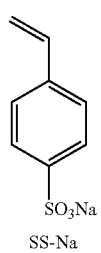

SS-Na

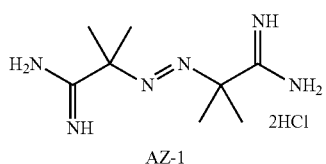

AZ-1

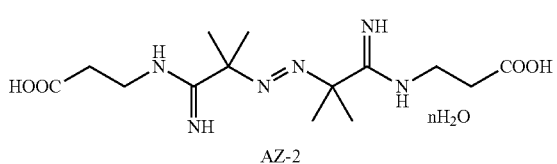

AZ-2

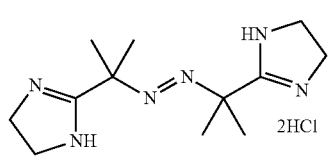

AZ-3

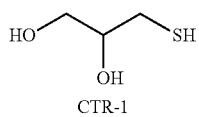

CTR-1

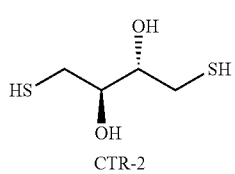

CTR-2

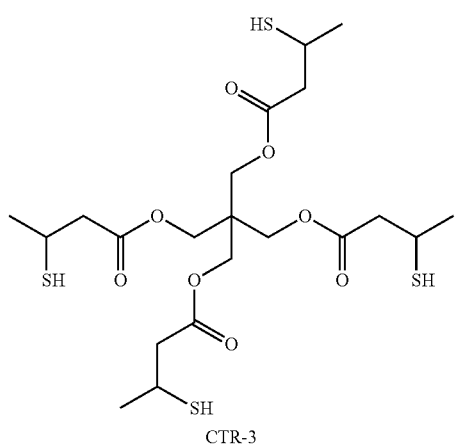

CTR-3

Here, BAMPS is a compound disclosed in U.S. Pat. No. 4,034,001A.

TABLE 1

| Item | | Type | Example 1 | Example 2 | Example 3 | Example 4 | Example 5 |
|---|---|---|---|---|---|---|---|
| Monomer | Monofunctional monomer | AMPS | 10 | | | 20 | |
| | | 2-SEM | | | | | |
| | | SS-Li | | | | | |
| | | SS-Na | | 10 | | | 20 |
| | | SS-Py | | | | | |
| | | VSA | | | 10 | | |
| | | AA | | | | | |
| | Crosslinking agent | Compound (M-1) | 51.8 | 51.8 | 51.8 | | |
| | | Compound (M-2) | | | | 41.8 | 41.8 |
| | | Compound (M-5) | | | | | |
| | | Compound (M-11) | | | | | |
| | | Compound (M-7) | | | | | |
| | | BAMPS | | | | | |
| | | MBA | | | | | |
| | | BAP | | | | | |
| | | EGDM | | | | | |
| | | TEGDM | | | | | |
| Polymer electrolyte | | disclosed in JP2007-305371A | | | | | |
| | | disclosed in JP2011-189223A | | | | | |
| Polymerization initiator | Photopolymerization initiator | PI-1-1 | 0.7 | 0.7 | 0.7 | 0.7 | 0.7 |
| | | PI-1-2 | | | | | |
| | | PI-2-4 | | | | | |
| | | PI-3-7 | | | | | |
| | | PI-2-9 | | | | | |
| | Thermal polymerization initiator | AZ-1 | | | | | |
| | | AZ-2 | | | | | |
| | | AZ-3 | | | | | |
| | | BPO | | | | | |
| Chain transfer agent | | CTR-1 | 0.4 | 0.4 | 0.4 | 0.4 | 0.4 |
| | | CTR-2 | | | | | |
| | | CTR-3 | | | | | |
| Polymerization inhibitor | | MEHQ | 0.1 | 0.1 | 0.1 | 0.1 | 0.1 |
| Solvent | | Pure water | 37.1 | 37.1 | 37.1 | 37.1 | 37.1 |
| Total mass | | Total mass | 100 | 100 | 100 | 100 | 100 |
| Details of content of curable composition | Polymerization component and solvent | Polymerization component [mass %] | 61.8 | 61.8 | 61.8 | 61.8 | 61.8 |
| | | Solvent [mass %] | 37.1 | 37.1 | 37.1 | 37.1 | 37.1 |
| | Individual component | Monofunctional monomer [mass %] | 10 | 10 | 10 | 20 | 20 |
| | | Crosslinking agent [mass %] | 51.8 | 51.8 | 51.8 | 41.8 | 41.8 |
| | | Polymerization initiator [mass %] | 0.7 | 0.7 | 0.7 | 0.7 | 0.7 |
| | | Chain transfer agent [mass %] | 0.4 | 0.4 | 0.4 | 0.4 | 0.4 |
| | | Chain transfer agent [mass %]/ Polymerization initiator [mass %] | 0.57 | 0.57 | 0.57 | 0.57 | 0.57 |
| | Ion exchange capacity | [meq/g] | 4.3 | 4.3 | 5.1 | 4.4 | 4.4 |
| Evaluation Item | | Water permeability (mL/m$^2$/Pa/hr) | $4.1 \times 10^{-5}$ | $4.1 \times 10^{-5}$ | $4.2 \times 10^{-5}$ | $4.8 \times 10^{-5}$ | $4.9 \times 10^{-5}$ |
| | | Film resistance ($\Omega \cdot cm^2$) | 1.4 | 1.5 | 1.4 | 1.5 | 1.5 |
| | | Selective permeability | 1.00 | 1.00 | 1.00 | 1.00 | 1.00 |
| | | (Film resistance) × (water permeability) | $5.7 \times 10^{-5}$ | $6.2 \times 10^{-5}$ | $5.9 \times 10^{-5}$ | $7.2 \times 10^{-5}$ | $7.4 \times 10^{-5}$ |
| | | Pin hole test | A | A | A | A | A |
| | | Film mass decreasing rate (%) after ultrasonic treatment | 0.1 | 0.1 | 0.1 | 0.1 | 0.2 |
| | | pH resistance | A | A | A | A | A |

| Item | | Type | Example 6 | Example 7 | Example 8 | Example 9 | Example 10 |
|---|---|---|---|---|---|---|---|
| Monomer | Monofunctional monomer | AMPS | | | | 20 | 30 |
| | | 2-SEM | | | | | |
| | | SS-Li | | | | | |
| | | SS-Na | | 10 | 10 | | |
| | | SS-Py | | | | | |
| | | VSA | | | | | |
| | | AA | | | | | |

TABLE 1-continued

| | | | | | | | |
|---|---|---|---|---|---|---|---|
| | Crosslinking agent | Compound (M-1) | | | | 41.8 | 31.8 |
| | | Compound (M-2) | | | | | |
| | | Compound (M-5) | 61.8 | | | | |
| | | Compound (M-11) | | 51.8 | | | |
| | | Compound (M-7) | | | 51.8 | | |
| | | BAMPS | | | | | |
| | | MBA | | | | | |
| | | BAP | | | | | |
| | | EGDM | | | | | |
| | | TEGDM | | | | | |
| Polymer electrolyte | disclosed in JP2007-305371A | | | | | | |
| | disclosed in JP2011-189223A | | | | | | |
| Polymerization initiator | Photopolymerization initiator | PI-1-1 | 0.7 | 0.7 | 0.7 | 0.7 | 0.7 |
| | | PI-1-2 | | | | | |
| | | PI-2-4 | | | | | |
| | | PI-3-7 | | | | | |
| | | PI-2-9 | | | | | |
| | Thermal polymerization initiator | AZ-1 | | | | | |
| | | AZ-2 | | | | | |
| | | AZ-3 | | | | | |
| | | BPO | | | | | |
| Chain transfer agent | | CTR-1 | 0.4 | 0.4 | 0.4 | 0.4 | 0.4 |
| | | CTR-2 | | | | | |
| | | CTR-3 | | | | | |
| Polymerization inhibitor | | MEHQ | 0.1 | 0.1 | 0.1 | 0.1 | 0.1 |
| Solvent | | Pure water | 37.1 | 37.1 | 37.1 | 37.1 | 37.1 |
| Total mass | | Total mass | 100 | 100 | 100 | 100 | 100 |
| Details of content of curable composition | Polymerization component and solvent | Polymerization component [mass %] | 61.8 | 61.8 | 61.8 | 61.8 | 61.8 |
| | | Solvent [mass %] | 37.1 | 37.1 | 37.1 | 37.1 | 37.1 |
| | Individual component | Monofunctional monomer [mass %] | 0 | 10 | 10 | 20 | 30 |
| | | Crosslinking agent [mass %] | 61.8 | 51.8 | 51.8 | 41.8 | 31.8 |
| | | Polymerization initiator [mass %] | 0.7 | 0.7 | 0.7 | 0.7 | 0.7 |
| | | Chain transfer agent [mass %] | 0.4 | 0.4 | 0.4 | 0.4 | 0.4 |
| | | Chain transfer agent [mass %]/ Polymerization initiator [mass %] | 0.57 | 0.57 | 0.57 | 0.57 | 0.57 |
| | Ion exchange capacity | [meq/g] | 4.3 | 3.2 | 3.2 | 4.4 | 4.5 |
| Evaluation Item | | Water permeability (mL/m$^2$/Pa/hr) | $4.5 \times 10^{-5}$ | $4.3 \times 10^{-5}$ | $4.2 \times 10^{-5}$ | $4.9 \times 10^{-5}$ | $5.1 \times 10^{-5}$ |
| | | Film resistance ($\Omega \cdot cm^2$) | 1.6 | 1.1 | 1.1 | 1.3 | 1.5 |
| | | Selective permeability | 1.00 | 1.00 | 1.00 | 0.99 | 0.99 |
| | | (Film resistance) × (water permeability) | $7.2 \times 10^{-5}$ | $4.7 \times 10^{-5}$ | $4.6 \times 10^{-5}$ | $6.4 \times 10^{-5}$ | $7.7 \times 10^{-5}$ |
| | | Pin hole test | A | A | A | A | A |
| | | Film mass decreasing rate (%) after ultrasonic treatment | 0.1 | 0.1 | 0.1 | 0.2 | 0.3 |
| | | pH resistance | A | A | A | A | A |

TABLE 2

| Item | Type | | Example 11 | Example 12 | Example 13 | Example 14 | Example 15 |
|---|---|---|---|---|---|---|---|
| Monomer | Monofunctional monomer | AMPS | 40 | 10 | 10 | 10 | 10 |
| | | 2-SEM | | | | | |
| | | SS-Li | | | | | |
| | | SS-Na | | | | | |
| | | SS-Py | | | | | |
| | | VSA | | | | | |
| | | AA | | | | | |

TABLE 2-continued

| Item | | Type | | | | | |
|---|---|---|---|---|---|---|---|
| | Crosslinking agent | Compound (M-1) | 21.8 | 51.8 | 51.8 | 51.8 | 51.8 |
| | | Compound (M-2) | | | | | |
| | | Compound (M-5) | | | | | |
| | | Compound (M-11) | | | | | |
| | | Compound (M-7) | | | | | |
| | | BAMPS | | | | | |
| | | MBA | | | | | |
| | | BAP | | | | | |
| | | EGDM | | | | | |
| | | TEGDM | | | | | |
| Polymer electrolyte | | disclosed in JP2007-305371A | | | | | |
| | | disclosed in JP2011-189223A | | | | | |
| Polymerization initiator | Photopolymerization initiator | PI-1-1 | 0.7 | | | | |
| | | PI-1-2 | | 0.7 | | | |
| | | PI-2-4 | | | 0.7 | | |
| | | PI-3-7 | | | | 0.7 | |
| | | PI-2-9 | | | | | 0.7 |
| | Thermal polymerization initiator | AZ-1 | | | | | |
| | | AZ-2 | | | | | |
| | | AZ-3 | | | | | |
| | | BPO | | | | | |
| Chain transfer agent | | CTR-1 | 0.4 | 0.4 | 0.4 | 0.4 | 0.4 |
| | | CTR-2 | | | | | |
| | | CTR-3 | | | | | |
| Polymerization inhibitor | | MEHQ | 0.1 | 0.1 | 0.1 | 0.1 | 0.1 |
| Solvent | | Pure water | 37.1 | 37.1 | 37.1 | 37.1 | 37.1 |
| Total mass | | Total mass | 100 | 100 | 100 | 100 | 100 |
| Details of content of curable composition | Polymerization component and solvent | Polymerization component [mass %] | 61.8 | 61.8 | 61.8 | 61.8 | 61.8 |
| | | Solvent [mass %] | 37.1 | 37.1 | 37.1 | 37.1 | 37.1 |
| | Individual component | Monofunctional monomer [mass %] | 40 | 10 | 10 | 10 | 10 |
| | | Crosslinking agent [mass %] | 21.8 | 51.8 | 51.8 | 51.8 | 51.8 |
| | | Polymerization initiator [mass %] | 0.7 | 0.7 | 0.7 | 0.7 | 0.7 |
| | | Chain transfer agent [mass %] | 0.4 | 0.4 | 0.4 | 0.4 | 0.4 |
| | | Chain transfer agent [mass %]/ Polymerization initiator [mass %] | 0.57 | 0.57 | 0.57 | 0.57 | 0.57 |
| | Ion exchange capacity | [meq/g] | 4.6 | 4.3 | 4.3 | 4.3 | 4.3 |
| Evaluation Item | | Water permeability (mL/m$^2$/Pa/hr) | $5.2 \times 10^{-5}$ | $4.1 \times 10^{-5}$ | $4.1 \times 10^{-5}$ | $4.1 \times 10^{-5}$ | $4.1 \times 10^{-5}$ |
| | | Film resistance ($\Omega \cdot cm^2$) | 1.7 | 1.4 | 1.4 | 1.4 | 1.4 |
| | | Selective permeability | 1.00 | 1.00 | 1.00 | 0.99 | 1.00 |
| | | (Film resistance) × (water permeability) | $8.8 \times 10^{-5}$ | $5.7 \times 10^{-5}$ | $5.7 \times 10^{-5}$ | $5.7 \times 10^{-5}$ | $5.7 \times 10^{-5}$ |
| | | Pin hole test | A | A | A | A | A |
| | | Film mass decreasing rate (%) after ultrasonic treatment | 0.4 | 0.1 | 0.2 | 0.1 | 0.2 |
| | | pH resistance | A | A | A | A | A |

| Item | | Type | Example 16 | Example 17 | Example 18 | Example 19 | Example 20 |
|---|---|---|---|---|---|---|---|
| Monomer | Monofunctional monomer | AMPS | 10 | 10 | 10 | 10 | |
| | | 2-SEM | | | | | |
| | | SS-Li | | | | | |
| | | SS-Na | | | | | |
| | | SS-Py | | | | | |
| | | VSA | | | | | 72 |
| | | AA | | | | | |
| | Crosslinking agent | Compound (M-1) | 51.8 | 51.8 | 51.8 | 51.8 | |
| | | Compound (M-2) | | | | | 16 |
| | | Compound (M-5) | | | | | |
| | | Compound (M-11) | | | | | |
| | | Compound (M-7) | | | | | |
| | | BAMPS | | | | | |
| | | MBA | | | | | |
| | | BAP | | | | | |
| | | EGDM | | | | | |
| | | TEGDM | | | | | |

TABLE 2-continued

| Polymer electrolyte | | disclosed in JP2007-305371A | | | | | |
|---|---|---|---|---|---|---|---|
| | | disclosed in JP2011-189223A | | | | | |
| Polymerization initiator | Photopolymerization initiator | PI-1-1 | 0.7 | 0.7 | 0.4 | 0.15 | 0.7 |
| | | PI-1-2 | | | | | |
| | | PI-2-4 | | | | | |
| | | PI-3-7 | | | | | |
| | | PI-2-9 | | | | | |
| | Thermal polymerization initiator | AZ-1 | | | | | |
| | | AZ-2 | | | | | |
| | | AZ-3 | | | | | |
| | | BPO | | | | | |
| Chain transfer agent | | CTR-1 | | | 0.7 | 0.95 | 0.4 |
| | | CTR-2 | 0.4 | | | | |
| | | CTR-3 | | 0.4 | | | |
| Polymerization inhibitor | | MEHQ | 0.1 | 0.1 | 0.1 | 0.1 | 0.1 |
| Solvent | | Pure water | 37.1 | 37.1 | 37.1 | 37.1 | 11 |
| Total mass | | Total mass | 100 | 100 | 100 | 100 | 100 |
| Details of content of curable composition | Polymerization component and solvent | Polymerization component [mass %] | 61.8 | 61.8 | 61.8 | 61.8 | 88 |
| | | Solvent [mass %] | 37.1 | 37.1 | 37.1 | 37.1 | 10.9 |
| | Individual component | Monofunctional monomer [mass %] | 10 | 10 | 10 | 10 | 72 |
| | | Crosslinking agent [mass %] | 51.8 | 51.8 | 51.8 | 51.8 | 16 |
| | | Polymerization initiator [mass %] | 0.7 | 0.7 | 0.4 | 0.15 | 0.7 |
| | | Chain transfer agent [mass %] | 0.4 | 0.4 | 0.7 | 0.95 | 0.4 |
| | | Chain transfer agent [mass %]/ Polymerization initiator [mass %] | 0.57 | 0.57 | 1.75 | 6.33 | 0.57 |
| | Ion exchange capacity | [meq/g] | 4.2 | 4.2 | 4.3 | 4.2 | 7.0 |
| Evaluation Item | | Water permeability (mL/m$^2$/Pa/hr) | $4.1 \times 10^{-5}$ | $4.1 \times 10^{-5}$ | $4.4 \times 10^{-5}$ | $4.7 \times 10^{-5}$ | $4.3 \times 10^{-5}$ |
| | | Film resistance ($\Omega \cdot cm^2$) | 1.4 | 1.4 | 1.7 | 2.1 | 1.3 |
| | | Selective permeability | 0.99 | 1.00 | 0.99 | 0.99 | 0.99 |
| | | (Film resistance) × (water permeability) | $5.7 \times 10^{-5}$ | $5.7 \times 10^{-5}$ | $7.5 \times 10^{-5}$ | $9.9 \times 10^{-5}$ | $5.6 \times 10^{-5}$ |
| | | Pin hole test | A | A | A | A | A |
| | | Film mass decreasing rate (%) after ultrasonic treatment | 0.3 | 0.2 | 0.3 | 0.5 | 0.2 |
| | | pH resistance | A | A | A | A | A |

TABLE 3

| Item | Type | | Example 21 | Example 22 | Example 23 | Example 24 |
|---|---|---|---|---|---|---|
| Monomer | Monofunctional monomer | AMPS | | | 4 | |
| | | 2-SEM | | | | 4 |
| | | SS-Li | 10 | | | |
| | | SS-Na | | | | |
| | | SS-Py | | 10 | 5 | 5 |
| | | VSA | | | | |
| | | AA | | | 1 | 1 |
| | Crosslinking agent | Compound (M-1) | 51.8 | 51.8 | 51.8 | 51.8 |
| | | Compound (M-2) | | | | |
| | | Compound (M-5) | | | | |
| | | Compound (M-11) | | | | |
| | | Compound (M-7) | | | | |
| | | BAMPS | | | | |
| | | MBA | | | | |
| | | BAP | | | | |
| | | EGDM | | | | |
| | | TEGDM | | | | |

TABLE 3-continued

| Item | | Type | Example 21 | Example 22 | Example 23 | Example 24 |
|---|---|---|---|---|---|---|
| Polymer electrolyte | | disclosed in JP2007-305371A | | | | |
| | | disclosed in JP2011-189223A | | | | |
| Polymerization initiator | Photopolymerization initiator | PI-1-1 | 0.7 | 0.7 | 0.7 | 0.7 |
| | | PI-1-2 | | | | |
| | | PI-2-4 | | | | |
| | | PI-3-7 | | | | |
| | | PI-2-9 | | | | |
| | Thermal polymerization initiator | AZ-1 | | | | |
| | | AZ-2 | | | | |
| | | AZ-3 | | | | |
| | | BPO | | | | |
| Chain transfer agent | | CTR-1 | 0.4 | 0.4 | 0.4 | 0.4 |
| | | CTR-2 | | | | |
| | | CTR-3 | | | | |
| Polymerization inhibitor | | MEHQ | 0.1 | 0.1 | 0.1 | 0.1 |
| Solvent | | Pure water | 37.1 | 37.1 | 37.1 | 37.1 |
| Total mass | | Total mass | 100 | 100 | 100 | 100 |
| Details of content of curable composition | Polymerization component and solvent | Polymerization component [mass %] | 61.8 | 61.8 | 61.8 | 61.8 |
| | | Solvent [mass %] | 37.1 | 37.1 | 37.1 | 37.1 |
| | Individual component | Monofunctional monomer [mass %] | 40 | 10 | 10 | 10 |
| | | Crosslinking agent [mass %] | 21.8 | 51.8 | 51.8 | 51.8 |
| | | Polymerization initiator [mass %] | 0.7 | 0.7 | 0.7 | 0.7 |
| | | Chain transfer agent [mass %] | 0.4 | 0.4 | 0.4 | 0.4 |
| | | Chain transfer agent [mass %]/ Polymerization initiator [mass %] | 0.57 | 0.57 | 0.57 | 0.57 |
| | Ion exchange capacity | [meq/g] | 4.6 | 4.3 | 4.3 | 4.3 |
| Evaluation Item | | Water permeability (mL/m$^2$/Pa/hr) | $4.2 \times 10^{-5}$ | $4.0 \times 10^{-5}$ | $4.1 \times 10^{-5}$ | $4.1 \times 10^{-5}$ |
| | | Film resistance ($\Omega \cdot cm^2$) | 1.3 | 1.4 | 1.3 | 1.4 |
| | | Selective permeability | 1 | 0.99 | 1 | 0.99 |
| | | (Film resistance) × (water permeability) | $5.5 \times 10^{-5}$ | $5.6 \times 10^{-5}$ | $5.3 \times 10^{-5}$ | $5.7 \times 10^{-5}$ |
| | | Pin hole test | A | A | A | A |
| | | Film mass decreasing rate (%) after ultrasonic treatment | 0.1 | 0.1 | 0.1 | 0.1 |
| | | pH resistance | A | A | A | A |

TABLE 4

| Item | Type | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Monomer | Monofunctional monomer | AMPS | | 30 | 30 | 30 | 30 | 30 | 10 |
| | | 2-SEM | | | | | | | |
| | | SS-Li | | | | | | | |
| | | SS-Na | | | | | | | |
| | | SS-Py | | | | | | | |
| | | VSA | | | | | | | |
| | | AA | | | | | | | |
| | Crosslinking agent | Compound (M-1) | | | | | | | 51.8 |
| | | Compound (M-2) | | | | | | | |
| | | Compound (M-5) | | | | | | | |
| | | Compound (M-11) | | | | | | | |
| | | Compound (M-7) | | | | | | | |
| | | BAMPS | 61.8 | 31.8 | | | | | |
| | | MBA | | | 31.8 | | | | |
| | | BAP | | | | 31.8 | | | |
| | | EGDM | | | | | 31.8 | | |
| | | TEGDM | | | | | | 31.8 | |

TABLE 4-continued

| Item | Type | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Polymer electrolyte | disclosed in JP2007-305371A | | | | | | | | |
| | disclosed in JP2011-189223A | | | | | | | | |
| Polymerization initiator | Photopolymerization initiator | PI-1-1 | 0.7 | 0.7 | 0.7 | 0.7 | 0.7 | 0.7 | |
| | | PI-1-2 | | | | | | | |
| | | PI-2-4 | | | | | | | |
| | | PI-3-7 | | | | | | | |
| | | PI-2-9 | | | | | | | |
| | Thermal polymerization initiator | AZ-1 | | | | | | | |
| | | AZ-2 | | | | | | | |
| | | AZ-3 | | | | | | | |
| | | BPO | | | | | | | |
| Chain transfer agent | | CTR-1 | 0.4 | 0.4 | 0.4 | 0.4 | 0.4 | 0.4 | 0.4 |
| | | CTR-2 | | | | | | | |
| | | CTR-3 | | | | | | | |
| Polymerization inhibitor | | MEHQ | 0.1 | 0.1 | 0.1 | 0.1 | 0.1 | 0.1 | 0.1 |
| Solvent | | Pure water | 37.1 | 37.1 | 37.1 | 37.1 | 37.1 | 37.1 | 37.1 |
| Total mass | | Total mass | 100 | 100 | 100 | 100 | 100 | 100 | 99 |
| Details of content of curable composition | Polymerization component and solvent | Polymerization component [mass %] | 61.8 | 61.8 | 61.8 | 61.8 | 61.8 | 61.8 | 61.8 |
| | | Solvent [mass %] | 37.1 | 37.1 | 37.1 | 37.1 | 37.1 | 37.1 | 37.1 |
| | Individual component | Monofunctional monomer [mass %] | 0 | 30 | 30 | 30 | 30 | 30 | 10 |
| | | Crosslinking agent [mass %] | 61.8 | 31.8 | 31.8 | 31.8 | 31.8 | 31.8 | 51.8 |
| | | Polymerization initiator [mass %] | 0.7 | 0.7 | 0.7 | 0.7 | 0.7 | 0.7 | 0 |
| | | Chain transfer agent [mass %] | 0.4 | 0.4 | 0.4 | 0.4 | 0.4 | 0.4 | 0.4 |
| | | Chain transfer agent [mass %]/ Polymerization initiator [mass %] | 0.57 | 0.57 | 0.57 | 0.57 | 0.57 | 0.57 | |
| | Ion exchange capacity | [meq/g] | 1.9 | 1.9 | 1.8 | 1.7 | 1.8 | 1.9 | 1.7 |
| Evaluation Item | | Water permeability (mL/m$^2$/Pa/hr) | $5.6 \times 10^{-5}$ | $5.5 \times 10^{-5}$ | $5.6 \times 10^{-5}$ | $7.7 \times 10^{-5}$ | $7.2 \times 10^{-5}$ | $7.0 \times 10^{-5}$ | Cannot be measured |
| | | Film resistance ($\Omega \cdot cm^2$) | 3.0 | 3.1 | 3.7 | 5.1 | 5.3 | 5.6 | Cannot be measured |
| | | Selective permeability | 0.98 | 0.97 | 0.97 | 0.89 | 0.88 | 0.87 | Cannot be measured |
| | | (Film resistance) × (water permeability) | $1.7 \times 10^{-4}$ | $1.7 \times 10^{-4}$ | $2.1 \times 10^{-4}$ | $3.9 \times 10^{-4}$ | $3.8 \times 10^{-4}$ | $3.9 \times 10^{-4}$ | Cannot be measured |
| | | Pin hole test | B | B | B | C | C | C | C |
| | | Film mass decreasing rate (%) after ultrasonic treatment | 0.7 | 1.4 | 2.6 | 6.7 | 8.3 | 13.1 | Cannot be measured |
| | | pH resistance | A | C | C | C | C | C | C |

TABLE 5

| Item | Type | | Comparative Example 8 | Comparative Example 9 | Comparative Example 10 | Comparative Example 11 | Reference Example 1 | Reference Example 2 |
|---|---|---|---|---|---|---|---|---|
| Monomer | Monofunctional monomer | AMPS | 10 | | | | 10 | 10 |
| | | 2-SEM | | | | | | |
| | | SS-Li | | | | | | |
| | | SS-Na | | | | | | |
| | | SS-Py | | | | | | |
| | | VSA | | | | | | |
| | | AA | | 72 | | | | |
| | Crosslinking agent | Compound (M-1) | 51.8 | | | | 51.8 | 51.8 |
| | | Compound (M-2) | | 16 | | | | |
| | | Compound (M-5) | | | | | | |
| | | Compound (M-11) | | | | | | |
| | | Compound (M-7) | | | | | | |
| | | BAMPS | | | | | | |
| | | MBA | | | | | | |
| | | BAP | | | | | | |
| | | EGDM | | | | | | |
| | | TEGDM | | | | | | |

TABLE 5-continued

| Item | Type | | Comparative Example 8 | Comparative Example 9 | Comparative Example 10 | Comparative Example 11 | Reference Example 1 | Reference Example 2 |
|---|---|---|---|---|---|---|---|---|
| Polymer electrolyte | disclosed in JP2007-305371A | | | | 100 | | | |
| | disclosed in JP2011-189223A | | | | | 100 | | |
| Polymerization initiator | Photopolymerization initiator | PI-1-1 | 0.7 | | | | 1.05 | 0.09 |
| | | PI-1-2 | | | | | | |
| | | PI-2-4 | | | | | | |
| | | PI-3-7 | | | | | | |
| | | PI-2-9 | | | | | | |
| | Thermal polymerization initiator | AZ-1 | | 0.7 | | | | |
| | | AZ-2 | | | | | | |
| | | AZ-3 | | | | | | |
| | | BPO | | | | | | |
| Chain transfer agent | | CTR-1 | | | | | 0.05 | 1.01 |
| | | CTR-2 | | | | | | |
| | | CTR-3 | | | | | | |
| Polymerization inhibitor | | MEHQ | 0.1 | 0.1 | | | 0.1 | 0.1 |
| Solvent | | Pure water | 37.1 | 10.9 | 0 | 0 | 37.1 | 37.1 |
| Total mass | | Total mass | 99.9 | 100 | 100 | 100 | 100 | 100 |
| Details of content of curable composition | Polymerization component and solvent | Polymerization component [mass %] | 61.8 | 89.1 | 100 | 100 | 61.8 | 61.8 |
| | | Solvent [mass %] | 37.1 | 10.9 | 0 | 0 | 37.1 | 37.1 |
| | Individual component | Monofunctional monomer [mass %] | 10 | 72 | 0 | 0 | 10 | 10 |
| | | Crosslinking agent [mass %] | 51.8 | 16 | 0 | 0 | 51.8 | 51.8 |
| | | Polymerization initiator [mass %] | 0.7 | 0.7 | 0 | 0 | 1.05 | 0.09 |
| | | Chain transfer agent [mass %] | 0 | 0 | 0 | 0 | 0.05 | 1.01 |
| | | Chain transfer agent [mass %]/ Polymerization initiator [mass %] | 0.00 | 0.00 | | | 0.05 | 11.22 |
| | Ion exchange capacity | [meq/g] | 1.4 | 7 | 6.8 | 6.9 | 1.3 | 1.2 |
| Evaluation Item | | Water permeability (mL/m²/Pa/hr) | $1.3 \times 10^{-4}$ | $1.1 \times 10^{-4}$ | $1.0 \times 10^{-4}$ | $1.3 \times 10^{-4}$ | $1.4 \times 10^{-4}$ | $1.5 \times 10^{-4}$ |
| | | Film resistance ($\Omega \cdot cm^2$) | 3 | 3.5 | 1.2 | 3 | 3.5 | 3.2 |
| | | Selective permeability | 0.98 | 0.98 | 0.99 | 0.99 | 0.96 | 0.95 |
| | | (Film resistance) × (water permeability) | $3.9 \times 10^{-4}$ | $3.9 \times 10^{-4}$ | $1.2 \times 10^{-4}$ | $3.9 \times 10^{-4}$ | $4.9 \times 10^{-4}$ | $4.8 \times 10^{-4}$ |
| | | Pin hole test | C | C | A | A | C | C |
| | | Film mass decreasing rate (%) after ultrasonic treatment | 11.6 | 11.1 | 0.3 | 0.3 | 10.5 | 11.3 |
| | | pH resistance | C | C | C | C | C | C |

As clearly presented in Tables 1 to 5, it is understood that the cation exchange membranes of Examples 1 to 24 that satisfied the regulation of the invention are cation exchange membranes with high performance of which all of the selective permeability exhibited high values, and all of the products of the electrical resistance of the films and the water permeability exhibited low values. All of the film mass decreasing rates after the ultrasonic treatment were low and durability against acid and alkali was also excellent, such that the generation of the pin holes was prevented.

With respect to this, in the cation exchange membranes of Comparative Examples 1 to 6, 8, 9, and 11, all of the electrical resistance of the film, the water permeability, and the product of the electrical resistance of the film and the water permeability exhibited high values, and thus the cation exchange membranes of Comparative Examples 1 to 6, 8, 9, and 11 were insufficient in view of basic characteristics of the ion exchange membranes. The cation exchange membrane of Comparative Example 7 had many defects and the film performances thereof were not able to be evaluated. With respect to all of the cation exchange membranes of Comparative Examples 1 to 11, any one of the resistance to the ultrasonic treatment, durability to acid and alkali, or the prevention of the generation of the pin holes was insufficient.

From this, in view of the basic characteristics of the ion exchange membrane, it is considered that the cation exchange membrane according to the invention had sufficient superiority and had excellent ultrasonic treatments or resistance to acid and alkali.

Examples 1, 25, and 26 and Comparative Example 12

(Manufacturing of Cation Exchange Membrane)

In the manufactured cation exchange membrane of Example 1, the amount of the inorganic salt in the crosslinking agent was measured by ion chromatography and was 0.15 mass %. In the manufacturing of the cation exchange membrane of Example 1, the cation exchange membranes of Examples 25 and 26 and Comparative Example 12 were manufactured in the same manner as Example 1 except that the amount of inorganic salt was changed to amounts of inorganic salt in the crosslinking agent described in Table 6 below.

The amount of the inorganic salt in the crosslinking agent was adjusted by adjusting the number of recrystallization.

(Ion Chromatography Measuring Condition)
Flow rate: 1.5 mL/min
Injection rate: 20 μL
Column temperature: 35° C.
Eluent: KOH aqueous solution (1 mM to 60 mM)

With respect to the cation exchange membranes of Examples 25 and 26 and Comparative Example 12, evaluations of the water permeability, the film resistance, the selective permeability, the product of the film resistance and the water permeability, the pin hole test, the film mass decreasing rate after the ultrasonic treatment, and the pH resistance were performed by the same method as above.

The obtained results were summarized and presented in Table 6.

TABLE 6

| Item | Type | Example 1 | Example 25 | Example 26 | Comparative Example 12 |
|---|---|---|---|---|---|
| | Amount of inorganic salt in crosslinking agent [mass %] | 0.15 | 0.5 | 0.9 | 1.3 |
| Evaluation Item | Water permeability (mL/m²/Pa/hr) | $4.1 \times 10^{-5}$ | $5.1 \times 10^{-5}$ | $6.0 \times 10^{-5}$ | $1.3 \times 10^{-4}$ |
| | Film resistance ($\Omega \cdot cm^2$) | 1.4 | 1.5 | 2.1 | 3.5 |
| | Selective permeability | 1.00 | 0.99 | 0.98 | 0.92 |
| | (Film resistance) × (water permeability) | $5.7 \times 10^{-5}$ | $7.7 \times 10^{-5}$ | $1.2 \times 10^{-4}$ | $4.6 \times 10^{-4}$ |
| | Pin hole test | A | A | A | B |
| | Film mass decreasing rate (%) after ultrasonic treatment | 0.1 | 0.1 | 0.1 | 1.4 |
| | pH resistance | A | A | A | C |

As clearly presented in Table 6, the cation exchange membranes of Examples 1, 25, and 26 which had small amounts of the inorganic salt in the crosslinking agent had excellent ultrasonic treatments and resistance to acid and alkali, in addition to the basic characteristics of the ion exchange membrane. In contrast, in the cation exchange membrane of Comparative Example 12 of which the amount of the inorganic salt in the crosslinking agent was greater than 1.0 mass %, water permeability was high, selective permeability was low, film resistance was not sufficient, the generation of the pin holes was prevented, and the ultrasonic treatment and the resistance to the acid and the alkali were not sufficient. It is considered that, if the amount of the inorganic salt was high, holes were generated in the ion exchange membrane and became ways through which water passed.

Example 27

(Graft Polymerization)
The nonwoven fiber (manufactured by Freudenberg Group, Product Name: "FO-2223-10", thickness: 100 μm) was irradiated with 200 kGy of the electron beam, polymerizing and curing were performed by immersing the nonwoven fiber in the curable composition used in Example 1 at 40° C., and the cation exchange membrane in which sodium p-divinylbenzenesulfonate was graft polymerized was prepared. The obtained film was maintained in the 0.1 M NaCl solution for at least 12 hours, and the cation exchange membrane having the thickness of 150 μm was manufactured.

Examples 28 and 29

(Polymerization in which Matrix Resin was Added)
In the manufacturing of the cation exchange membrane of Example 1, a hydrogenated styrene-butadiene triblock copolymer (manufactured by Asahi Kasei Corporation, Product Name: "TUFTEC H1051") or a hydrogenatedacrylonitrile-butadiene copolymer (manufactured by ZEON Corporation, Product Name: "ZETPOL 1020", acrylonitrile amount: 44 mass %, iodine value: 25) was mixed with the curable composition liquid of Example 1 as presented in Table 7 below, and the cation exchange membranes of Examples 28 and 29 were respectively manufactured in the same manner as Example 1.

With respect to the cation exchange membranes of Examples 27 to 29, the evaluations of the water permeability, the film resistance, the selective permeability, the product of the film resistance and the water permeability, the pin hole test, the film mass decreasing rate after the ultrasonic treatment, and the pH resistance were performed in the method as above.

[Flexibility]
The flexibility of the ion exchange membrane was evaluated by observing the permeation and non-permeation below.

A portion of the ion exchange membrane was folded by an angle of 90°, and the permeation or non-permeation in this bended portion under the pressure of 10 m water column was visually observed. An ion exchange membrane in which the permeation was admitted was indicated as "permeation" and an ion exchange membrane in which the permeation was not admitted was indicated as "non-permeation".

The obtained results were summarized and presented in Tables 7 and 8.

TABLE 7

| Item | Type | Example 27 | Example 1 |
|---|---|---|---|
| | Graft polymerization | Polymerized | Non-polymerized |
| Evaluation Item | Water permeability (mL/m²/Pa/hr) | $4.0 \times 10^{-5}$ | $4.1 \times 10^{-5}$ |
| | Film resistance ($\Omega \cdot cm^2$) | 1.3 | 1.4 |
| | Selective permeability | 1.00 | 1.00 |
| | (Film resistance) × (water permeability) | $5.2 \times 10^{-5}$ | $5.7 \times 10^{-5}$ |
| | Pin hole test | A | A |
| | Film mass decreasing rate (%) after ultrasonic treatment | 0.1 | 0.1 |
| | pH resistance | A | A |
| | Permeation or non-permeation | Non-permeation | permeation |

As clearly presented in Table 7, the permeation in the cation exchange membrane of Example 27 prepared by the graft polymerization was not admitted. With respective to this, in the cation exchange membrane of Example 1 prepared by the UV exposure, the permeation was admitted.

From this, it is understood that, compared with the cation exchange membrane of Example 1 prepared by UV exposure, the cation exchange membrane of Example 27 prepared by the graft polymerization had excellent flexibility, in addition to the basic characteristics of the ion exchange membrane. It is considered that this is because the adhesiveness between the support and the resin by the graft polymerization was enhanced.

TABLE 8

| Item | Type | Example 28 | Example 29 | Example 1 |
|---|---|---|---|---|
| Composition solution | Composition solution of Example 1 | 0.95 | 0.95 | 1.00 |
| Polymer binder | Hydrogenated styrene-butadiene triblock copolymer | 0.05 | | |
| | Hydrogenated acrylonitrile-butadiene copolymer | | 0.05 | |
| Evaluation Item | Water permeability (mL/m$^2$/Pa/hr) | $4.0 \times 10^{-5}$ | $4.2 \times 10^{-5}$ | $4.1 \times 10^{-5}$ |
| | Film resistance ($\Omega \cdot cm^2$) | 1.4 | 1.4 | 1.4 |
| | Selective permeability | 1 | 1 | 1 |
| | (Film resistance) × (water permeability) | $5.6 \times 10^{-5}$ | $5.9 \times 10^{-5}$ | $5.7 \times 10^{-5}$ |
| | Pin hole test | A | A | A |
| | Film mass decreasing rate (%) after ultrasonic treatment | 0.1 | 0.1 | 0.1 |
| | pH resistance | A | A | A |
| | permeation or non-permeation | Non-permeation | Non-permeation | permeation |

As clearly presented in Table 8, in the cation exchange membranes of Examples 28 and 29 to which the polymer binder was added, the permeation was not admitted. With respect to this, in the cation exchange membrane of Example 1 not including the polymer binder, the permeation was admitted.

Accordingly, it is considered that, the cation exchange membranes of Examples 28 and 29 to which the polymer binder was added had excellent flexibility in addition to the basic characteristics of the ion exchange membrane, compared with the cation exchange membrane of Example 1 not including the polymer binder. It is considered that, this is because the elasticity of the resin was enhanced by adding the polymer binder.

Examples 1, 30, and 31

(Manufacturing of Cation Exchange Membrane in which Content of Constitutional Unit Expressed by General Formula (A) was Changed)

In the manufacturing of the cation exchange membrane of Example 1, the cation exchange membranes of Examples 30 and 31 were respectively manufactured in the same manner as Example 1 by substituting a portion of the compound (M-1) in the coating liquid containing of the curable composition of Example 1 to divinylbenzene.

With respect to the cation exchange membranes of Examples 30 and 31, the water permeability, the film resistance, the selective permeability, the product of the film resistance and the water permeability, the pin hole test, the film mass decreasing rate after the ultrasonic treatment, and the pH resistance were evaluated in the same method as described above.

The obtained results were summarized and indicated in Table 9 below.

As clearly presented in Table 9, it is considered that Examples 1 and 30 in which the constitutional units expressed by General Formula (A) was 5 mass % or less had low film resistance and low products of the film resistance and the water permeability compared with Example 31 in which the constitutional unit expressed by General Formula (A) was greater than 5 mass % and thus more excellent as a film.

It is considered that, if the constitutional unit expressed by General Formula (A) was 5 mass % or less, the charge density in the films of Examples 1 and 30 was greater than that of Example 31.

The invention was described in detail with reference to embodiments thereof, unless described otherwise, any details of the description according to the invention are not intended to limit the invention, and it is obvious that the invention is broadly construed without departing from the spirit and the scope of the invention described in the accompanying claims.

EXPLANATION OF REFERENCES

1: film
2: arrow indicating that water in feed solution penetrates draw solution through film
3: flow channel of feed solution
4: flow channel of draw solution
5: progress direction of liquid
10: flow channel of water permeability measuring device

What is claimed is:
1. A curable composition comprising:
a compound expressed by General Formula (1) below;
a polymerization initiator; and
a chain transfer agent,

TABLE 9

| Item | Type | Example 1 | Example 30 | Example 31 |
|---|---|---|---|---|
| | Content of constitutional unit expressed by General Formula (A) (mass %) | 0 | 3 | 7 |
| Evaluation Item | Water permeability (mL/m$^2$/Pa/hr) | $4.1 \times 10^{-5}$ | $4.2 \times 10^{-5}$ | $4.2 \times 10^{-5}$ |
| | Film resistance ($\Omega \cdot cm^2$) | 1.4 | 1.5 | 2.9 |
| | Selective permeability | 1.00 | 0.99 | 0.98 |
| | (Film resistance) × (water permeability) | $5.7 \times 10^{-5}$ | $6.3 \times 10^{-5}$ | $1.2 \times 10^{-4}$ |
| | Pin hole test | A | A | A |
| | Film mass decreasing rate (%) after ultrasonic treatment | 0.1 | 0.1 | 0.1 |
| | pH resistance | A | A | A |

General Formula (1)

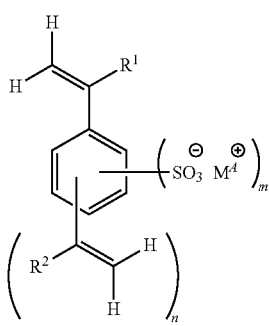

wherein, in General Formula (1), m represents an integer of 1 to 4, n represents an integer of 1 to 4, a sum of m and n is not greater than 5, $M^A$ represents a hydrogen ion, an inorganic ion, or an organic ion, an inorganic ion and an organic ion are bivalent or higher ions, and each of $R^1$ and $R^2$ independently represents a hydrogen atom or an alkyl group.

2. The curable composition according to claim 1, wherein the compound expressed by General Formula (1) is expressed by General Formula (2) below, General Formula (2)

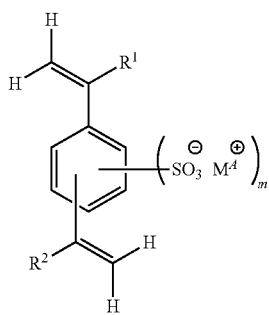

wherein, in General Formula (2), m represents an integer of 1 to 4, $M^A$ represents a hydrogen ion, an inorganic ion, or an organic ion, the inorganic ion and the organic ion may be bivalent or higher ions, and each of $R^1$ and $R^2$ independently represents a hydrogen atom or an alkyl group.

3. The curable composition according to claim 1, wherein the polymerization initiator is selected from the group consisting of an alkylphenone compound, an acylphosphine oxide compound, and an oxime ester compound, and a chain transfer agent has a mercapto group.

4. The curable composition according to claim 1, wherein the polymerization initiator is expressed by any one of General Formulae (PI-1) to (PI-3) below, General Formula (PI-1)

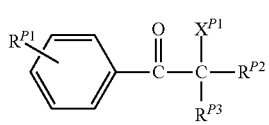

General Formula (PI-2)

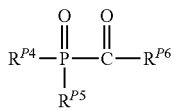

General Formula (PI-3)

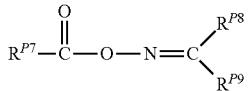

wherein in General Formulae (PI-1) to (PI-3), $X^{P1}$ represents a hydroxy group or $—N(R^{Pa})(R^{Pb})$, each of $R^{Pa}$ and $R^{Pb}$ independently represents an alkyl group, $R^{Pa}$ and $R^{Pb}$ may be bonded to each other to form a ring, each of $R^{P1}$ to $R^{P3}$ independently represents a hydrogen atom, an alkyl group, an alkenyl group, an alkoxy group, an aryloxy group, or $—N(R^{Pc})(R^{Pd})$, each of $R^{Pc}$ and $R^{Pd}$ independently represents an alkyl group and are bonded to each other to form a ring, and $R^{P2}$ and $R^{P3}$ are bonded to each other to form a ring, wherein $R^{P4}$ represents an alkyl group, an aryl group, an alkylthio group, or an arylthio group, $R^{P5}$ represents an alkyl group, an aryl group, an alkylthio group, an arylthio group, or an acyl group, and $R^{P6}$ represents an alkyl group or an aryl group, and wherein $R^{P7}$ represents an alkyl group, an alkenyl group, or an aryl group, $R^{P8}$ represents an alkyl group, an aryl group, or an acyl group, and $R^{P9}$ represents an alkyl group or an aryl group.

5. The curable composition according to claim 1, wherein the chain transfer agent is expressed by General Formula (CT) below, H—Y-LL$^1$-LL-LL$^2$-S—H    General Formula (CT)

wherein in General Formula (CT), LL represents a single bond and a linking group selected from an alkylene group that may have a substituent, —O—, —S—, —N(R$^{Ca}$)—, or a combination thereof, R$^{Ca}$ represents a hydrogen atom or a substituent, each of LL$^1$ and LL$^2$ independently represents —C(R$^{C1}$)(R$^{C2}$)—C(=O)O— in which an atom bonded to —[C(R$^{C1}$)(R$^{C2}$)]a- or LL is an oxygen atom, each of R$^{C1}$ and R$^{C2}$ independently represents a hydrogen atom or an alkyl group, a represents 1 or 2, and Y represents a sulfur atom or an oxygen atom.

6. The curable composition according to claim 1, wherein 0.1 parts by mass to 10 parts by mass of the chain transfer agent is contained with respect to 1 part by mass of the polymerization initiator.

7. The curable composition according to claim 1, further comprising:

a polymer binder.

8. The curable composition according to claim 7, wherein the polymer binder is a monomer unit derived from an aliphatic hydrocarbon-based monomer, and wherein, in a state in which a copolymer is formed, a copolymer of a monomer unit not having an unsaturated bond in the monomer unit and a monomer unit based on a styrene-based monomer is contained.

9. The curable composition according to claim 7, wherein the polymer binder contains a copolymer of a monomer unit based acrylonitrile and a monomer unit not having an unsaturated bond derived from an aliphatic hydrocarbon-based monomer.

10. A cured polymer product obtained by polymerizing and curing the curable composition according to claim 1.

11. The cured polymer product according to claim 10, that is graft polymerized.

12. The cured polymer product according to claim 11, obtained by polymerizing and curing by active radiation graft polymerization.

13. The cured polymer product according to claim 10, at least comprising:

a polymer having a structural unit expressed by General Formula (I-1) below,

General Formula (I-1)

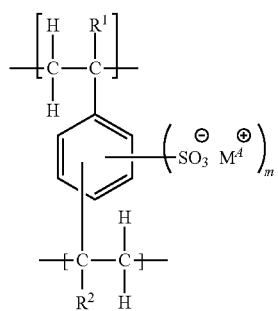

wherein, in General Formula (I-1), m represents an integer of 1 to 4, $M^4$ represents a hydrogen ion, an inorganic ion or an organic ion, an inorganic ion and an organic ion are bivalent or higher ions, and each of $R^1$ and $R^2$ independently represents a hydrogen atom or an alkyl group.

14. The cured polymer product according to claim 13, wherein a content of a constitutional unit expressed by General Formula (I-1) above is 10 mass % or greater with respect to a total mass of the cured polymer product.

15. The cured polymer product according to claim 10, wherein a content of the constitutional unit expressed by General Formula (A) below is 5 mass % or less with respect to a total mass of the cured polymer product, General Formula (A)

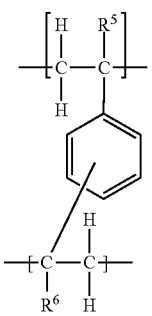

wherein, in General Formula (A), each of $R^5$ and $R^6$ independently represents a hydrogen atom or an alkyl group.

16. The cured polymer product according to claim 10, wherein an ion exchange capacity of the cured polymer product is 3.5 meq/g or greater.

17. The cured polymer product according to claim 10, wherein the cured polymer product is selected from the group consisting of an ion exchange membrane, a proton conduction film, a reverse osmosis membrane, a forward osmosis membrane, a polymer electrolyte, and a water absorbing resin.

* * * * *